US011162261B2

(12) United States Patent
Lukito

(10) Patent No.: US 11,162,261 B2
(45) Date of Patent: Nov. 2, 2021

(54) CROSS-STRUTS FOR BEAM ASSEMBLIES AND LADDER LOADER

(71) Applicant: Harsoyo Lukito, Placentia, CA (US)

(72) Inventor: Harsoyo Lukito, Placentia, CA (US)

( * ) Notice: Subject to any disclaimer, the term of this patent is extended or adjusted under 35 U.S.C. 154(b) by 0 days.

(21) Appl. No.: 15/930,221

(22) Filed: May 12, 2020

(65) Prior Publication Data

US 2020/0291651 A1    Sep. 17, 2020

Related U.S. Application Data

(63) Continuation-in-part of application No. 16/706,709, filed on Dec. 7, 2019, now Pat. No. 10,774,533, which is a continuation of application No. 15/394,908, filed on Mar. 23, 2018, now Pat. No. 10,526,786.

(51) Int. Cl.

| | |
|---|---|
| *B60R 9/042* | (2006.01) |
| *B60R 9/048* | (2006.01) |
| *E04C 3/04* | (2006.01) |
| *E04C 3/07* | (2006.01) |
| *F16L 3/26* | (2006.01) |
| *F16L 3/24* | (2006.01) |
| *E06C 5/04* | (2006.01) |

(52) U.S. Cl.
CPC .............. *E04C 3/04* (2013.01); *E04C 3/07* (2013.01); *B60R 9/048* (2013.01); *B60R 9/0423* (2013.01); *E04C 2003/043* (2013.01); *E04C 2003/0413* (2013.01); *E04C 2003/0434* (2013.01); *E04C 2003/0439* (2013.01); *E04C 2003/0465* (2013.01); *E04C 2003/0473* (2013.01); *E06C 5/04* (2013.01); *F16L 3/24* (2013.01); *F16L 3/26* (2013.01)

(58) Field of Classification Search
CPC ...... B60R 9/0423; B60R 9/048; B60R 9/0485
USPC ....... 224/405, 403, 402, 401, 310, 311, 321, 224/324, 325; 414/809, 462
See application file for complete search history.

(56) References Cited

U.S. PATENT DOCUMENTS

| | | | | |
|---|---|---|---|---|
| 3,013,681 A | * | 12/1961 | Garnett ............... | B60P 3/14 280/4 |
| 3,904,094 A | * | 9/1975 | Correll ............... | B60R 9/0485 224/324 |
| 4,618,083 A | * | 10/1986 | Weger, Jr. ............ | B60R 9/0485 224/309 |

(Continued)

FOREIGN PATENT DOCUMENTS

| | | | | |
|---|---|---|---|---|
| CA | 2493493 A1 | * | 7/2005 | ........... B60R 9/0423 |
| CA | 3042047 A1 | * | 9/2018 | ............. B60R 9/042 |

(Continued)

*Primary Examiner* — Nathan J Newhouse
*Assistant Examiner* — Lester L Vanterpool
(74) *Attorney, Agent, or Firm* — Raymond Sun

(57) ABSTRACT

The present technology relates to beams having a cross section defining a plurality of channels and assemblies comprising the beams. The beams can be used to form a beam assembly that is installed inside the truck bed of a pick-up truck. A ladder loader is pivotably secured to the beam assembly along either the driver side wall or the passenger side wall of the truck bed, with the ladder loader being pivoted between a stow position where the ladder loader is above the beam assembly, and a deployed position where the ladder loader is positioned outside either the driver side wall or the passenger side wall.

10 Claims, 46 Drawing Sheets

(56) References Cited

U.S. PATENT DOCUMENTS

| | | | | |
|---|---|---|---|---|
| 4,751,981 A | * | 6/1988 | Mitchell | B60R 9/00 182/127 |
| 4,989,768 A | * | 2/1991 | McNulty | B60P 3/002 224/405 |
| 5,297,912 A | * | 3/1994 | Levi | B60R 9/0423 414/462 |
| 5,398,778 A | * | 3/1995 | Sexton | B60R 9/0423 182/127 |
| 5,651,484 A | * | 7/1997 | Fugman | B60R 9/0423 182/127 |
| 5,662,254 A | * | 9/1997 | Lemajeur | B60P 3/40 224/405 |
| 5,850,891 A | * | 12/1998 | Olms | B60R 9/0423 182/127 |
| 6,092,972 A | * | 7/2000 | Levi | B60R 9/0423 224/310 |
| 6,099,231 A | * | 8/2000 | Levi | B60R 9/0423 224/310 |
| 6,179,543 B1 | * | 1/2001 | Adame | B60R 9/0423 224/310 |
| 6,315,181 B1 | * | 11/2001 | Bradley | B60R 9/0423 224/310 |
| 6,427,889 B1 | * | 8/2002 | Levi | B60R 9/0423 224/310 |
| 6,764,268 B2 | * | 7/2004 | Levi | B60R 9/0423 224/310 |
| 6,854,627 B2 | * | 2/2005 | Foo | B60R 9/048 182/127 |
| 6,874,835 B1 | * | 4/2005 | Silverness | B60P 3/40 224/310 |
| 7,097,409 B2 | * | 8/2006 | Richter | B60R 9/0423 182/127 |
| 7,210,721 B1 | * | 5/2007 | Bell | B60P 3/40 224/310 |
| 7,341,418 B2 | * | 3/2008 | Ito | B60P 3/1016 414/466 |
| 7,549,831 B2 | * | 6/2009 | Hendley | B60R 9/0423 224/310 |
| 8,511,525 B1 | * | 8/2013 | Levi | B60R 9/0423 224/310 |
| 8,833,621 B2 | * | 9/2014 | Burkhardt | B60P 3/40 224/405 |
| 8,991,889 B1 | * | 3/2015 | Levi | B60R 9/0423 296/3 |
| 9,132,780 B2 | * | 9/2015 | Sautter, Jr. | B60R 9/0423 |
| 9,132,781 B2 | * | 9/2015 | Thibault | B60R 9/0423 |
| 9,156,411 B2 | * | 10/2015 | Elezaj | B60R 9/0423 |
| 9,193,304 B2 | * | 11/2015 | Svaldi | B60R 9/06 |
| 9,327,654 B2 | * | 5/2016 | Richter | B60R 9/0423 |
| 9,415,726 B2 | * | 8/2016 | Levi | B60R 9/0485 |
| 9,457,727 B2 | * | 10/2016 | Hobbs | B60R 9/042 |
| 9,481,313 B2 | * | 11/2016 | Levi | B60R 9/0485 |
| 9,694,756 B2 | * | 7/2017 | Pullman | B60R 9/0423 |
| 9,796,340 B2 | * | 10/2017 | Bharucha | B60R 9/0423 |
| 9,987,995 B2 | * | 6/2018 | Paunov | B60R 9/0423 |
| 10,017,124 B2 | * | 7/2018 | Lachance | B60R 9/0423 |
| 10,189,418 B2 | * | 1/2019 | Willis | B60R 9/0423 |
| 2005/0236228 A1 | * | 10/2005 | Thibault | B60R 9/0423 182/127 |
| 2006/0185933 A1 | * | 8/2006 | Thibault | B60R 9/0423 182/127 |
| 2007/0183875 A1 | * | 8/2007 | Thibault | B60R 9/0423 414/462 |
| 2007/0236033 A1 | * | 10/2007 | Newman | B60R 9/0423 296/3 |
| 2008/0079277 A1 | * | 4/2008 | Wethington | B60R 9/0485 296/3 |
| 2009/0145940 A1 | * | 6/2009 | Bukowiec | B60R 9/048 224/310 |
| 2009/0255966 A1 | * | 10/2009 | Prapavat | B60R 9/00 224/403 |
| 2011/0038698 A1 | * | 2/2011 | Li | B60R 9/0423 414/479 |
| 2015/0048127 A1 | * | 2/2015 | Sutton | B60R 9/0423 224/324 |
| 2018/0162288 A1 | * | 6/2018 | Sautter | B60R 9/0426 |

FOREIGN PATENT DOCUMENTS

| | | | | |
|---|---|---|---|---|
| EP | 0340076 A1 | * | 11/1989 | B60R 9/0423 |
| EP | 2327587 A1 | * | 6/2011 | B60R 9/0423 |

* cited by examiner

CROSS-STRUTS FOR BEAM ASSEMBLIES AND LADDER LOADER

TECHNICAL FIELD

This technology relates to structural channels which provide functional capability in multiple directions, for example providing platforms for component attachments in multiple directions and physical protection to system integrated components inside the structural channel. More particularly, the disclosed structural channels are configured to provide platforms for permitting multiple carriers to slide and/or roll in linear motion independently in multiple directions.

BACKGROUND

Unistruts are a standardized formed structural system used in the construction and electrical industries for light structural support, often for supporting wiring, plumbing, or mechanical components such as air conditioning or ventilation systems.

FIG. 1 shows Unistrut channels in various configurations. Unistrut channels are formed from sheet metal folded over into an open channel shape with inwards curving lips to provide additional stiffness and as a location to mount interconnecting components. Unistrut channels have holes in the base to facilitate interconnection or fastening the Unistrut to underlying building structures. FIG. 2 shows an example application of a Unistrut.

Unistrut channels can be used in connecting lengths of Unistrut together and other hardware to the Unistrut, for example using various specialized Unistrut specific fasteners and bolts. A disadvantage of the Unistrut occurs when components need to be attached facing different directions. In order to accomplish this with Unistrut time consuming modification is needed, such as welding, drilling more holes or bolting these additional items with additional fasteners. The resulting structure either lacks structural integrity or has a low ratio of structural integrity over weight, i.e. the assembly is very heavy relative to how strong it is. Examples of undesirable assemblies are shown in FIGS. 3A and 3B. Further, Unistruts have the disadvantage of lacking surfaces which provide platforms to allow smooth rolling and sliding for linear movement assemblies.

BRIEF SUMMARY

The present technology relates to beams having a cross section defining a plurality of channels and assemblies comprising the beams. In embodiments the cross section may define four channels, facing in four directions. The cross section has the advantages of providing structural channels that provide strength, platforms for attaching sliding and fastening components, and conduits for protecting internal components. The interior and exterior surfaces of the channels are configured to permit multiple carriers to slide/roll in linear motion independently in multiple directions, with smooth action and stability due to one or more guiding features to distribute load.

The present invention further provides a ladder loader that can be used with a truck that is installed with a beam assembly using the beams described herein.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive

DETAILED DESCRIPTION

Figure 1:
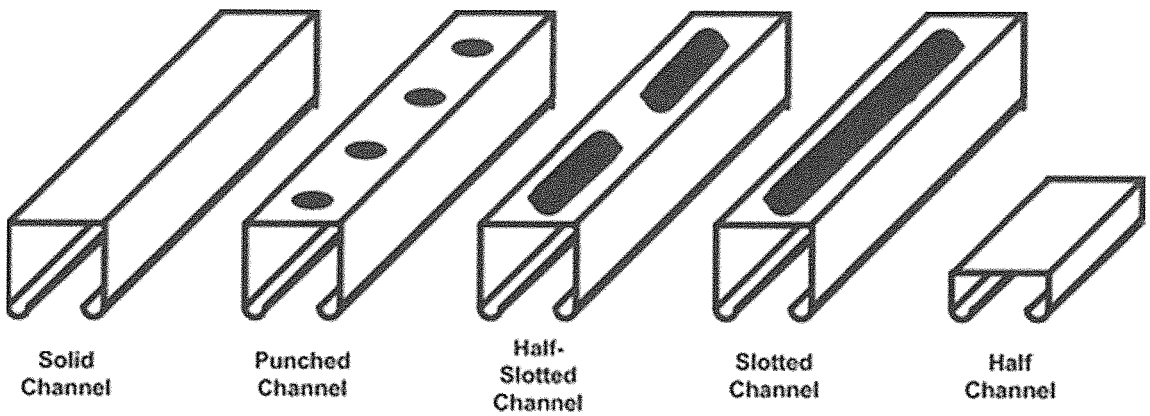
FIG. 1 shows a plurality of Unistrut channels.
Figure 2:
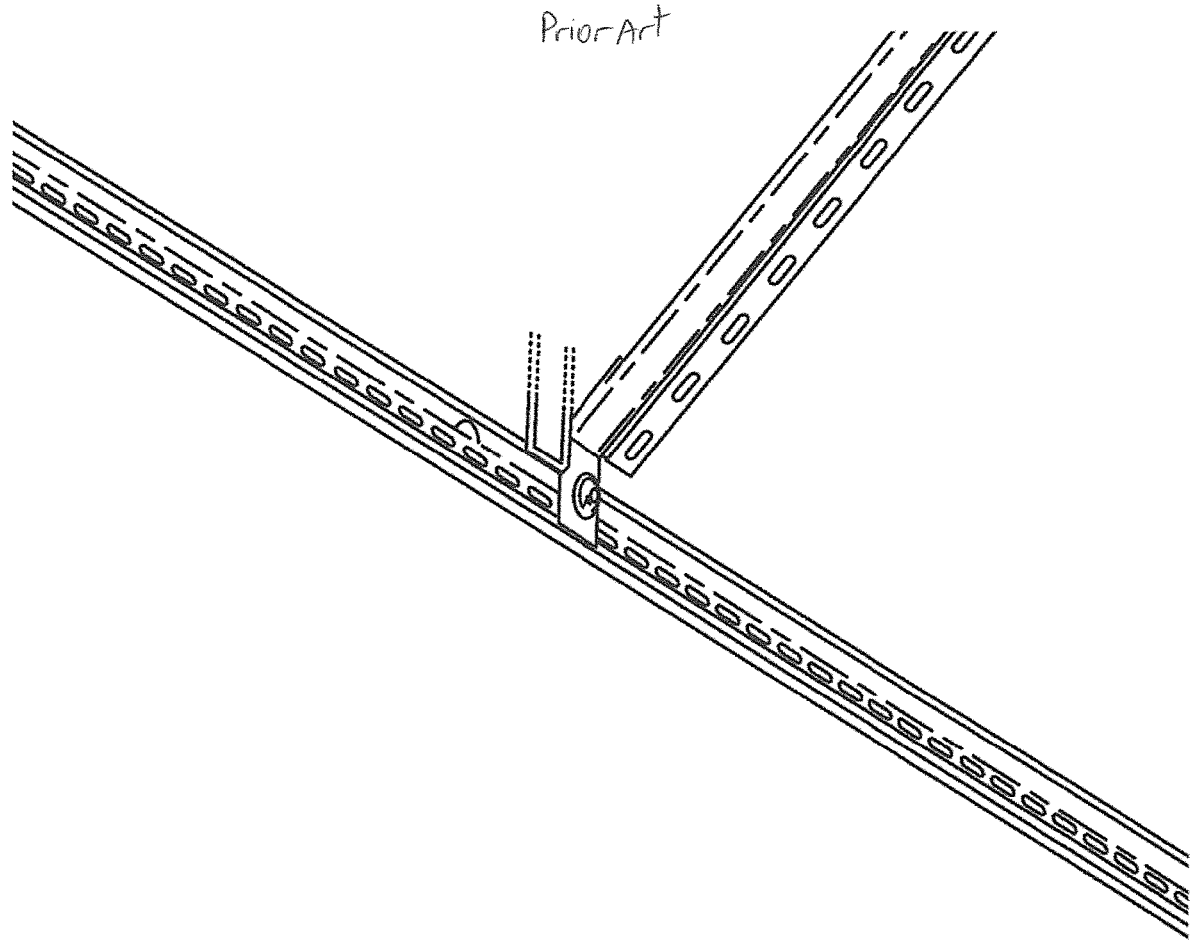
FIG. 2 shows an assembly of two Unistrut channels.
Figure 3A:
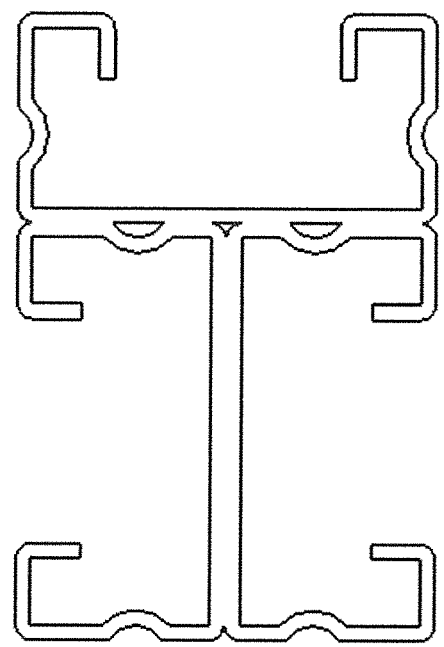
FIG. 3A shows a cross section of a Unistrut channel assembly.
Figure 3B:
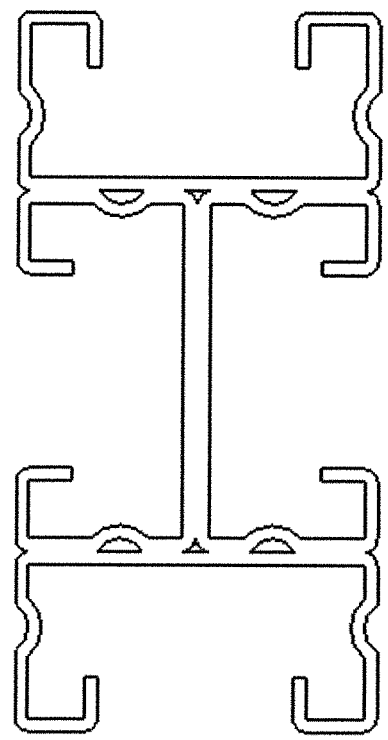
FIG. 3B shows a cross section of a Unistrut channel assembly.

The present disclosure describes embodiments of channels, beams, and apparatuses and systems composed of embodiment of the beams. Certain details are set forth in the following description and in the figures to provide a thorough understanding of various embodiments of the present technology.

Many of the details, dimensions, angles and other features shown in the figures are merely illustrative of particular embodiments. Accordingly, other embodiments can include other details, dimensions, angles and features without departing from the spirit or scope of the present invention. Various embodiments of the present technology can also include structures other than those shown in the figures and are expressly not limited to the structures shown in the figures. Moreover, the various elements and features shown in the figures may not be drawn to scale. In the figures, identical reference numbers identify identical or at least generally similar elements.

As used herein, the term "substantially" refers to the complete or nearly complete extent or degree of an action, characteristic, property, state, structure, item, or result. For example, an object that is "substantially" uniform in height to another object would mean that the objects are either completely or nearly completely uniform in height. The exact allowable degree of deviation from absolute completeness may in some cases depend on the specific context, however, generally speaking, the nearness of completion will be so as to have the same overall result as if absolute and total completion were obtained.

As used herein, the term "about" is used to provide flexibility to a numerical range endpoint by providing that a given value may be "above" or "below" the value. For example, the given value modified by about may be, for example, by ±5%, ±10%, ±15%, ±20%.

Wherever used throughout the disclosure and claims, the term "generally" has the meaning of "approximately" or "closely" or "within the vicinity or range of". The term "generally" as used herein is not intended as a vague or imprecise expansion on the term it is selected to modify, but rather as a clarification and potential stop gap directed at those who wish to otherwise practice the appended claims, but seek to avoid them by insignificant, or immaterial or small variations. All such insignificant, or immaterial or small variations should be covered as part of the appended claims by use of the term "generally".

As used herein, the terms "back", "side", "front", "inner" and "outer" are used to provide orientation, direction, position, or a reference point other component. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a term such as "below" can encompass both an orientation of above and below, depending on the context of its use. The device may be otherwise oriented (rotated 90 degrees or at other orientations) and the spatially relative descriptors used herein are interpreted accordingly.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Although the terms "first", "second", etc. may be used herein to describe various elements, components, regions, layers and/or sections, it should be understood that the terms do not connote the number or order of the elements. These terms are used to distinguish one element, component, region, layer, or section from another. Thus, a first element, component, region, layer, or section discussed below could be termed a second element, component, region, layer, or section without departing from the teachings of the present invention.

As used herein, the terms "and/or" and "at least one of" include any and all combinations of one or more of the associated listed items.

Figure 4A:
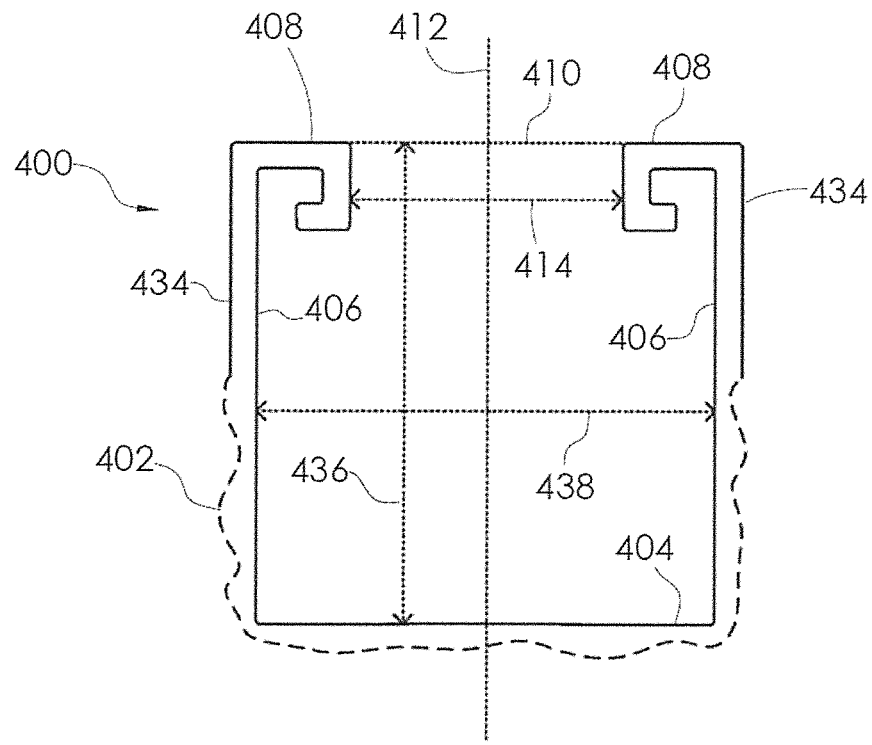
FIG. 4A shows a channel according to the present technology.

FIG. 4A shows a cross section of a channel 400. As will be discussed below the channel 400 may be one of a plurality of channels of a beam and channels of the beam may share walls with various portions of other channels of the beam. For clarity, FIG. 4A omits the portions of the beam beyond the surfaces that define the channel 400, as indicated by the dashed line 402 around the surface. Channel 400 includes a back inner surface 404, two side inner surfaces 406, and two flanges 408 at the front 410 of the channel 400. The surfaces described herein with relation to the channel 400 are substantially planar and extend the length of the beam which the channel is defined by. As shown, side inner surfaces 406 extend from and are substantially perpendicular to the back inner surface 404, and further are substantially parallel to each other. Side inner surfaces 406 and back inner surface 404 define three sides of the channel 400, wherein the fourth side completing the rectangle is referred to as the front 410 of the channel 400. A centerline 412 extends between the middle of the back inner surface 404 and the front 410. Flanges 408 extend from the front of the side inner surfaces 406 toward the center 412 of the channel 400. As shown the opening 414 to the channel is defined by the space between the opposing flanges 408.

Figure 4B:
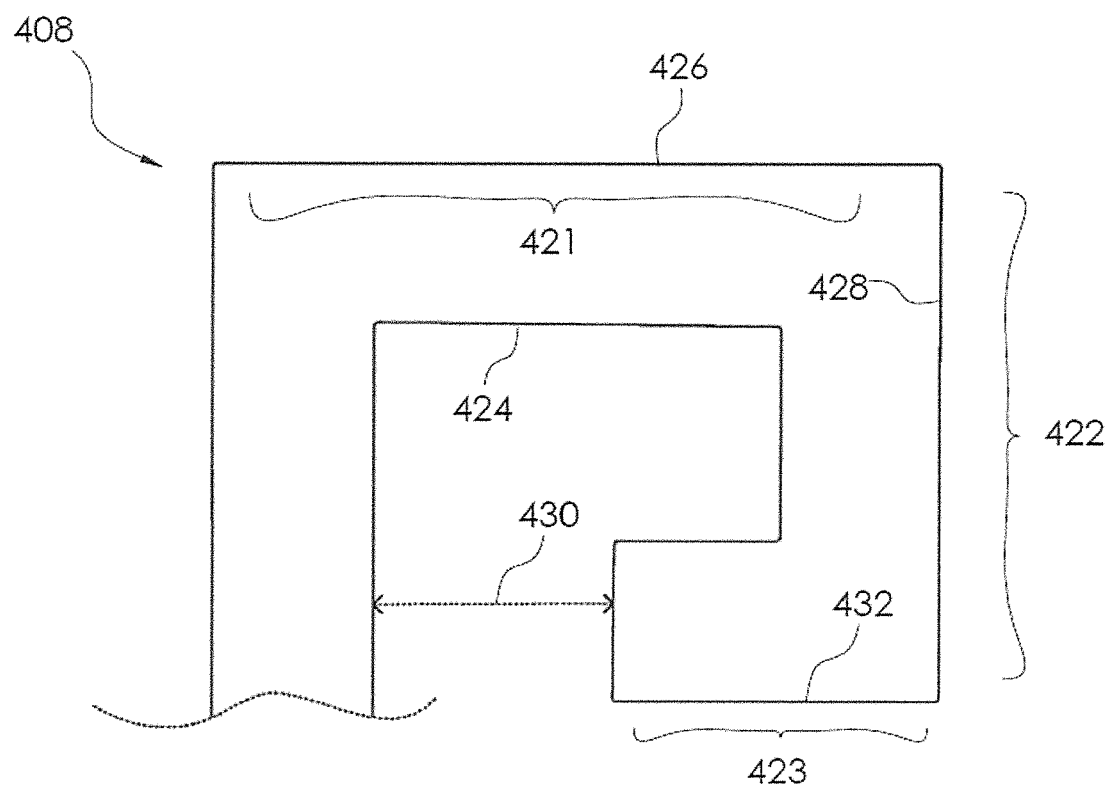
FIG. 4B shows detail of a flange of FIG. 4A.
Figure 15:
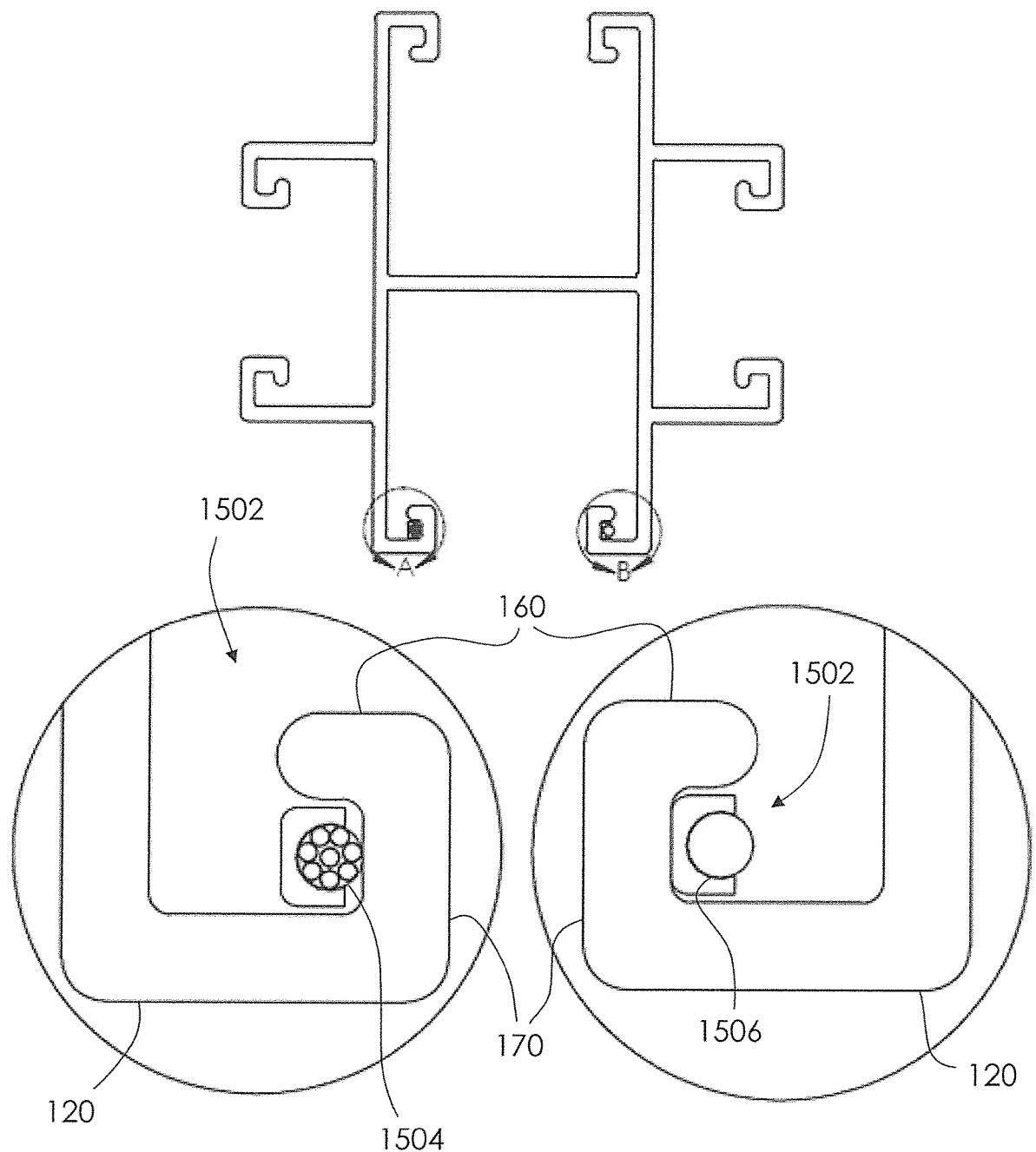
FIG. 15 shows cross section views and close up views of an end flange of a beam according to the present technology.

FIG. 4B shows a detailed cross section of a flange 408 of the channel 400 of FIG. 4A. As shown, flanges include a first portion 421 extending from side inner surface 406 toward centerline 412 of the channel 400. First portion 421 includes a first inner surface 424 facing toward and substantially parallel to the back inner surface 404 and a first outer surface 426 facing away from and a substantially parallel to the back inner surface 404. First outer surface 426 provides a planar external surface for rollers to roll against and guides to slide against. In embodiments, first outer surface 426 may have a width of between 0.25" and 0.5". Flange 408 further includes a second portion 422 extending from the end of the first portion 421 opposite the side inner surface 406 toward the back inner surface 404. Second portion 422 includes second inner surfaces 428 substantially parallel to the side inner surface 406 and facing the side inner surface 406 opposite from the side inner surface 406 from which the flange 408 extends from. The second inner surface 428 may provide rolling and sliding surfaces that prevent motion of rollers and guides in a direction transverse to the direction of movement. Second inner surfaces may also be referred to as side rolling surfaces. In embodiments, second inner surface 428 may have a width of between 0.25" and 0.5". The distance between second inner surfaces 428 define the opening 414 of the channel 400. In embodiments, the opening is between 0.75" and 1.0". Flange 408 further includes a third portion 423 extending from the end of the second portion 422 opposite the first portion 421 toward the side inner surface 406 from which the flange 406 that the third portion 423 comprises extends. Third portion 423 includes third inner surfaces 432 substantially parallel to and facing the back inner surface 404. Third inner surface 432 provides a rolling or sliding surface that may retain rollers and guides within the channel from being pulled out of the channel. In embodiments, third inner surface 432 may have a width of between 0.16" and 0.20". As shown, a gap 430 is formed between the side inner surface 406 and the third portion 423 of the flange 408 since the third portion is shorter than the first portion. The gap provides an opening to a passage defined by a portion of the side inner wall 406, the first portion 421, the second portion 422 and the third portion 423. The passage may be configured to receive and protect electrical or hydraulic cabling or tubing. For example, as shown in FIG. 15, the passage 1502 may protect wiring 1504 or tubing 1506.

As shown in FIG. 4A, channel 400 further includes a side outer surfaces 434 opposite and sharing a portion of a wall with side inner surfaces 406. In embodiments, side outer surface 434 may have a width substantially the same as the depth of the channel 400 or may only extend a fraction of the depth of the channel, for example ⁻50%. In embodiments, side outer surfaces 434 of adjacent channels of a beam may be coplanar or may form inward (i.e. concave) corners.

As shown, channel 400 is substantially rectangular. In embodiments, the channel may be substantially square. In embodiments the channel may be rectangular with the depth 436 greater than the width 438 or the width greater than the depth. Deeper channels are beneficial four housing actuators, tubing and cables. Further, shallower channels are beneficial in reducing material costs and size while also providing the beneficial rolling and sliding surfaces as noted above.

Figure 5:
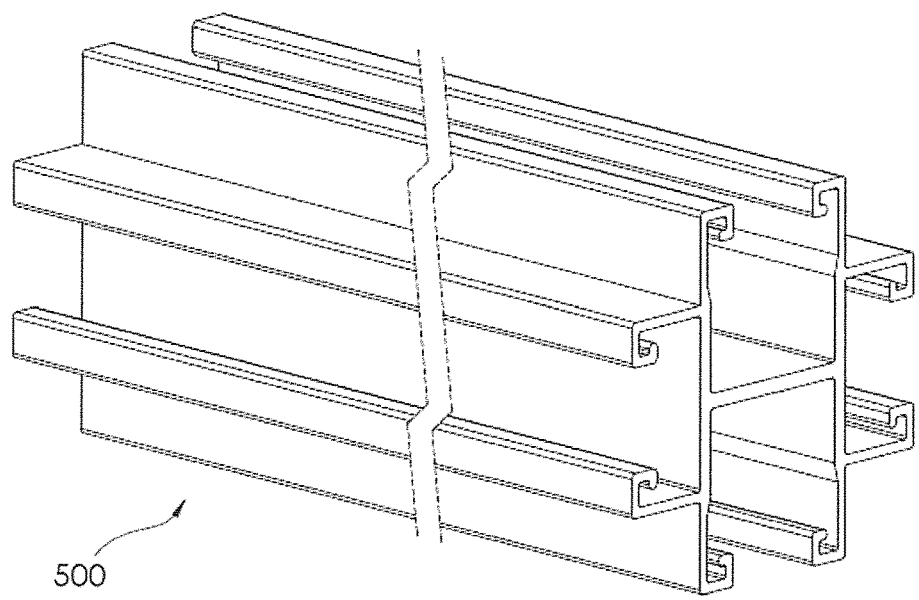
FIG. 5 shows a beam according to the present technology, with the middle section omitted for clarity purposes.
Figure 6:
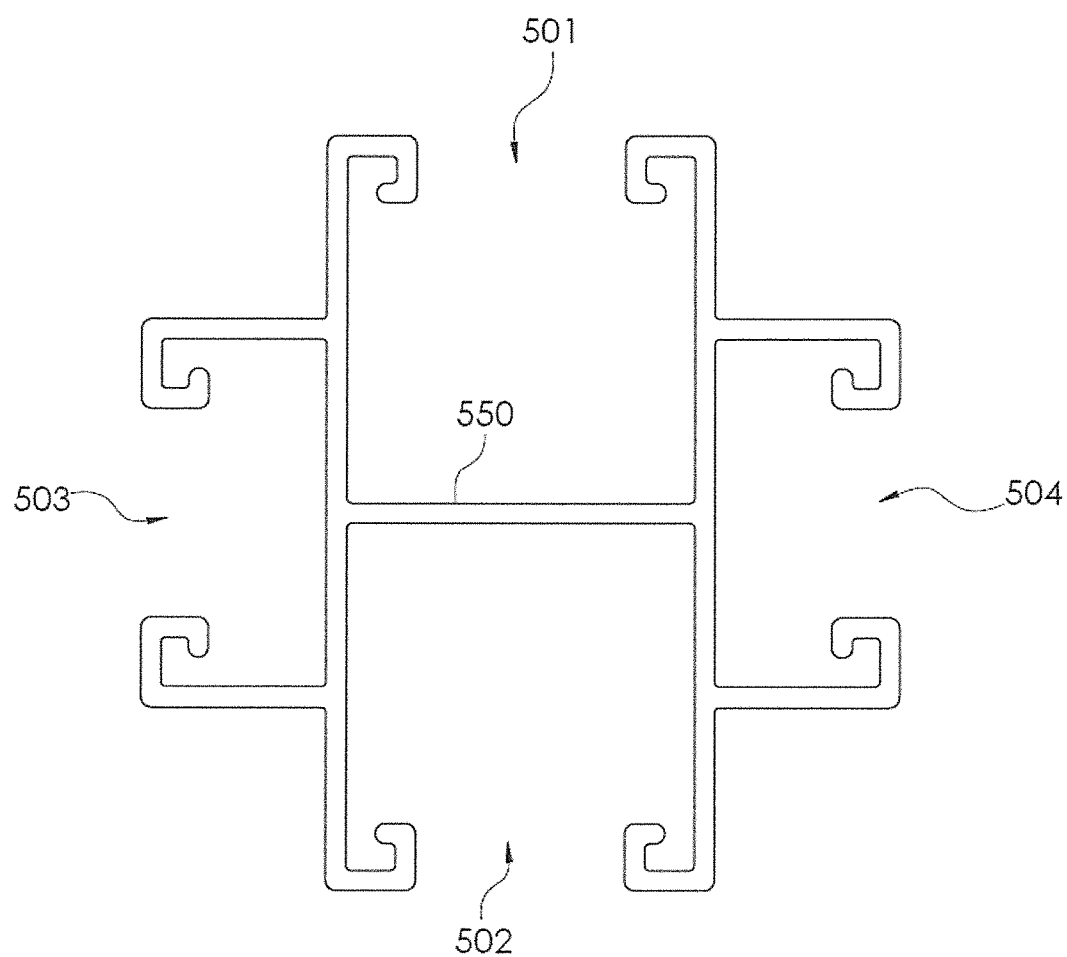
FIG. 6 shows a cross section of the beam of FIG. 5.

FIG. 5 shows an embodiment of a beam including a plurality of channels as shown in FIGS. 4A and 4B. Specially, the beam includes four channels. The beams disclosed herein may be any length. For clarity purposes the middle portion is omitted in FIG. 5. FIG. 6 shows a cross section of the beam 500 of FIG. 5. As used herein, directions (e.g. front, back, left, right, up, down, side, outer, central etc.) are used to convey positions and orientations of components relative to each other and are not intended to limit the position and orientation of the present technology relative to its surrounding environment.

As shown in FIG. 6, the cross section defines four channels. A first channel 501 (Top) and a second channel 502 (Bottom) opposite each other. In embodiments, for example as shown in FIG. 6, the back inner surfaces of the first and second channels share a common wall of webbing 550. In embodiments, opposing channels may have the same depth, or may have different depths. As shown in FIG. 6, the depths of the first and second channels are the same, however in embodiments webbing 550 may not be in the middle of the cross section and the channels may have different depths. The first and second channels define a central H frame.

The cross section further defines a third channel 503 (Left) and a fourth channel 505 (Right) which oppose each other and are separated by the H frame of the first and second channels. The back inner surfaces of the third and fourth channels share walls with the side inner surfaces of the first and second channels. In the configuration shown in FIG. 6, the third and fourth channels 503 and 504 have a smaller depth than the first and second channels 501 and 502. In embodiments, for example as shown in FIG. 6, the first and second channels have a depth of 1.625" and the third and fourth channels have a depth of 0.875". In the embodiment shown, the first and second channels are generally square and the third and fourth channels are rectangular with a greater width than depth. In embodiments, the first and second channels may be rectangular with a greater depth than width, and the third and fourth channels may be substantially square or rectangular.

In embodiments, a rectangular bounding box of a four channel beam is defined by the first outer surfaces of the first, second, third and fourth channels is generally square. A square bounding box is advantageous in that the beam is versatile by being able to be oriented in any of the four directions around the longitudinal axis of the beam while providing channels in the same directions.

As shown, side outer surfaces of the four channels define four inward corners. As will be discussed below, the surfaces of the inward corners may be used in various rolling and sliding applications.

In embodiments, the surfaces of the channels of a beam provide smooth planar sliding and rolling surfaces for guides and rollers attached to a carrier bracket to slide and/or roll on in linear motion. Multiple channels may allow for independent linear motion in multiple directions within the channels of a beam. The sliding/rolling surfaces may be planar and smooth to reduce friction, for example the beam may be manufactured of extruded aluminum. The corners and edges may be rounded and free from sharp edges to prevent wear on guides and rollers, which may be constructed of softer materials than the beam, such as polymers. The wall thickness of the cross section may be uniform or may be different at different sections to provide additional structural support for portions of one or more of the channels.

Figure 7A:
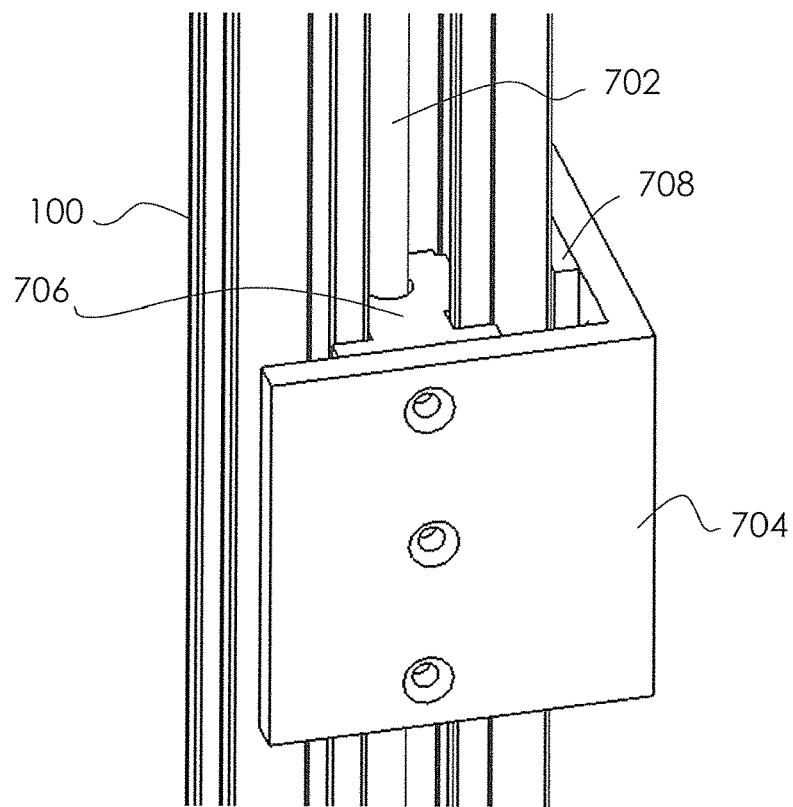
FIGS. 7A and 7B show a perspective view and cross section view of an embodiment including an electrical actuator embedded in a beam.
Figure 7B:
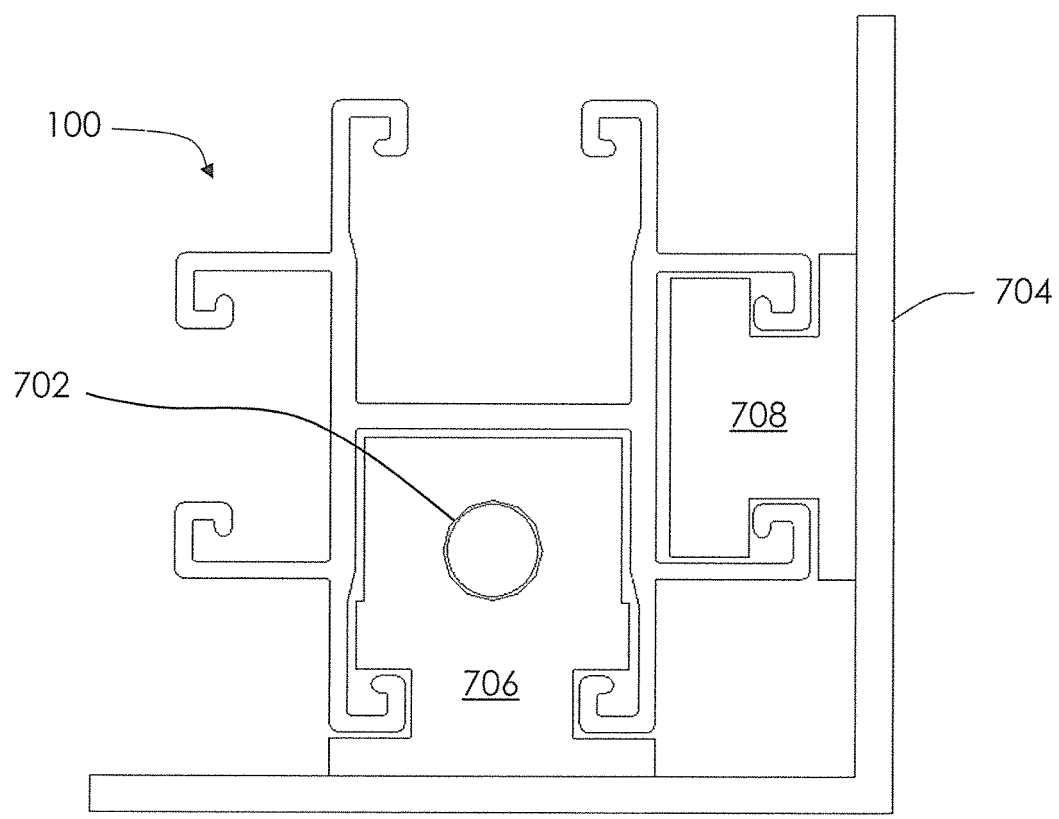

In embodiments, a linear actuator 702 may be disposed within a channel of a beam, for example as shown in FIGS. 7A and 7B. In embodiments, any number of the channels of a beam may have a linear actuator disposed within them. Linear actuators disposed within a channel may be for example a mechanical, electrical, hydraulic, pneumatic, or combinations therefore. The linear actuators include a translatable piston or slider which may be attached to a carrier bracket external to the beam.

As shown in FIGS. 7A and 7B, the piston or slider may be positioned within the second channel of the beam. The linear actuator 702 is coupled to a carrier bracket 704 located externally of the channels of the beam 100. Carrier bracket 704 is L-shaped and is coupled to a first guide 706 and a second guide 708 disposed within different channels of the beam. The first guide 706 is received in the second channel and the second guide 708 is received in the fourth channel. Carrier bracket 704 provides mounting surfaces to attach components to be lifted, for example toolboxes, ladder racks, or elevators, as will be discussed below. As shown, the first and second guides have complementary shapes to the channels including notches that the flanges of the channels are received within to secure the guides within the channels. Guides secured within channels in this manner may be referred to as trapped guides. Trapped guides provide the advantage of maintaining the linear path of motion of the guide regardless of a direction of force pulling the guide away from the channel.

In embodiments, guides include surfaces configured to slide against the back inner surface, the side inner surfaces and the third inner surfaces. The guides may be dimensioned to be slightly smaller than the dimensions of the channel to prevent excess friction. The complementary surfaces of the guides and channels are configured so that the bracket remains coupled to the beam regardless of the direction of the load on the bracket relative to the beam. The guides may be constructed of a material with low friction with the beam, for example synthetic material such as nylon or fiberglass.

Figure 8A:
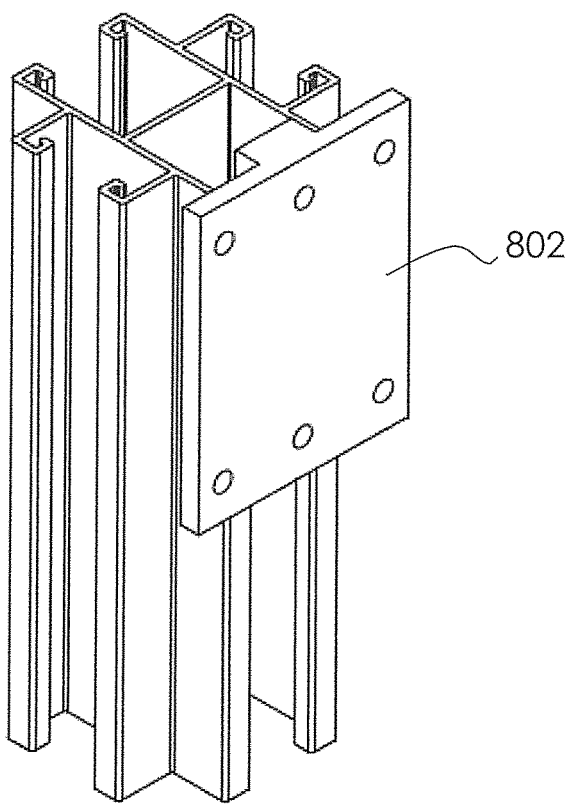
FIGS. 8A and 8B show a perspective and cross section view of an embodiment including guides within a beam.
Figure 8B:
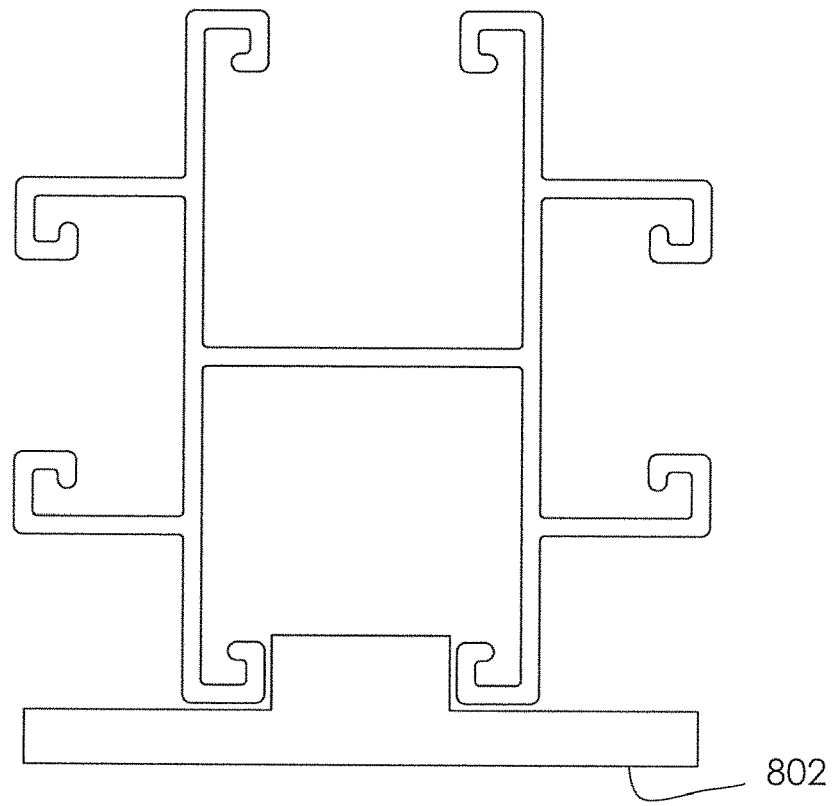

In embodiments, guides attached to a carrier bracket may not be trapped within channels of the beam, and will be referred to as free guides. For example, FIGS. 8A and 8B show an embodiment including guide 802, which is a free guide. Guide 802 comprises surfaces configured to glide along first and second portions of the flange. With this configuration, guide 802 is not trapped within the channel. This configuration has the advantage of being easy to install as it can be installed anywhere on the beam, whereas trapped guides can be installed by inserting a portion of the trapped guide at an end of a channel or by assembling the trapped guide with multiple components sized to be able to enter through the opening of the channel within the channel. The free guide configuration is advantageously used when the carrier bracket is attached to other guide features in other channels which constrain the movement of the device to a linear path or when the free guide will not experience forces pulling the guide away from the channel.

Figure 9A:
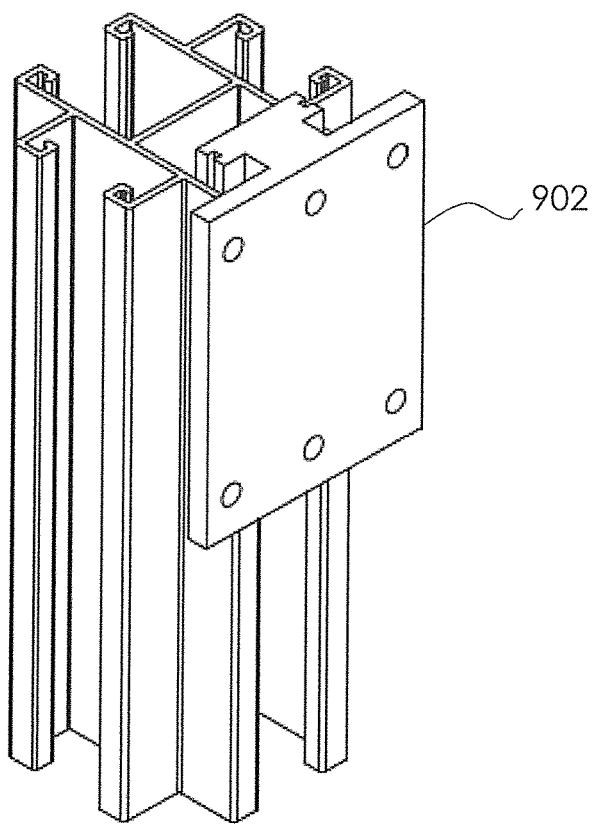
FIGS. 9A and 9B show a perspective and cross section view an embodiment including a guide within a beam.
Figure 9B:
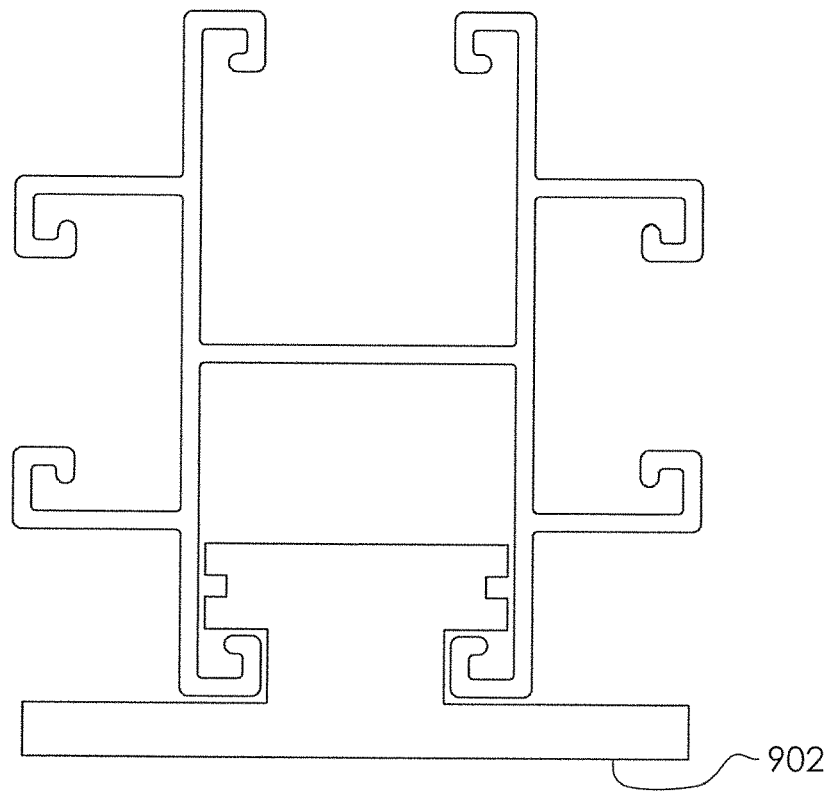

In embodiments trapped guides may not occupy the entire channel. For example, FIGS. 9A and 9B show an embodiment with a guide 902. Guide 902 has a depth less than the depth of the channel which it is received in. The space in the channel not occupied by the trapped guide may be used to house actuators, wires, tubes, or sensors. This configuration of a trapped guide reduces weight and material which is beneficial for manufacturing and movement of the guide.

Figure 10A:
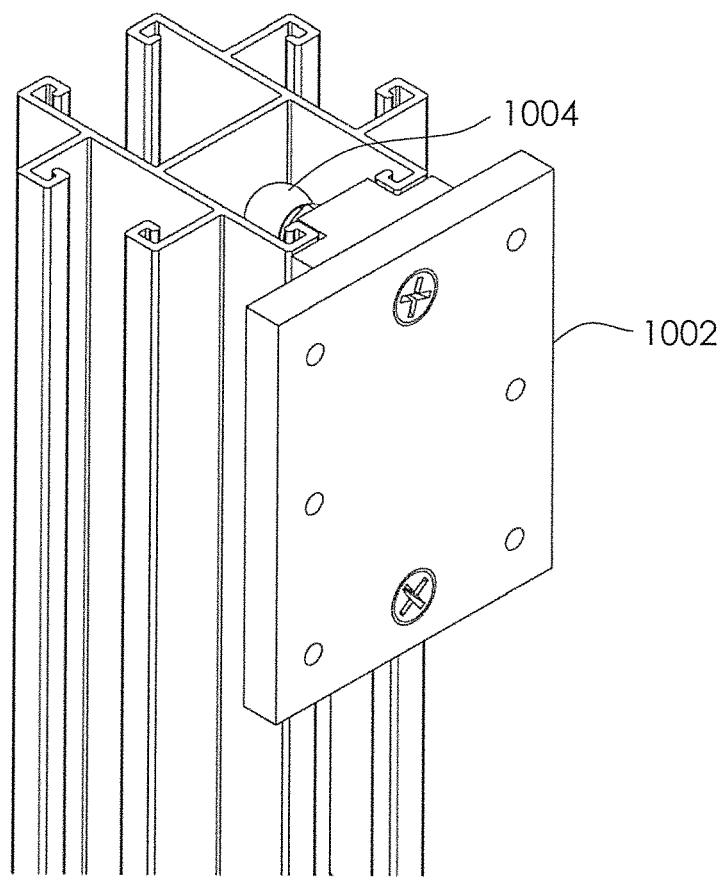
FIGS. 10A and 10B show a perspective and cross section view an embodiment including a guide within a beam.
Figure 10B:
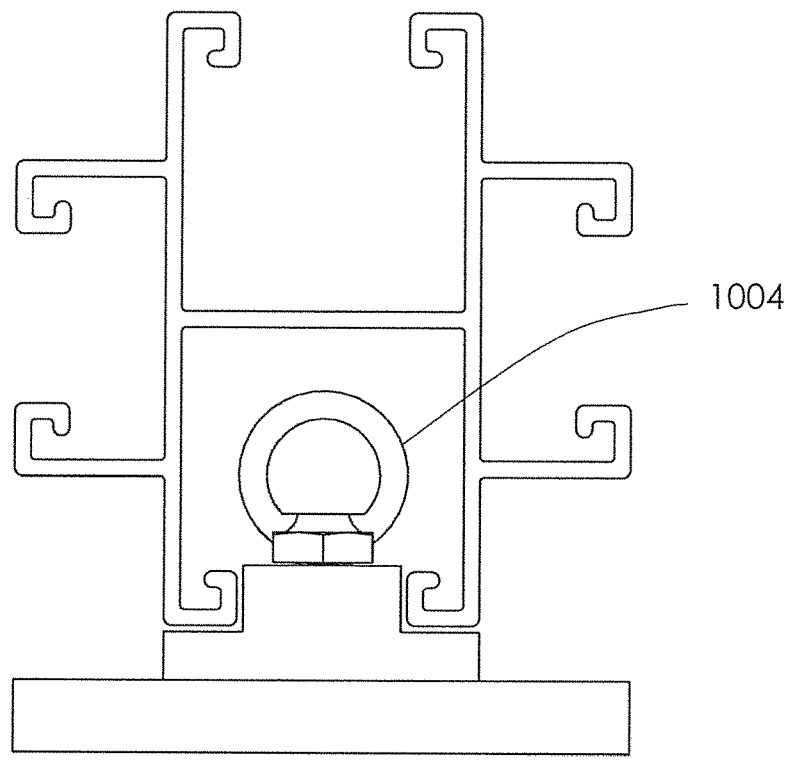

FIGS. 10A and 10B show an embodiment with a guide 1002.

Guide 1002 occupies the portion of the channel between the flanges and does not occupy the remaining portion of the channel. In embodiments, this unoccupied space is occupied by a translatable piston or slider of a linear actuator. As shown, linear actuator 1004 occupies the channel and is coupled to guide 1002. The linear actuator is secured to the guide and moves the guide to positions along the length of the beam.

Figure 11A:
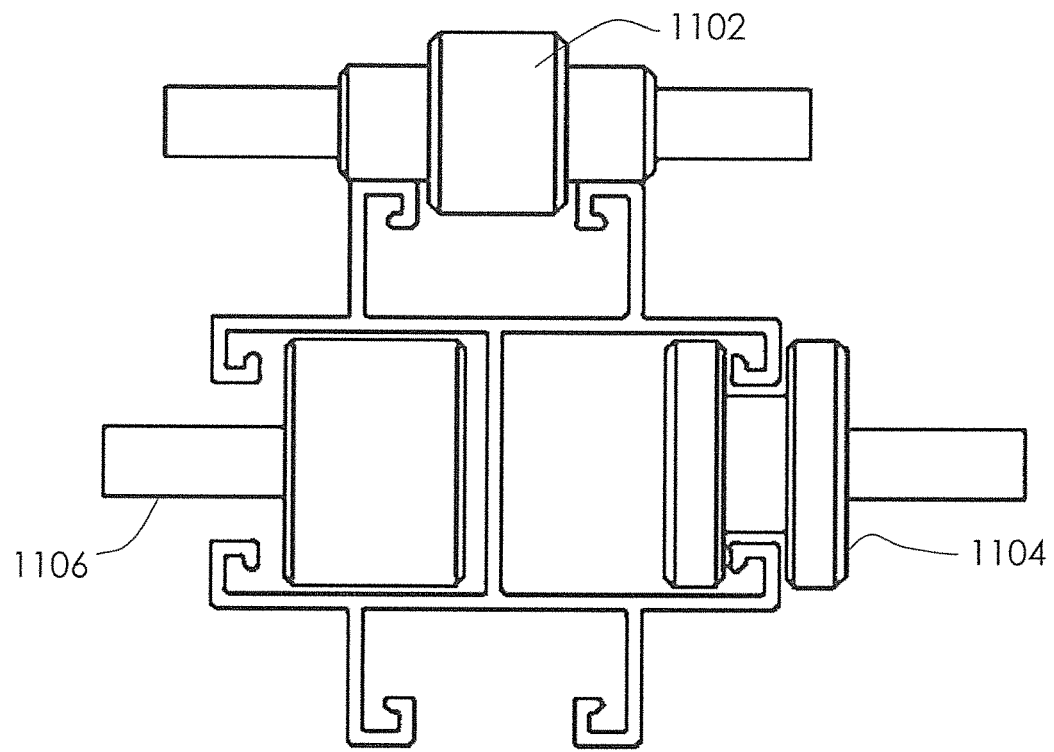
FIGS. 11A and 11B show a perspective and cross section view of exemplary embodiments of rollers which may be used with a beam according to the present technology.
Figure 11B:
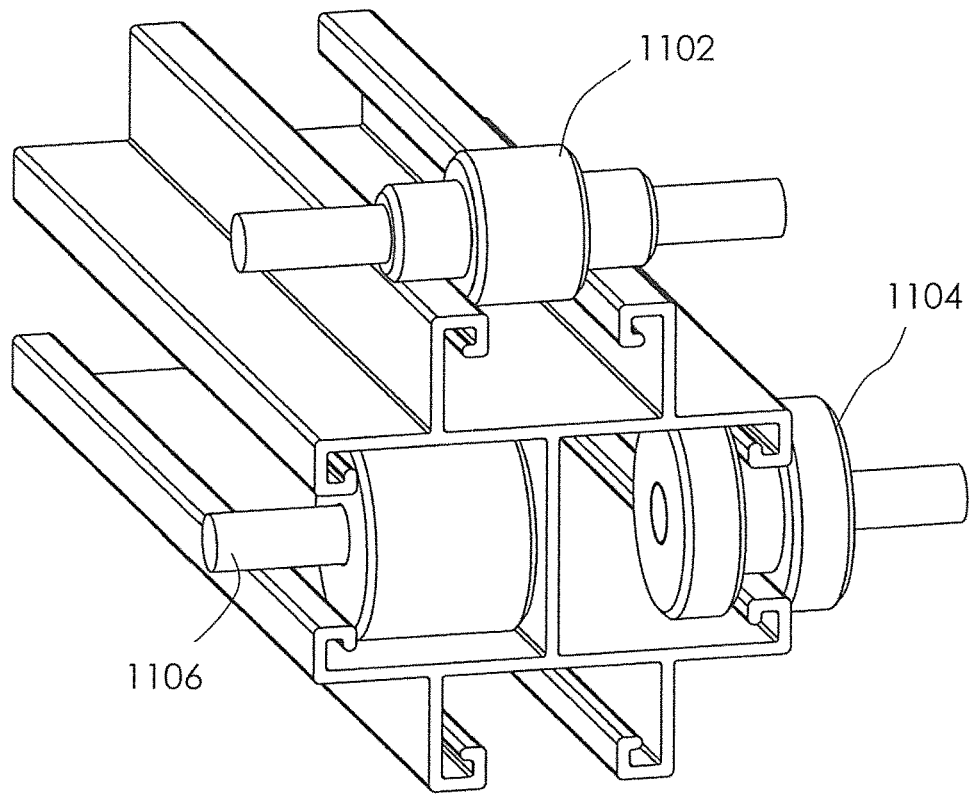

In embodiments, in addition to sliding guides as discussed above carrier brackets may be attached to rollers. Rollers may be shaped and dimensioned to contact and roll against one or more surfaces of a channel or multiple channels. FIGS. 11A and 11B show a beam with exemplary embodiments of rollers which may be used with channels as disclosed herein. Roller 1102 is positioned within the third channel, which in this figure is oriented at the top. Roller 1102 has an axle which rotates along an axis of rotation which is parallel to first outer surface and perpendicular to the longitudinal axis of the beam. Roller 1102 includes outer cylindrical roller surfaces configured to roll along the outer first surfaces. Roller 1102 further comprises a central cylindrical roller surface with a larger diameter than the outer cylindrical roller surfaces. The central cylindrical roller surface is dimensioned to span the opening of the channel and be aligned and retained between the second inner surfaces in order to prevent transverse movement of the roller as it rolls along the length of the channel.

Further shown in FIGS. 11A and 11B, roller 1104 is received in the first channel, in FIG. 11B on the right. Roller 1104 includes outer cylindrical roller portions and a smaller central roller portion. The central roller portion is positioned between the second inner surfaces of the flanges of the channel. The central roller portion includes a roller surface configured to roll against either one of the second inner surfaces of the channel. The distal outer cylindrical portion of roller 1104 is positioned within the channel may be configured to roll along either one of the side inner surfaces of the channel. The proximal and distal outer cylindrical portions capture the flanges and prevent the roller from moving in and out of the channel. Further, as shown, roller 1104 is sized to occupy a portion of the channel leaving a portion of the channel available for other components, as discussed above.

Roller 1106 occupies the third channel, in this figure on the left.

Roller 1106 comprises a single cylindrical section. The single cylindrical section is received within the third channel. The single cylindrical section is configured to roll against either side inner surface of the channel. The diameter of the single cylindrical section is slightly smaller than the distance between the side inner surfaces, and is greater than the distance between the second inner surfaces of the flanges. This is advantageous in preventing the roller from being pulled out of the channel.

In embodiments, rollers with portions captured within the channel may be installed at the end of a beam, or may be formed of multiple pieces which may be inserted through the opening between the end flanges and assembled within the channel.

Figure 12A:
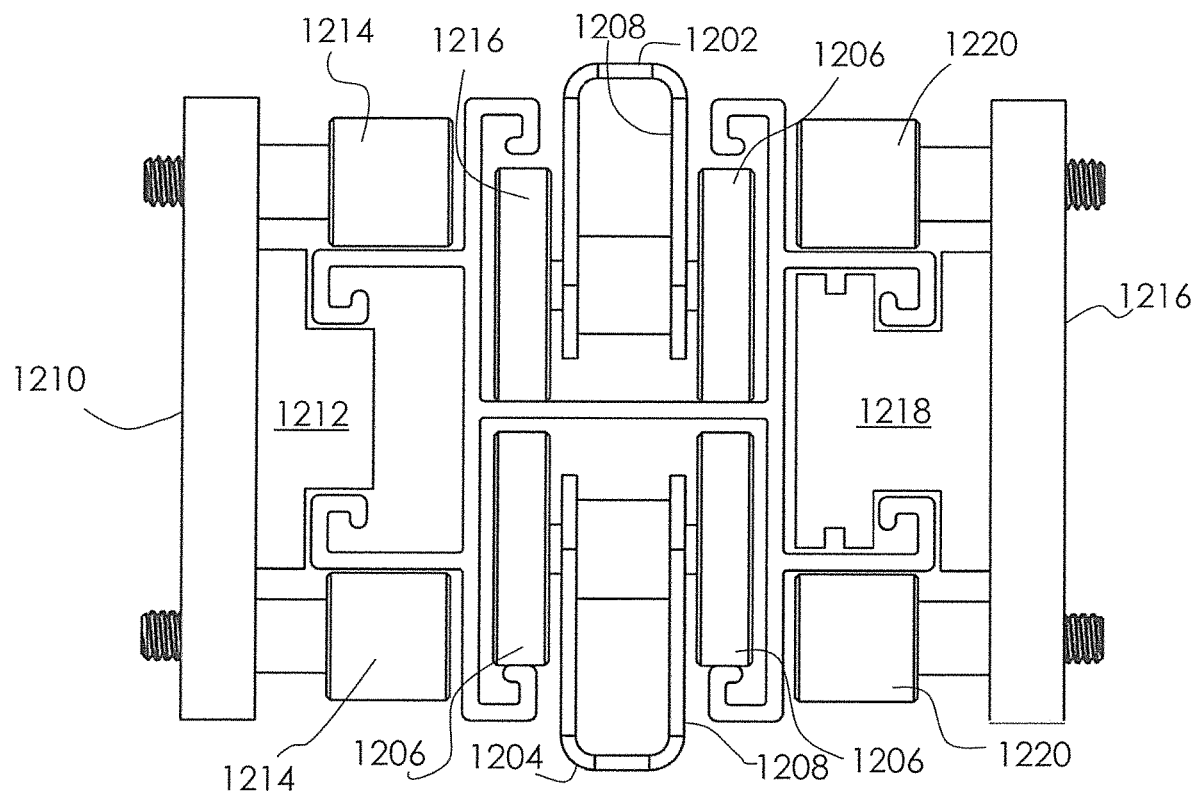
FIGS. 12A and 12B show a perspective and cross section view of exemplary embodiments of roller assemblies, each comprising multiple rollers which may be used with a beam according to the present technology.
Figure 12B:
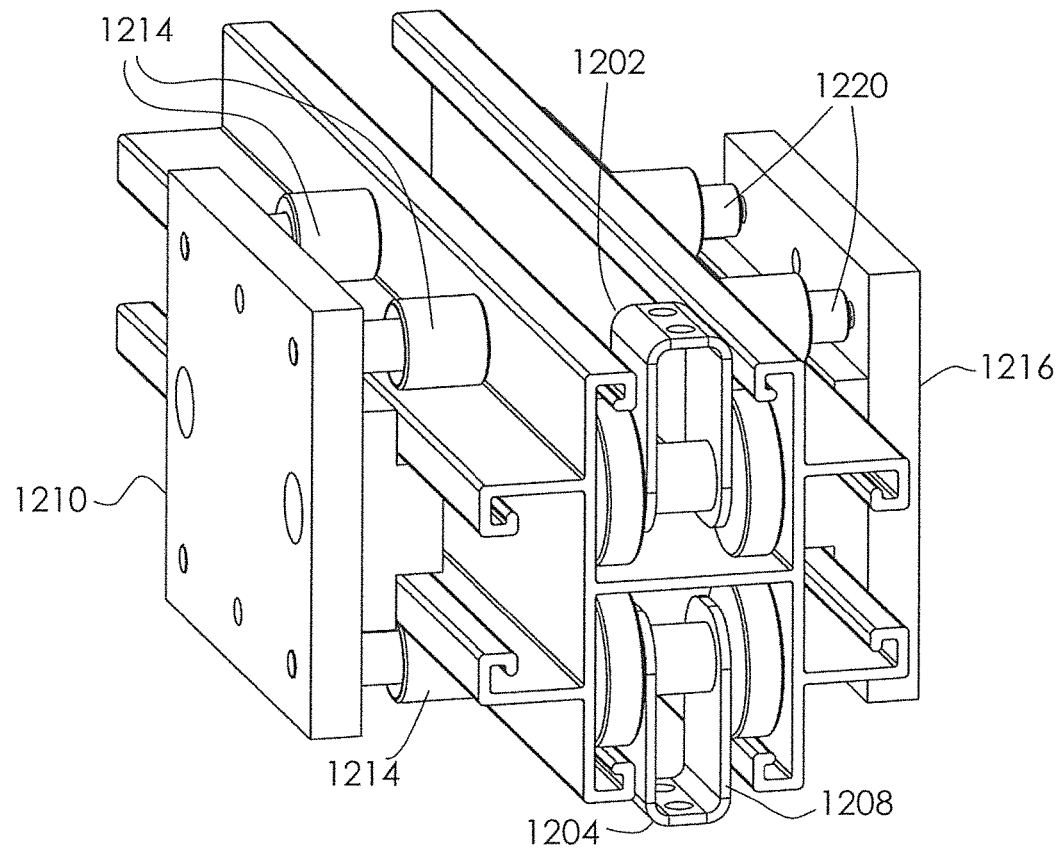

FIGS. 12A and 12B show exemplary roller assemblies, each comprising multiple rollers. Roller assemblies 1202 and 1204 in the first and second channels comprise two roller wheels 1206 which attach to an attachment stem 1208 which extends through the opening and is configured to attach to external devices, for example the arm of a car lift, an elevator cabin, or a sliding door. The roller wheels are positioned between the third portions of the flanges and the back inner surfaces of the channel, and depending on the orientation of the beam and/or load on the attachment stem, will roll on either the third portion or the back inner surface.

Roller assembly 1210 is positioned in the third channel and comprises a guide 1212 similar to the free guide shown in FIG. 8A and further comprises rollers 1214 positioned on either side of the second channel in the inward corners defined by the outer side surfaces of adjacent channels. The rollers are configured to roll against the outer side surfaces.

Roller assembly 1216 is positioned in the fourth channel and comprises a guide 1218 similar to the trapped guide shown in FIG. 9A, which is captured within the channel. The roller assembly 1216 further comprises rollers 1220 positioned on either side of the second channel in the inward corners. The rollers are configured to roll against the outer side surfaces.

Figure 13A:
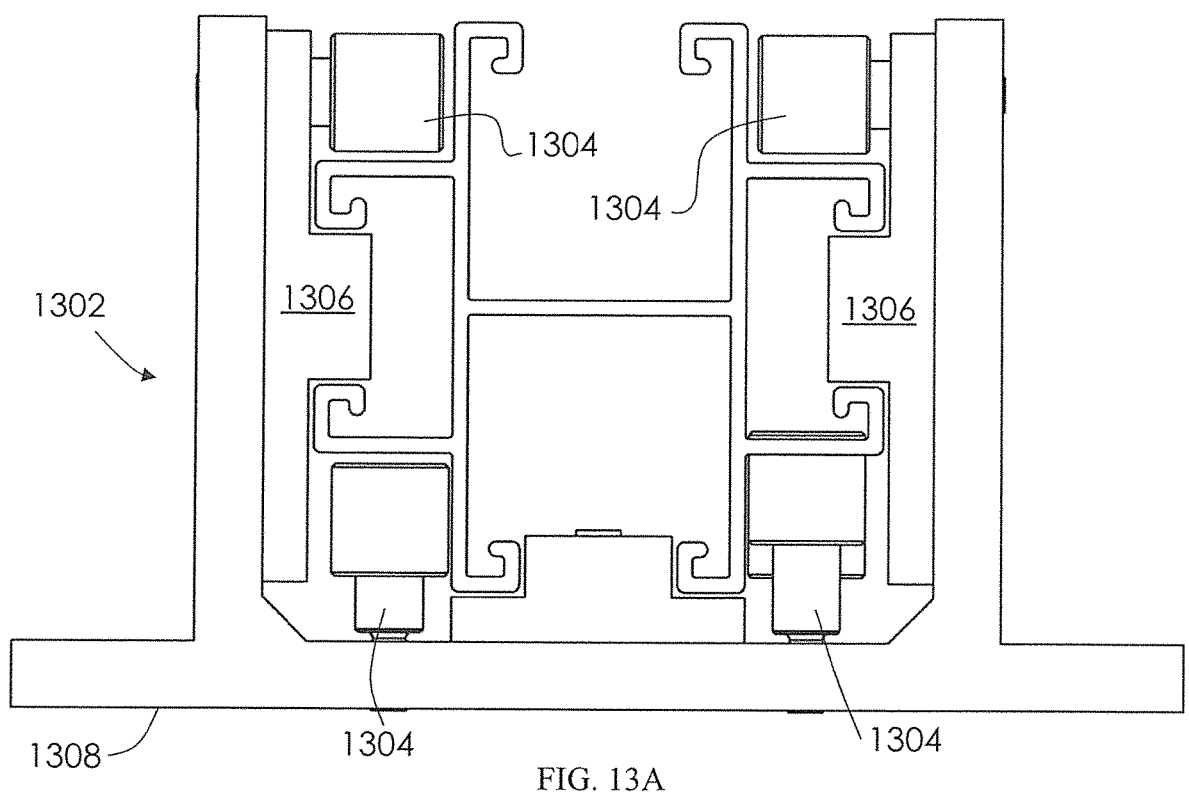
FIGS. 13A and 13B show a perspective and cross section view of an embodiment of a roller/guide assembly which may be used with a beam according to the present technology.
Figure 13B:
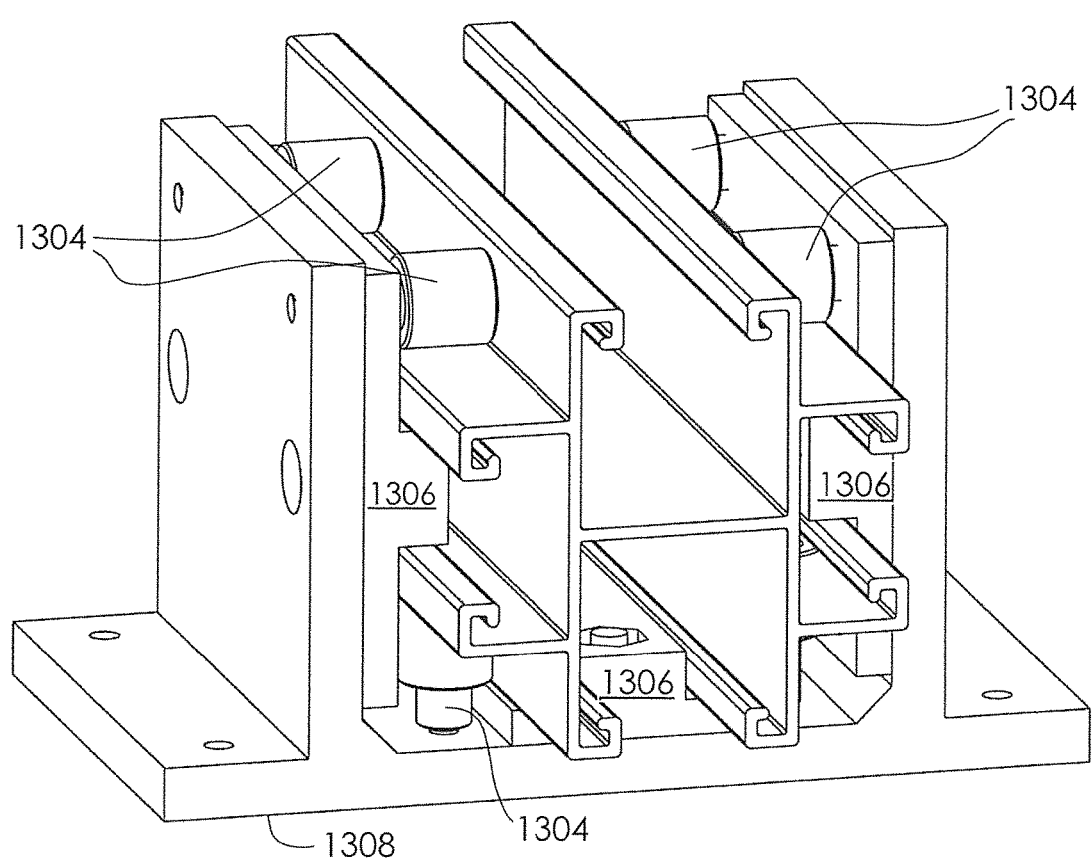

In embodiments, carrier brackets may be coupled to a plurality of guides and a plurality of rollers engaging a plurality of surfaces of a plurality of channels. For example, FIGS. 13A and 13B show a roller assembly 1302 including rollers 1304 and guides 1306 configured to be received in a plurality of the channels of a beam. As shown the roller assembly 1302 comprises a u-shaped bracket 1308. The guides 1306 are received in three of the four channels. The rollers 1304 include a first pair configured to roll against the outer side surface of the third and fourth channels in the inward corners adjacent to the first channel and a second pair configured to roll against the outer side surfaces of the second channel. As shown, the pairs of rollers have perpendicular axes of rotation which is beneficial in providing alignment and load support in various loading conditions from various directions. Similarly, the guides of the roller assembly 1302 provide a plurality of surfaces facing different directions and contacting complementary surfaces of the beam to also provide alignment and load support in various loading conditions from various directions.

Figure 14A:
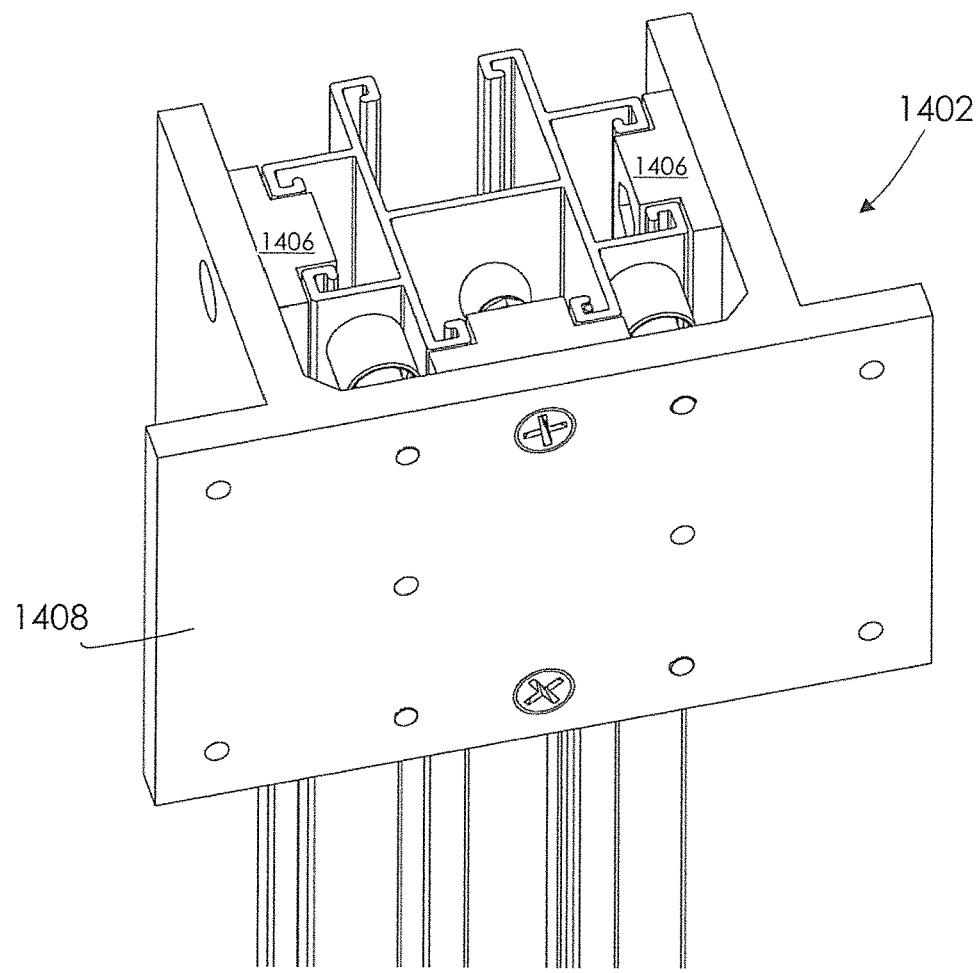
FIGS. 14A and 14B show a perspective and cross section view of an embodiment of a roller/guide assembly with an actuator which may be used with a beam according to the present technology.
Figure 14B:
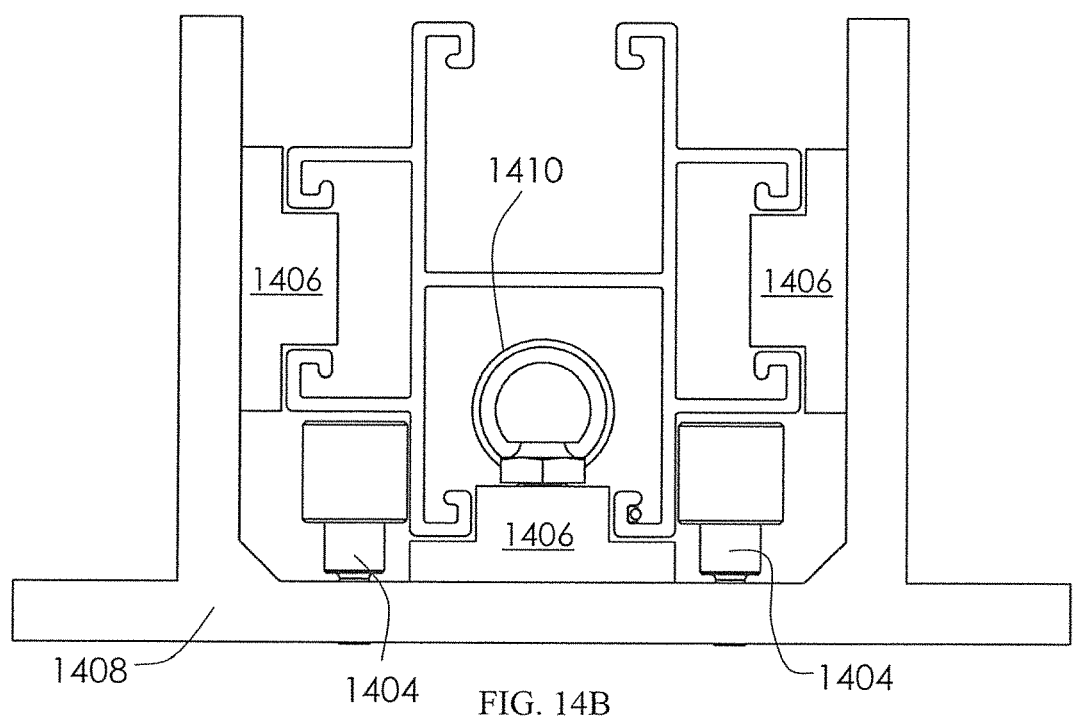

FIGS. 14A and 14B show a roller assembly 1402 including rollers 1404 and guides 1406 configured to be received in a plurality of the channels of a beam. As shown the roller assembly 1402 comprises a u-shaped bracket 1408. The guides 1406 are received in three of the four channels. The rollers 1404 are configured to roll against the outer side surfaces of the second channel. The guide 1406 in the third channel is attached to a linear actuator 1410.

The guides, rollers, and assemblies shown herein are exemplary embodiments, and in other embodiments, any combination of the rollers, guides, brackets and actuators may be used with any of the beams including the channels as disclosed herein.

Figure 16A:
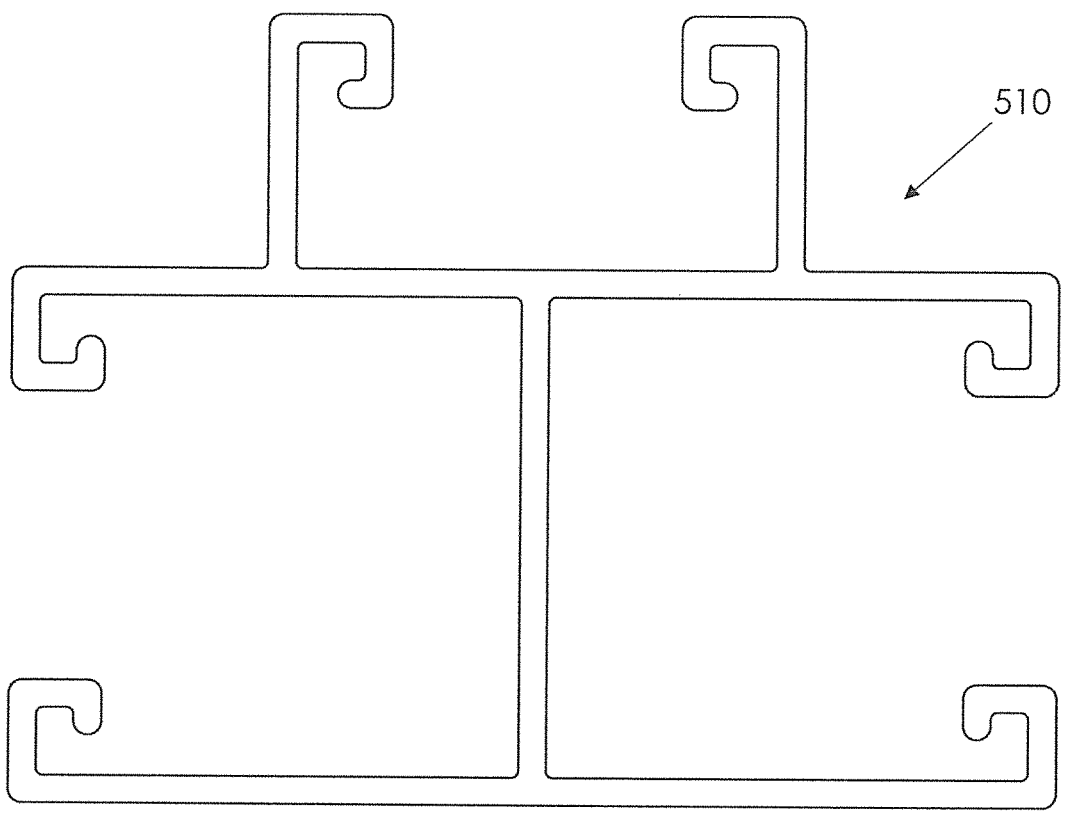
FIG. 16A shows a cross section view of an embodiment of a beam 510 according to the present technology in a "T" shape.
Figure 16B:
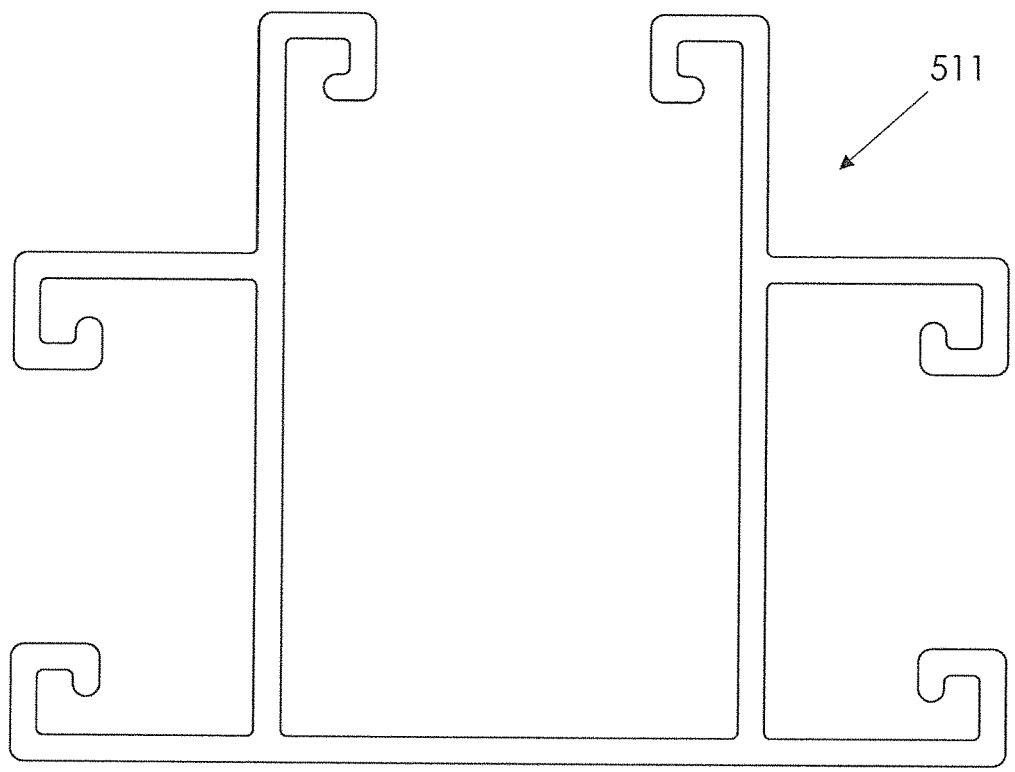
FIG. 16B shows a cross section view of an embodiment of a beam 511 according to the present technology in a "T" shape.
Figure 16C:
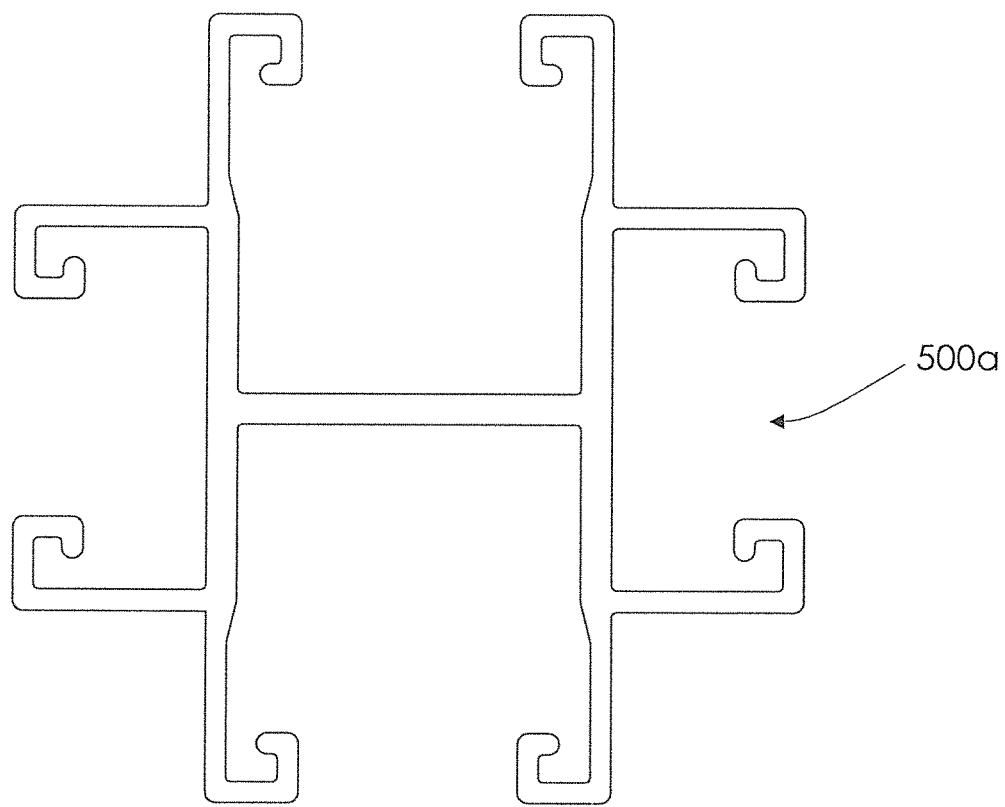
FIG. 16C shows a cross section view of an embodiment of a beam 500a according to the present technology with variable thickness walls.
Figure 16D:
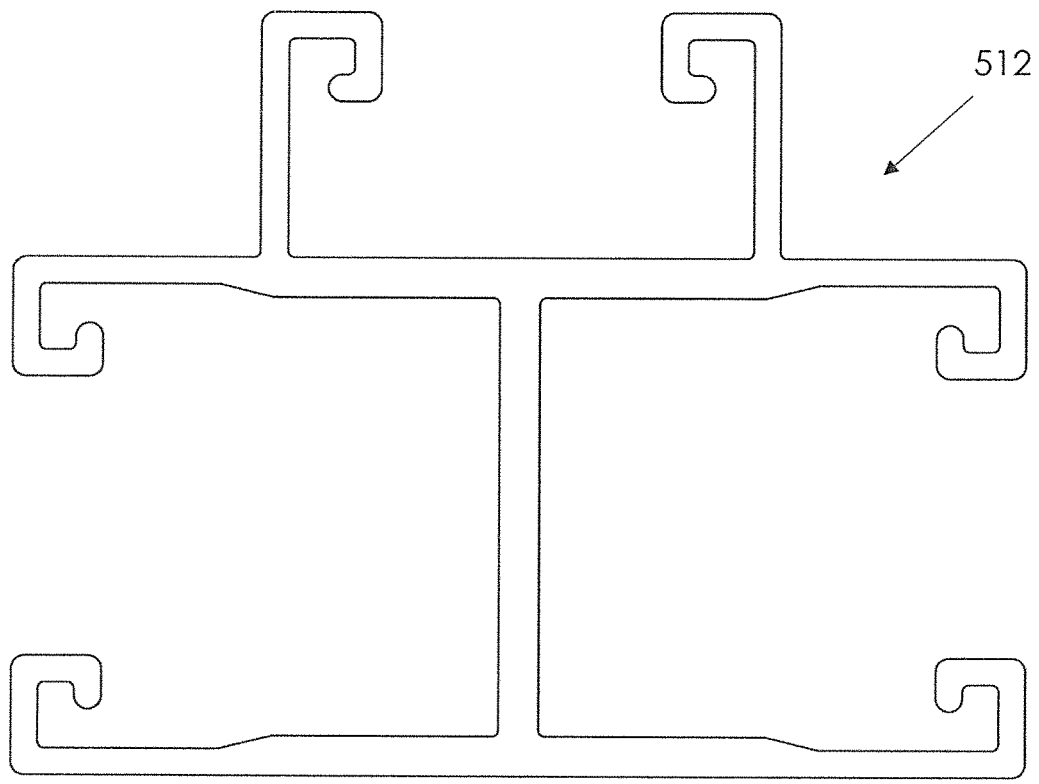
FIG. 16D shows a cross section view of an embodiment of a beam 512 according to the present technology with variable thickness walls in a "T" shape.
Figure 16E:
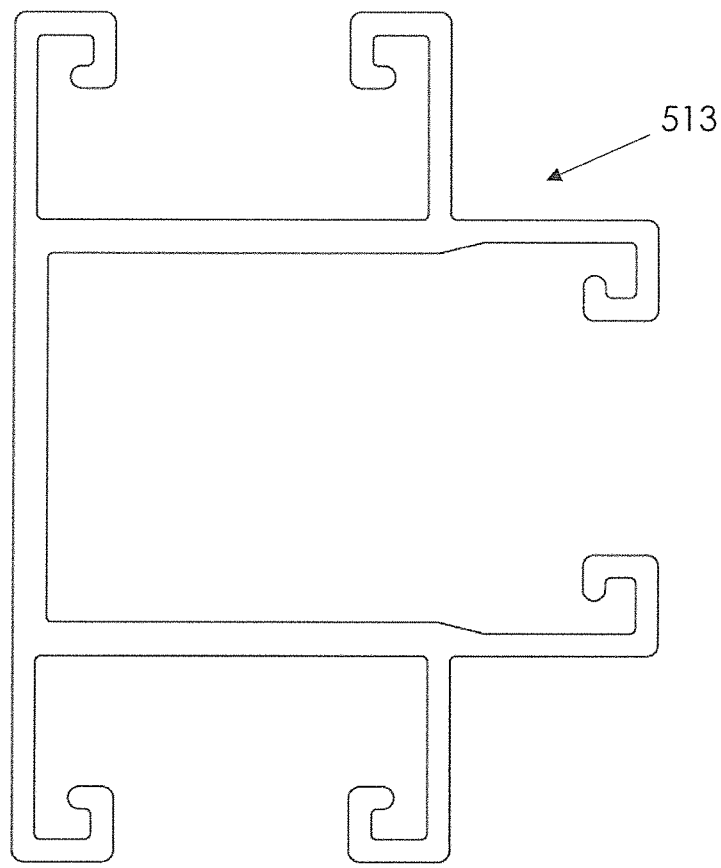
FIG. 16E shows a cross section view of an embodiment of a beam 513 according to the present technology in a "T" shape and thicker inner walls.
Figure 16F:
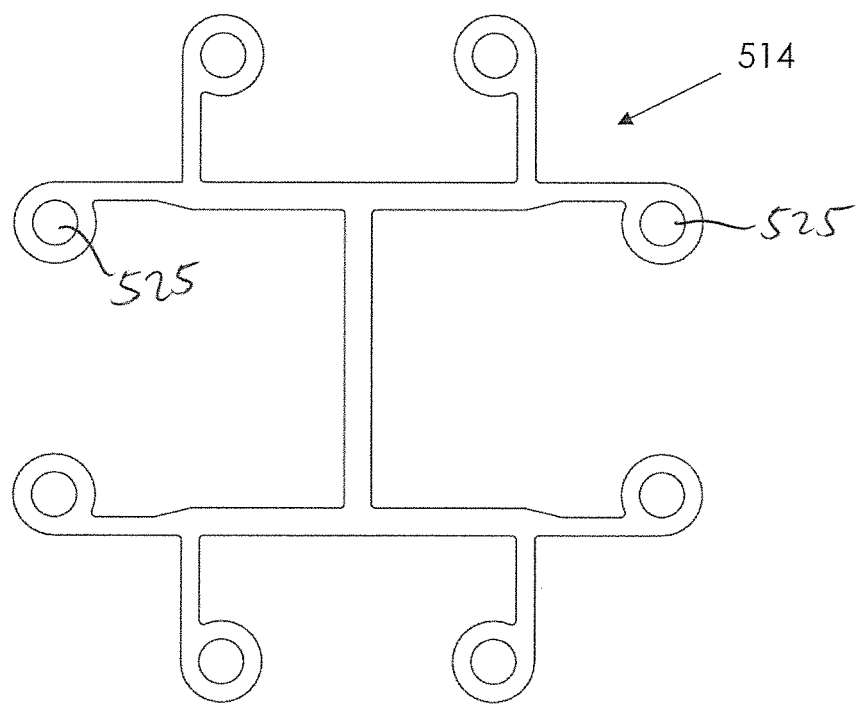
FIG. 16F shows a cross section view of an embodiment of a beam 514 according to the present technology with tubular flanges.

In embodiments beams may include any number of channels. For example, a beam may have one, two, three or more channels. As disclosed above, in embodiments each of the plurality of channels of a beam may each have the same depth or a different depth than other channels of the same beam. FIGS. 16A-16H show cross sections of embodiments of beams. FIG. 16A shows a beam with three channels including two deep channels opposing each other with one shallower channel on the side to form a T-shaped cross section. This configuration may be used with two linear actuators in the deeper channels. FIG. 16B shows a beam with three channels including one deep central channel and two shallower channels on either side of the central channel to form a T-shape cross section. This configuration may be used with a single linear actuator in the deeper channel coupled to a carrier bracket with guides and/or rollers engaging surfaces of the shallower channels. FIGS. 16C, 16D and 16E show a four channel and a three channel cross section with varying wall thickness. In embodiments, flanges may be tubular and provide circular cross sectioned rolling surfaces, for example as shown in FIG. 16F. Parts such as brackets, plates and actuators can be mounted to the end of the beam by using the holes 525 in FIG. 16F as mounting holes.

Figure 16G:
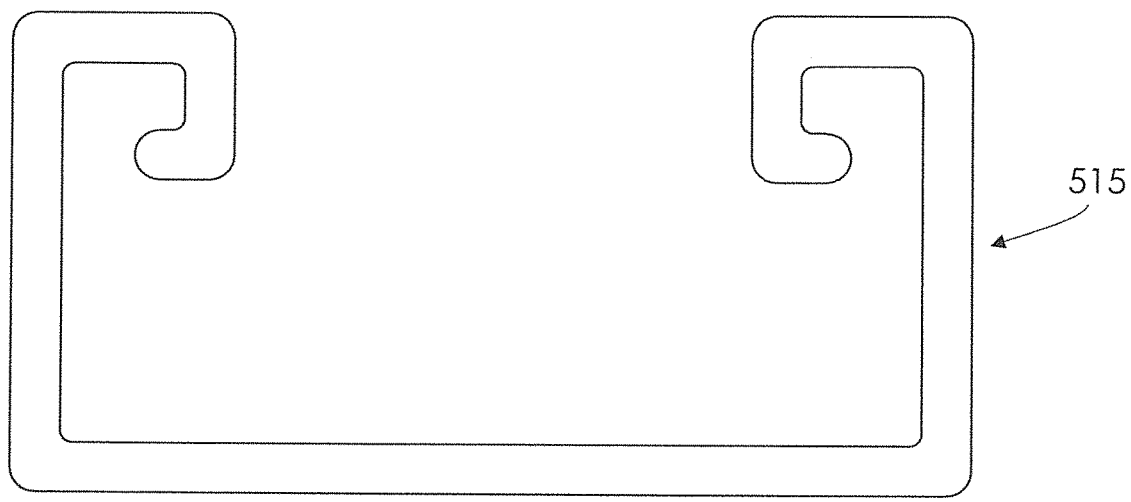
FIG. 16G shows a cross section view of an embodiment of a beam 515 according to the present technology with a single channel.
Figure 16H:
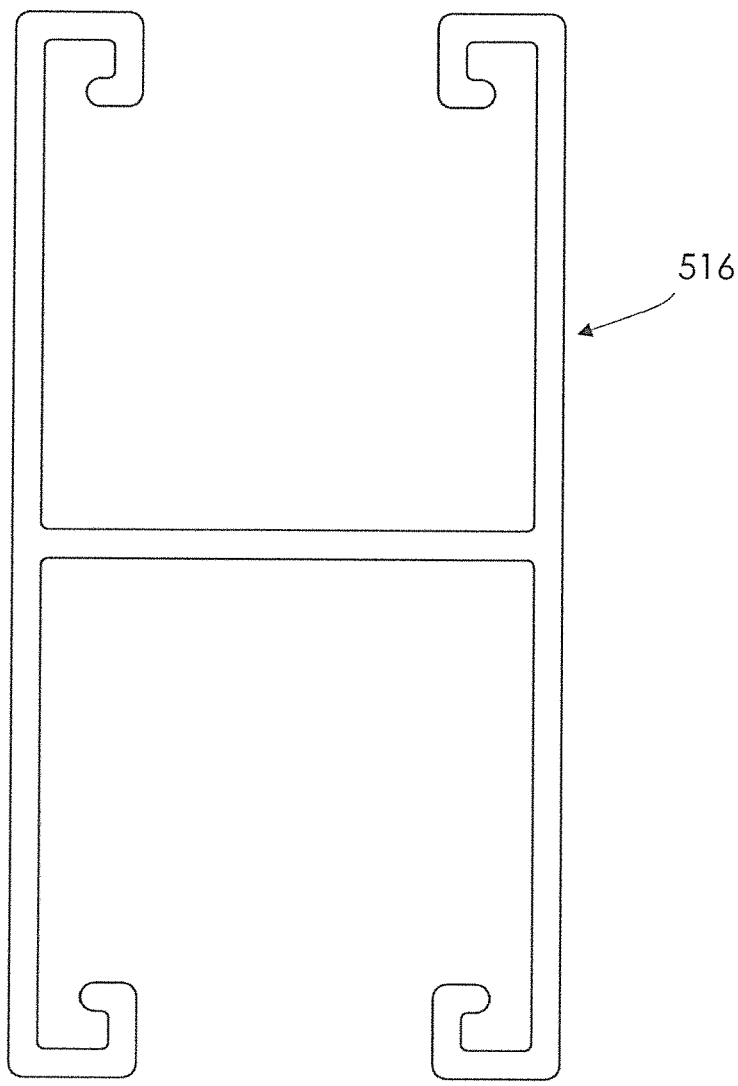
FIG. 16H shows a cross section view of an embodiment of a beam 516 according to the present technology with two opposing channels.
Figure 16I:
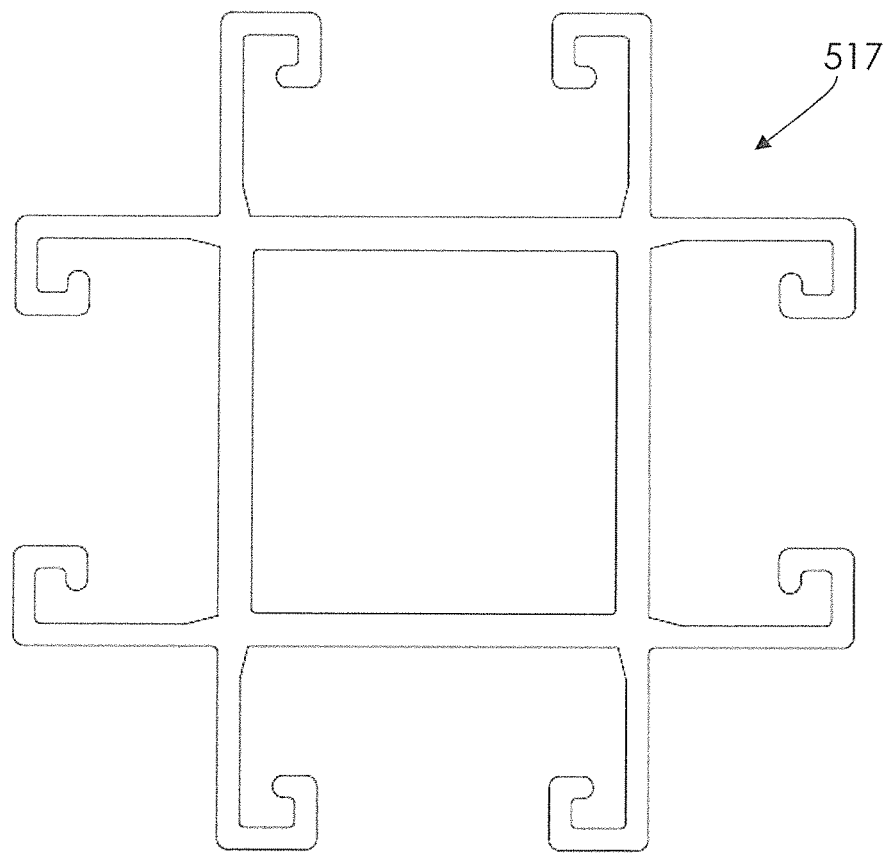
FIGS. 16I-P show cross section views of embodiments of beams 517, 518, 519, 520, 521, 522, 523 and 524 according to the present technology with hollow central portions, with a circular truss 530 provided inside each of the beams 521, 522, 523 and 524.
Figure 16J:
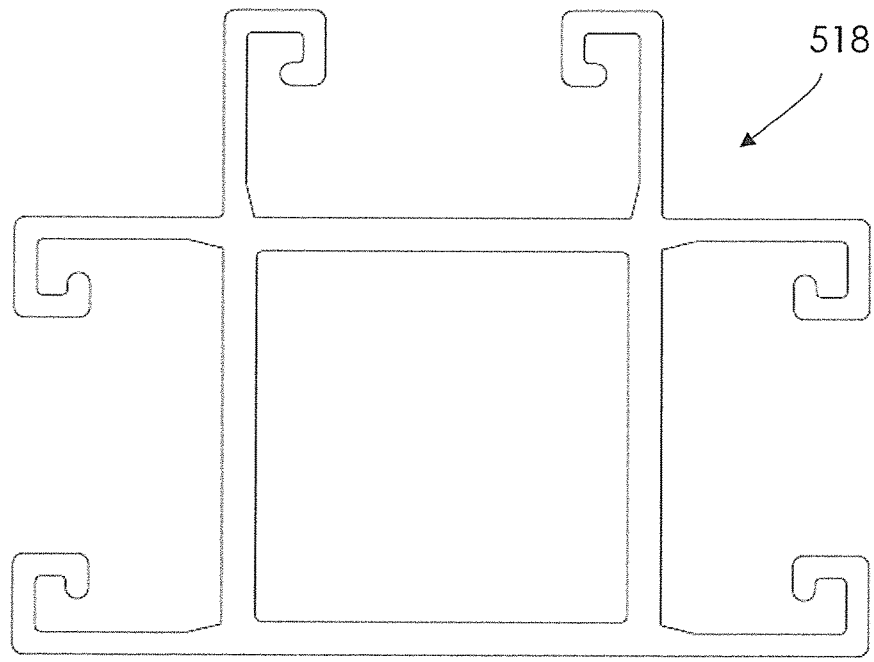
Figure 16K:
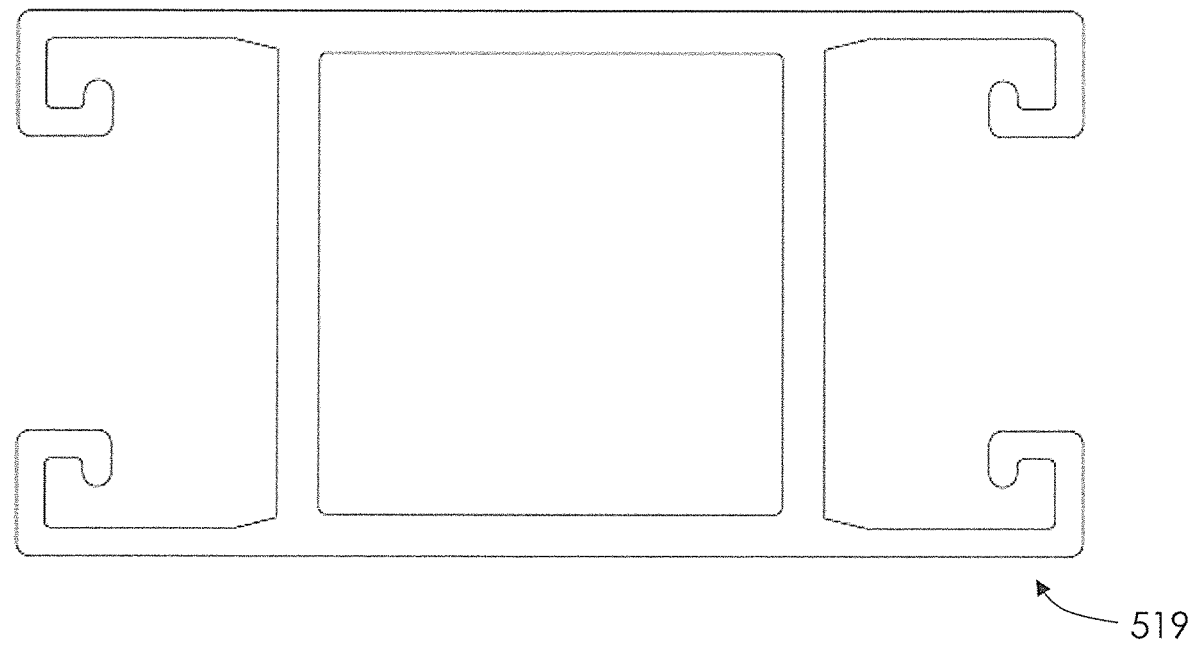
Figure 16L:
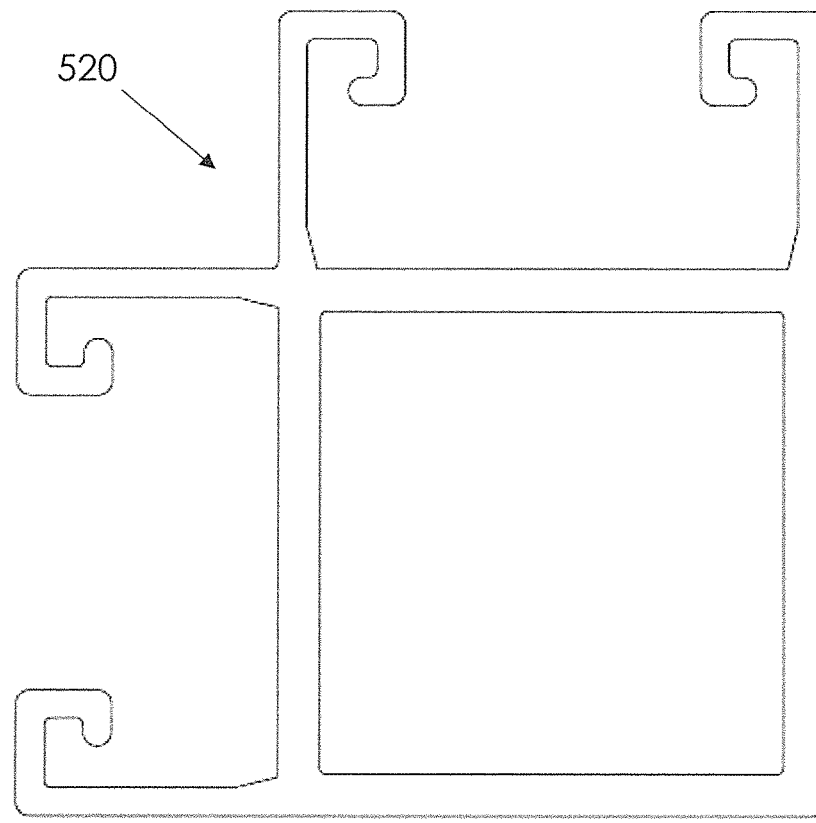
Figure 16M:
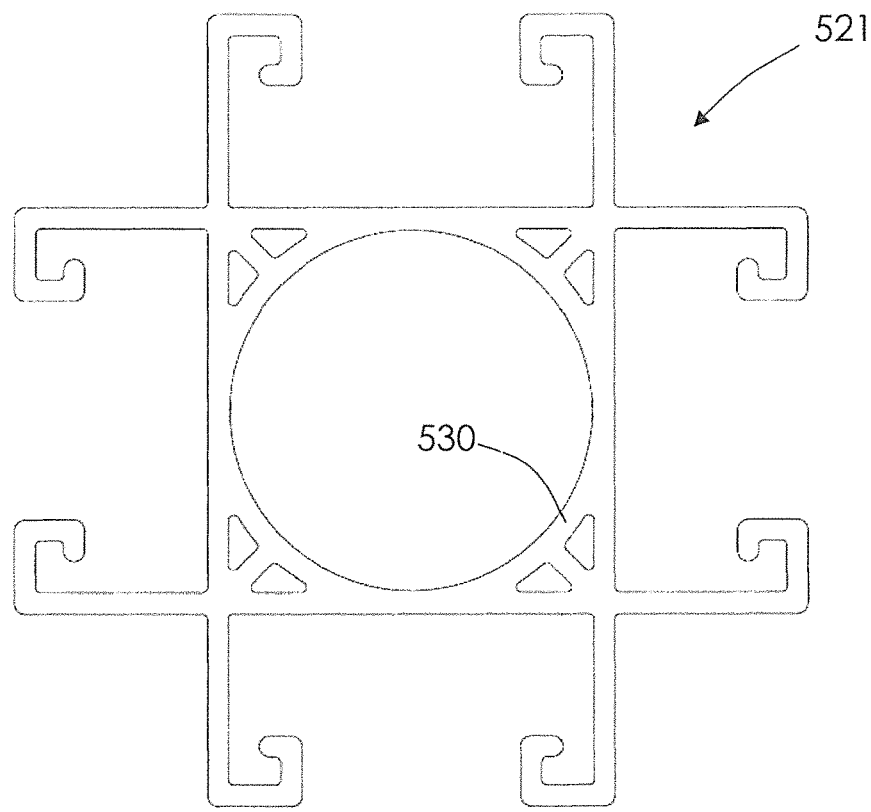
Figure 16N:
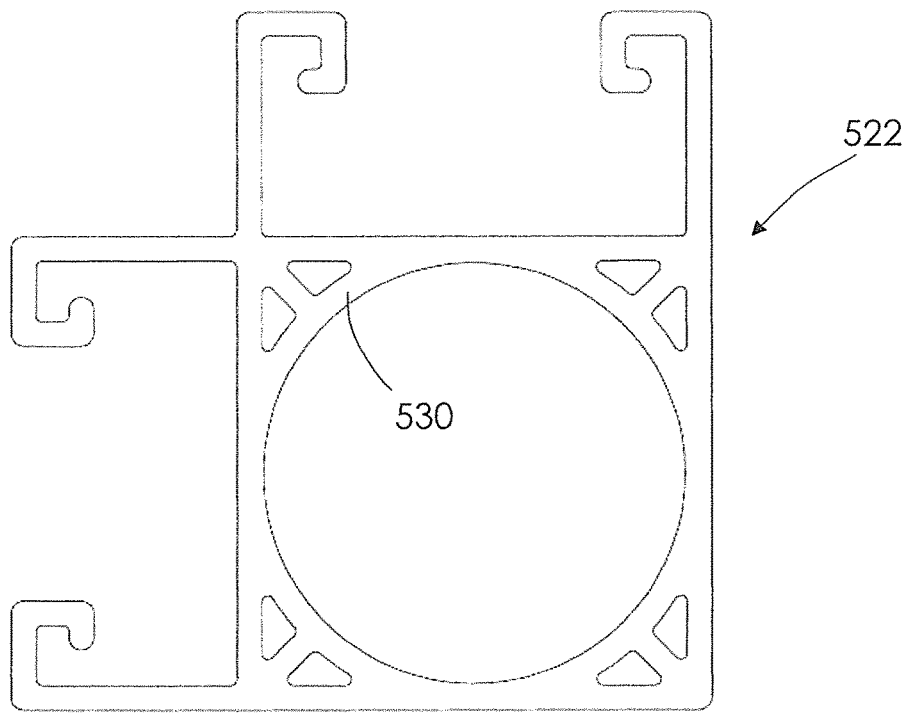
Figure 16O:
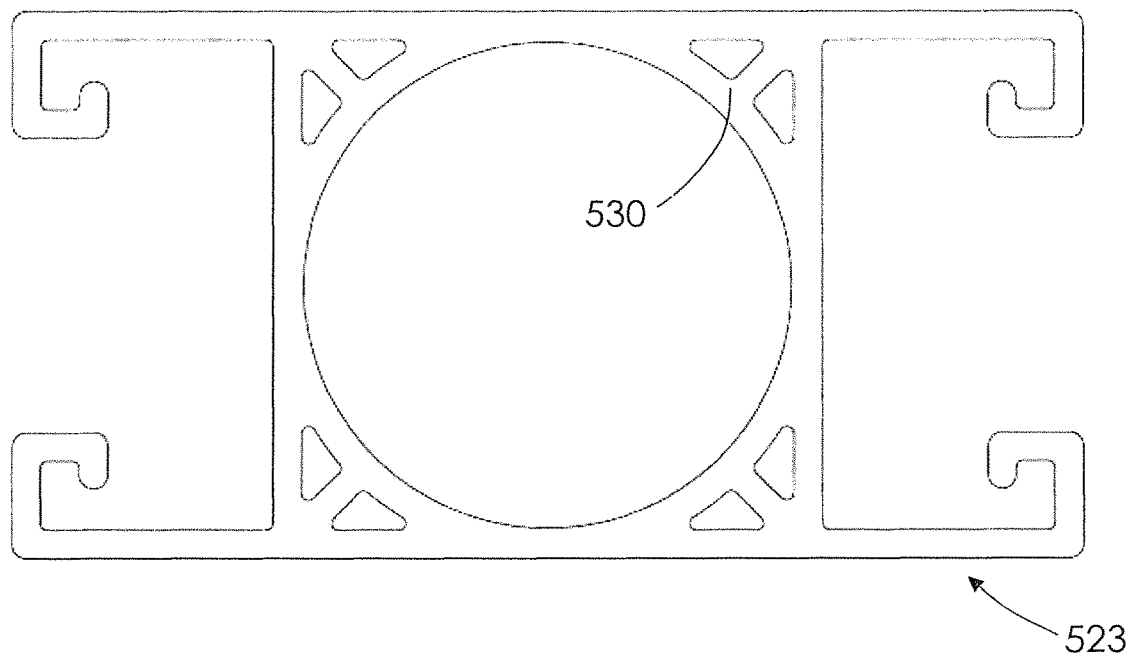
Figure 16P:
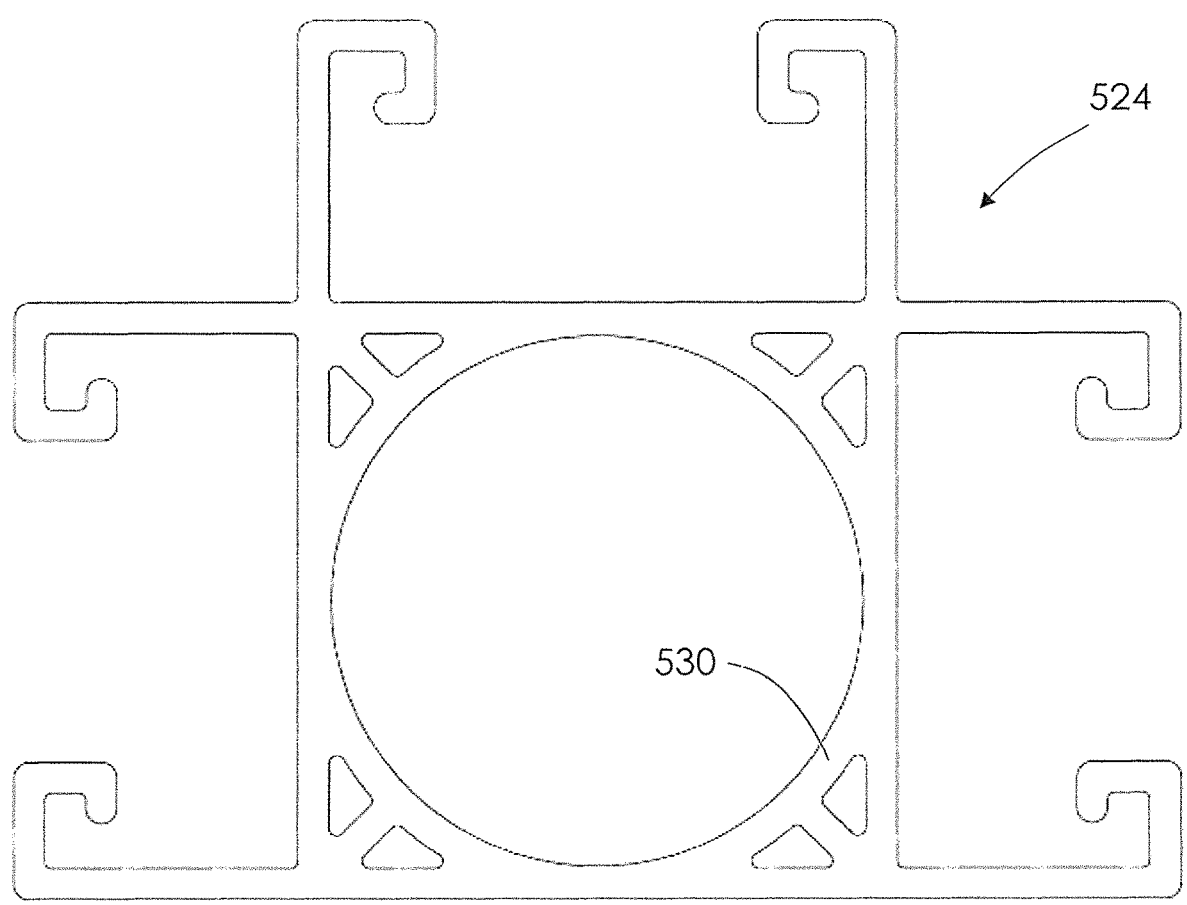

In embodiments a beam may include a single channel, for example as shown in FIG. 16G, which provides the benefits of the rolling and gliding surfaces as discussed above. The single channel may be of any depth and may be sized to accommodate a linear actuator. FIG. 16H shows a beam with two opposing channels. The channels as shown are the same depth but in embodiments may be different depths.

In embodiments, in addition to the channels the cross sections of beam may include a hollow cavity, for example as shown in FIGS. 16I-16L. The structures surrounding the hollow cavities give the beam additional strength to resist bending a buckling without adding excess additional weight. In embodiments, the hollow cavity may include a circular truss to provide additional strength, for example as shown in FIGS. 16M-P.

While the channels shown in the figures are generally oriented at 90 and 180 degrees relative to adjacent channels, in embodiments adjacent channels may be positioned at any orientation from 0-180 degrees.

In embodiments, the beams as disclosed herein may be used in systems for sliding equipment, such as a toolbox or work table in and out of a truck bed in an utility truck, loading and unloading ladders and racks on top of work trucks, home or commercial elevators, guides for linear rolling movement in any direction (e.g. vertical, horizontal, diagonal), structural framing, automatic sliding doors (e.g. for gated communities or commercial buildings), guiding devices for window blinds, and garage door opening systems.

Figure 17:
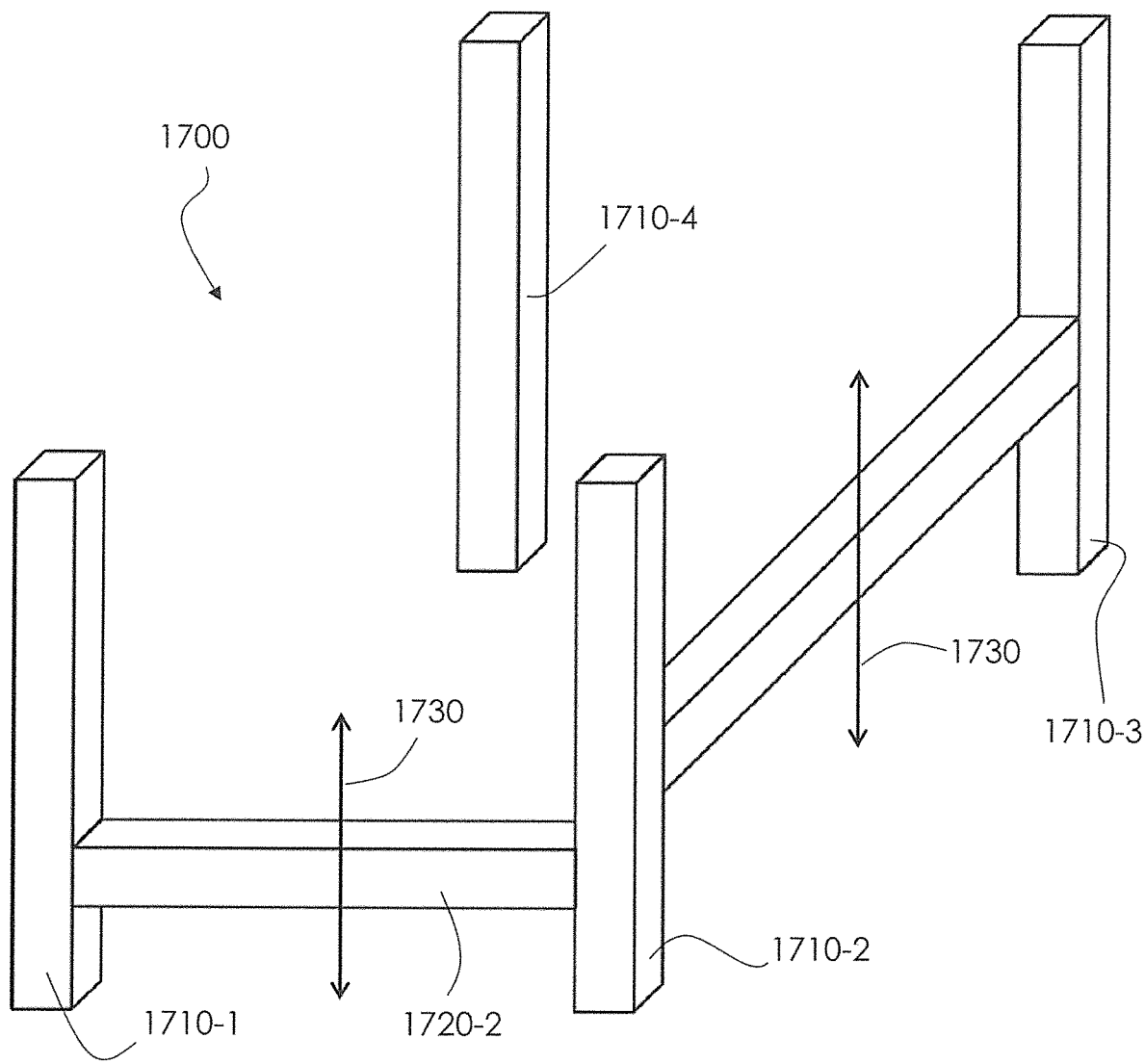
FIG. 17 shows a schematic of a lifting beam assembly according to the present technology.

FIG. 17 shows a schematic view of a system 1700 comprising a plurality of beams 1710-1, 1710-2, 1710-3, and 1710-4. The beams may be any of the cross-sections described above. For clarity purposes the beams are depicted as rectangular prisms, however the beams may be any of the configurations described above.

Between the vertical beams 1710 are horizontal lifting shafts 1720. The horizontal lifting shafts may be beams as disclosed herein, as wells as other type of beams, tubing and structures capable of being suspended by the ends. The horizontal lift shafts may be parts of components that are lifted, for example toolboxes, ladder racks, elevator cabins, forklifts, car lifts, stage risers, adjustable beds, desks, or chairs. The horizontal lifting shafts 1720 may be coupled to the vertical beams 1710 with carrier brackets as described in various embodiments above. For clarity purposes the carrier brackets are not shown in FIG. 17. One or more of the channels of any of the vertical beams 1710 may include a linear actuator coupled to the carrier brackets in order to raise and lower the carrier brackets and horizontal lift shafts, as indicated by the arrows 1730. The vertical beams may be coupled to each other with support braces (not shown) and in embodiments the support braces may couple to the vertical beams with couplings engaging the channels.

Figure 18A:
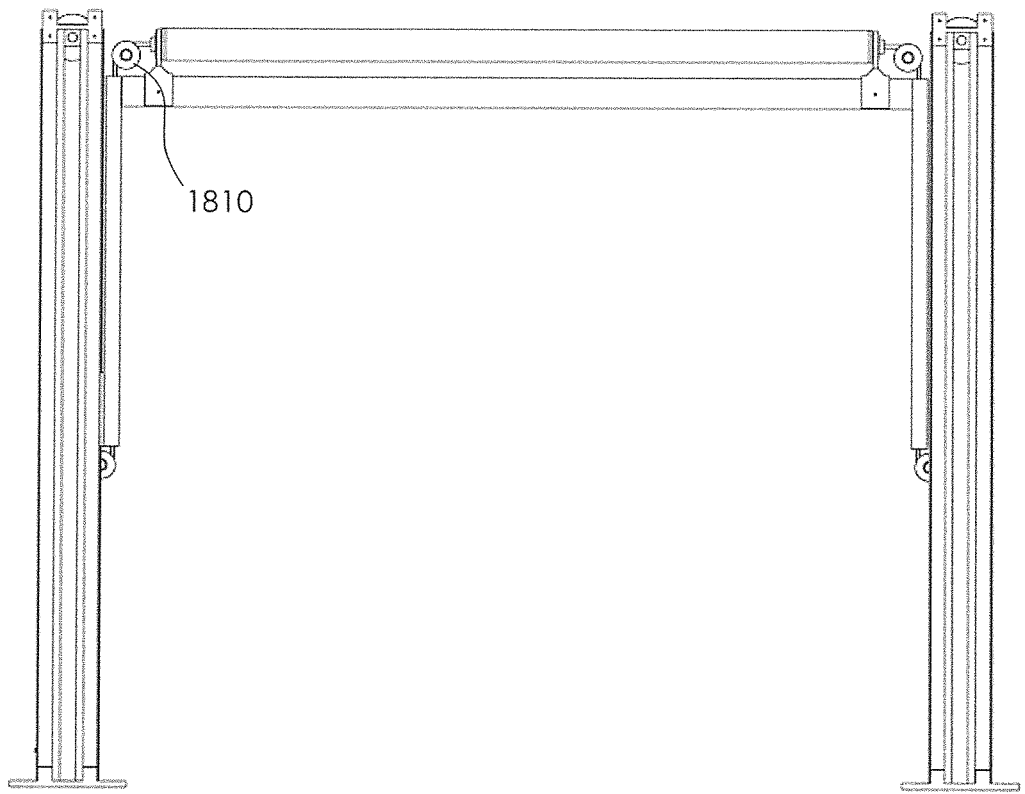
FIG. 18A shows a pulley lifting beam assembly according to the present technology.

In embodiments linear actuators in a plurality of beams may be mechanically synchronized to a single powered motor or multiple powered motors. For example a single motor may be coupled to acme screws in two or more of the beams. Rotating the motor causes a mechanical linkage to simultaneously rotate each acme screw causing carrier brackets coupled to the acme screws to raise or lower in unison. In embodiments, for example as shown in FIG. 18A a linear actuator may be directly coupled to a carrier bracket of one of the beams and the carrier bracket may be linked with pulleys 1810 to carrier brackets in other beams so that each carrier bracket raises and lowers in unison.

Figure 18B:
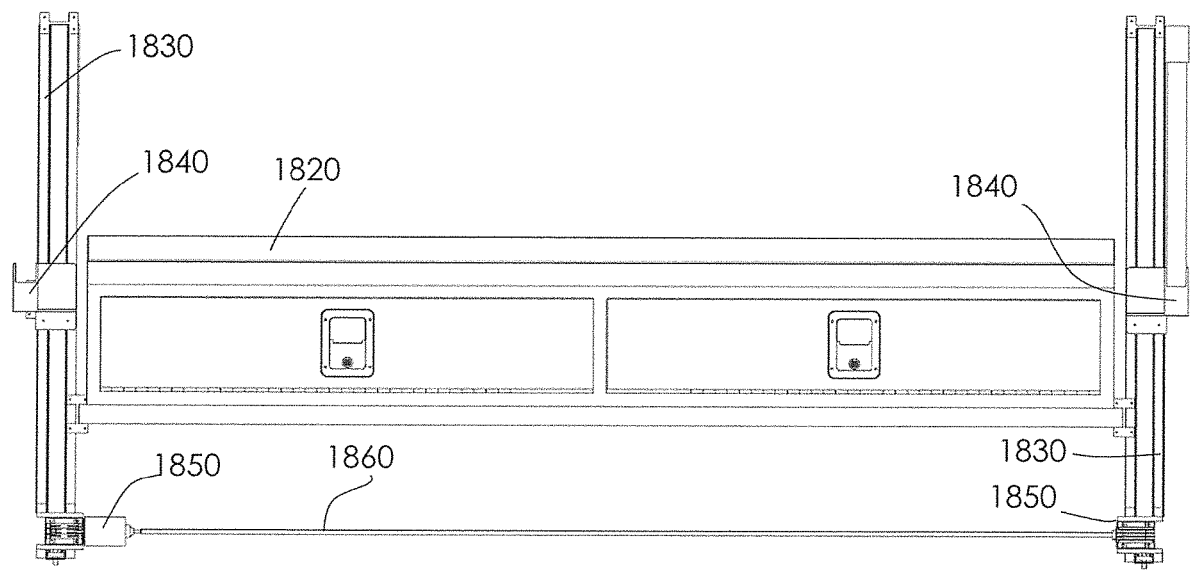
FIG. 18B shows a mechanically synchronized beam assembly according to the present technology.

In embodiments, for example as shown FIG. 18B, a component to be lifted, for example a toolbox 1820, may be coupled to two vertical beams 1830 with carrier brackets 1840 as described above. Each beam 1830 may include a linear actuator with a motor 1850. The motors may be mechanically coupled with a shaft 1860 in order to synchronize the raising and lowering of the carrier brackets so that the toolbox is always horizontal while being vertically translated.

Figure 19:
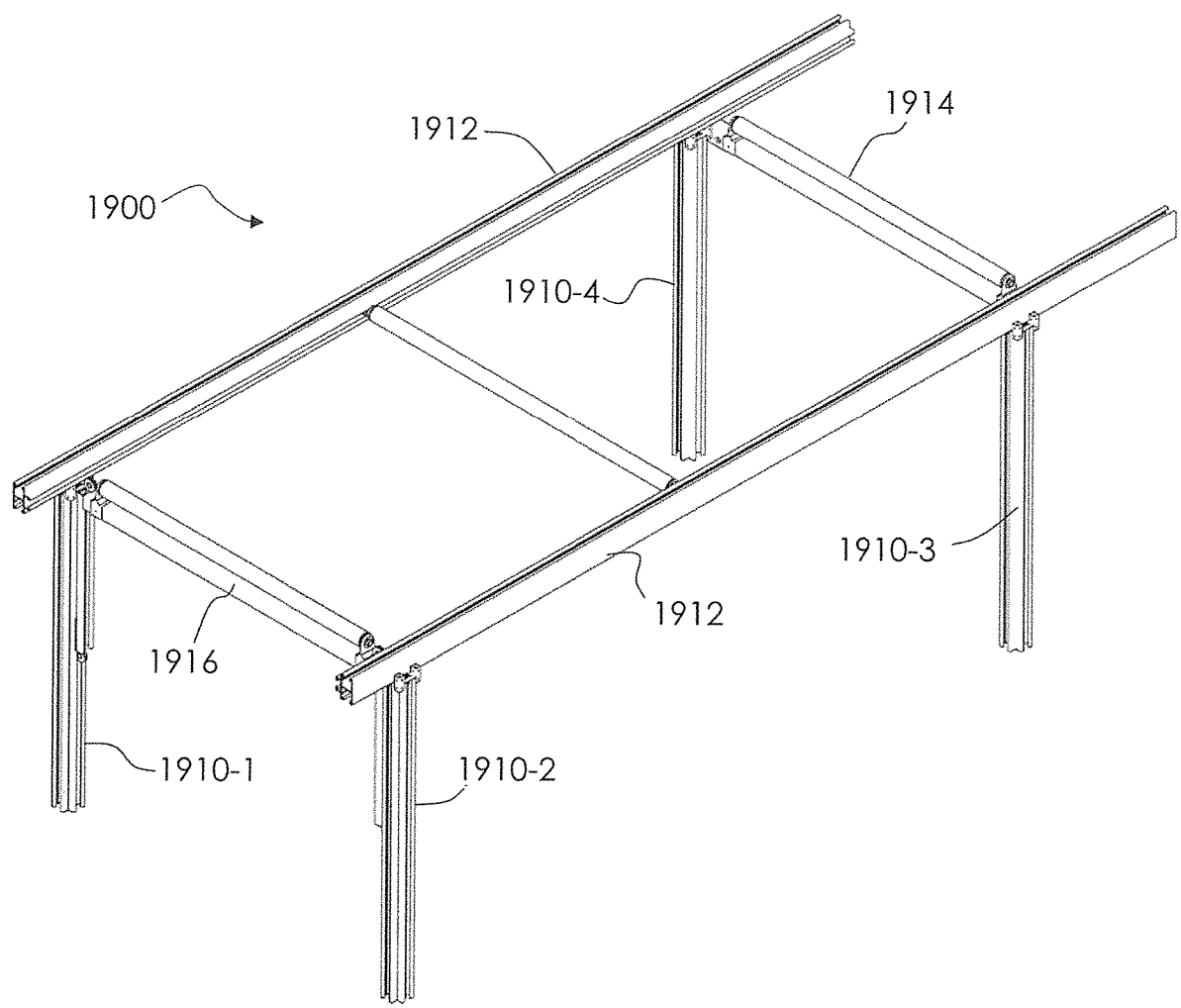
FIG. 19 shows a beam assembly for a utility truck according to the present technology.

FIGS. 19 and 20A-D show an embodiment including four beams that are in a utility truck bed configuration. FIG. 19 shows the assembly without the utility truck for clarity. As shown, the assembly 1900 includes four vertical beams 1910 in a rectangular configuration corresponding to the four corners of the truck bed. The tops of the four beams may be connected with two running rails 1912 extending in the direction of the length of the utility truck. Further, stationary cross bars 1914 may extend between the running bars. FIGS. 20A-D shows the assembly 1900 installed in a utility truck 2000. The bottoms of the beams may be fastened to the truck bed with mounting brackets. The entire weight of the ladder rack, ladder loader, and its loads is transferred through the four vertical posts 1910 and then directly to the truck bed.

Figure 20A:
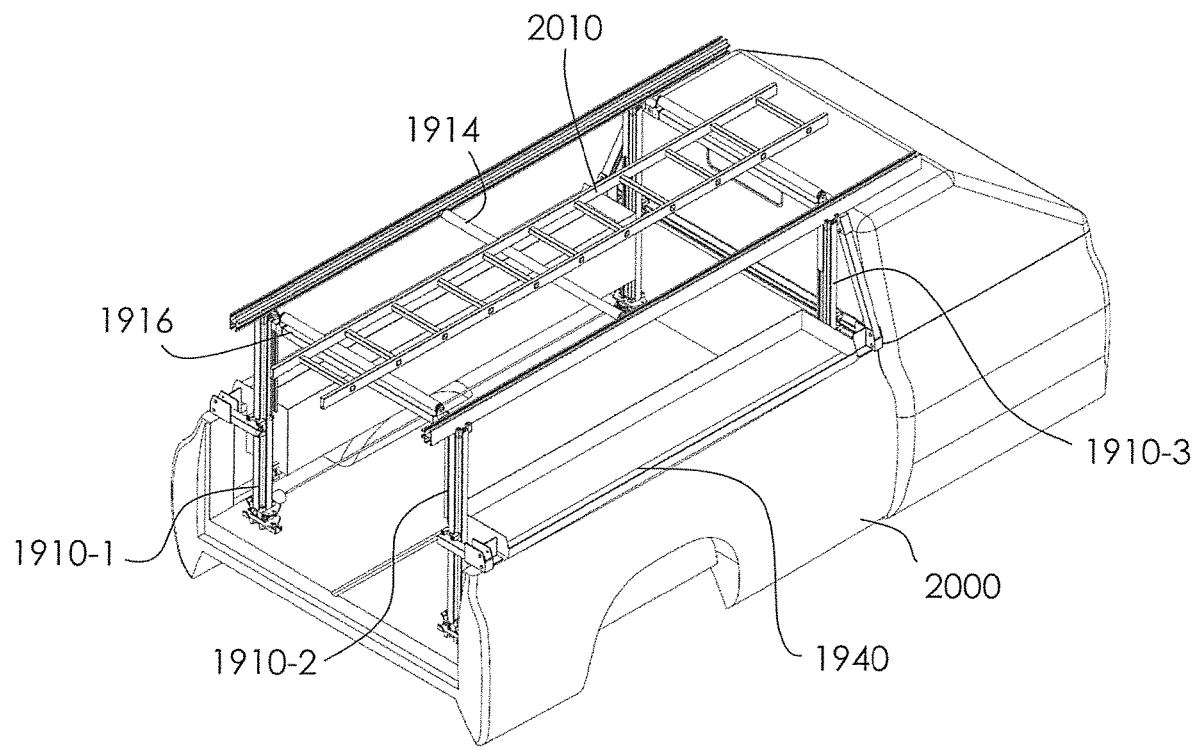
FIGS. 20A-20D show the beam assembly of FIG. 19 installed in a utility truck in various configurations.
Figure 20B:
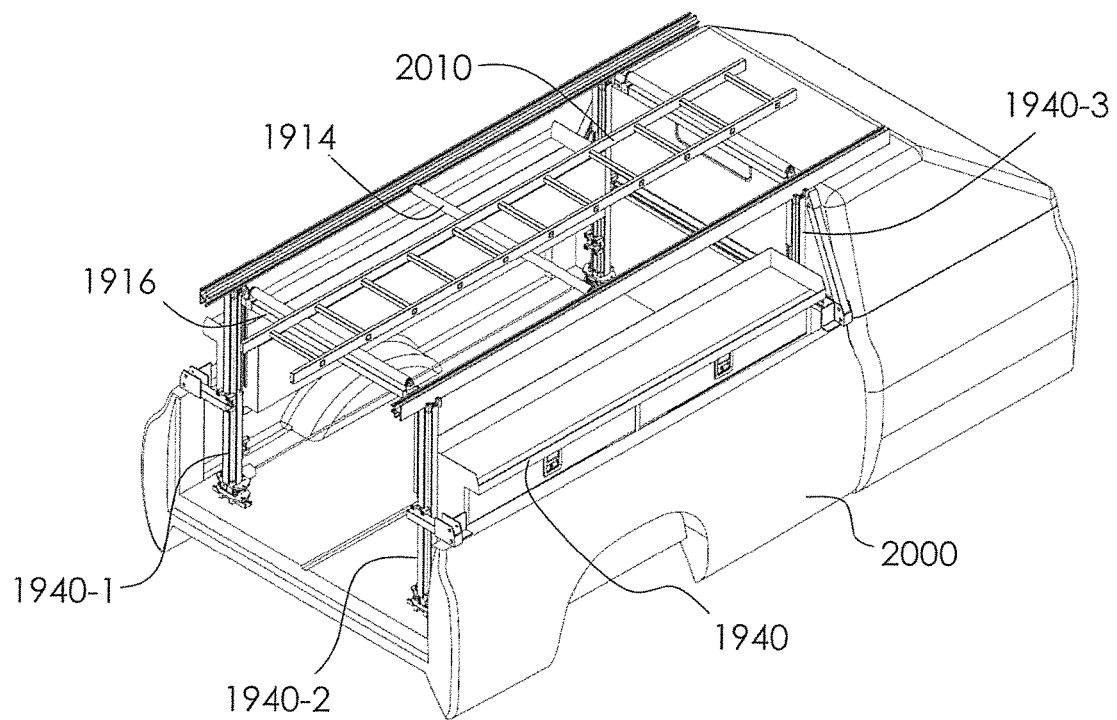

In embodiments, the assembly may include one or two toolboxes 1940 extending along the sides of the truck bed between two of the vertical beams 1910-2 1910-3. The toolboxes 1940 are coupled to carrier brackets on either end of the toolbox. The carrier brackets are slidably coupled to one or more channels of the beams 1910-2 1910-3, for example as discussed above regarding guides and rollers. One or both of the carrier brackets is coupled to a linear actuator disposed in one of the channels of the beams 1910, as shown for example in FIGS. 7A, 7B, 10A, 10B, 14A and 14B. A controller is connected to the linear actuators allowing a user to selectively cause toolboxes 1940 to be raised and lowered. FIG. 20A shows a lowered position of the toolboxes 1940. As shown, the toolboxes 1940 are stowed so at least a lower portion is below the rim of the truck bed. The door of the toolbox 1940 may be on the side that faces the side of the truck bed so that when in the lowered position tampering of the door is prevented because it is blocked by the side of the truck bed, as shown in FIG. 20A. This is gives additional security compared to a lock alone of preventing theft of tools from the toolbox. FIG. 20B shows a raised position of the toolboxes 1940. In the raised position the bottom portions of the toolboxes are raised above the rim of the truck bed so that the door of the tool box is accessible.

Figure 20C:
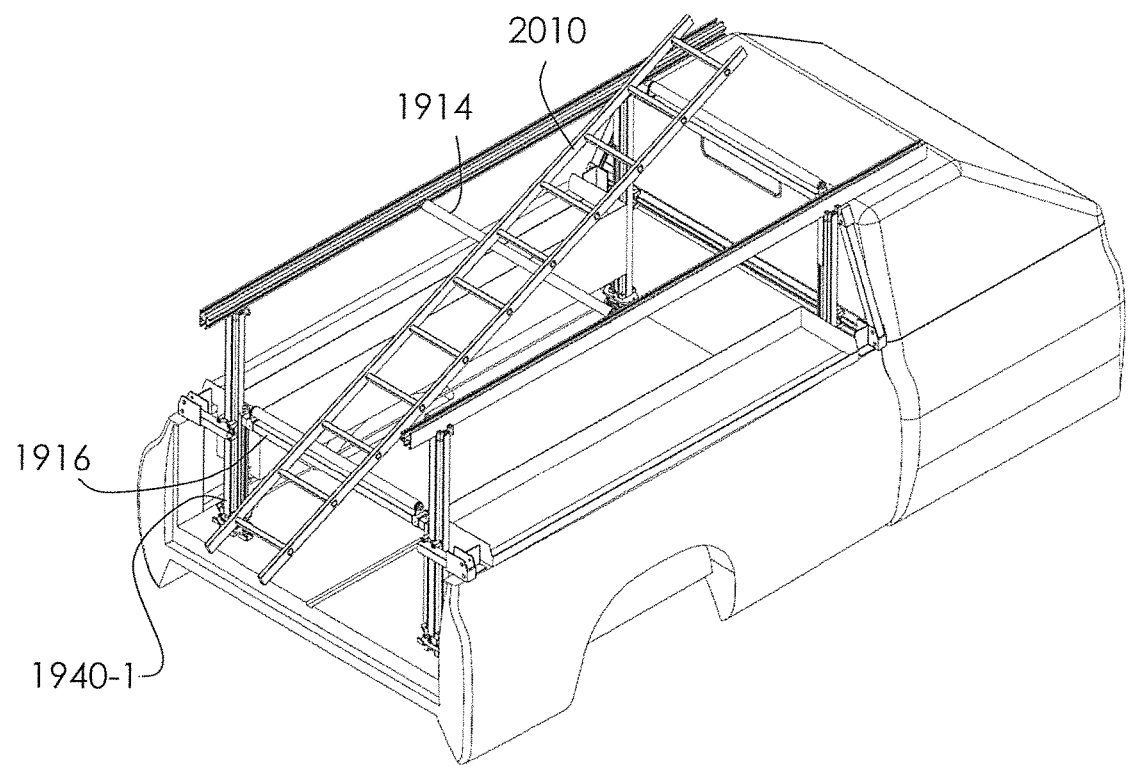

In embodiments, assemblies may include ladder racks with ladder lifts. The ladder racks and lifts allow a user to lean a ladder 2010 against the stationary middle crossbar 1914 of the ladder rack and the assembly automatically lifts the ladder 2010 to a stowed horizontal position. As shown in FIG. 19, the assembly may include an aft crossbar 1916 coupled to the aft vertical beams 1910-1 1910-2. The aft crossbar 1916 is coupled to one of more linear actuators in channels of the vertical beams 1910-1 1910-2 with carrier brackets for example as disclosed above and shown in FIGS. 7A, 7B, 10A, 10B, 14A and 14B. The linear actuators can raise and lower the aft crossbar 1916. As shown in FIG. 20C, the aft crossbar 1916 may be in a lowered position. In the lowered position a user is able to place a ladder 2010 at an angle onto the aft crossbar 1916 and the mid crossbar 1914. The aft crossbar 1916 may be raised as shown in FIGS. 20A and 20B so that the ladder 2010 is in a raised horizontal position. This is beneficial to conventional methods of raising a ladder onto a stationary rack of a truck wherein a user would manually lift the ladder onto a stationary rack.

Figure 20D:
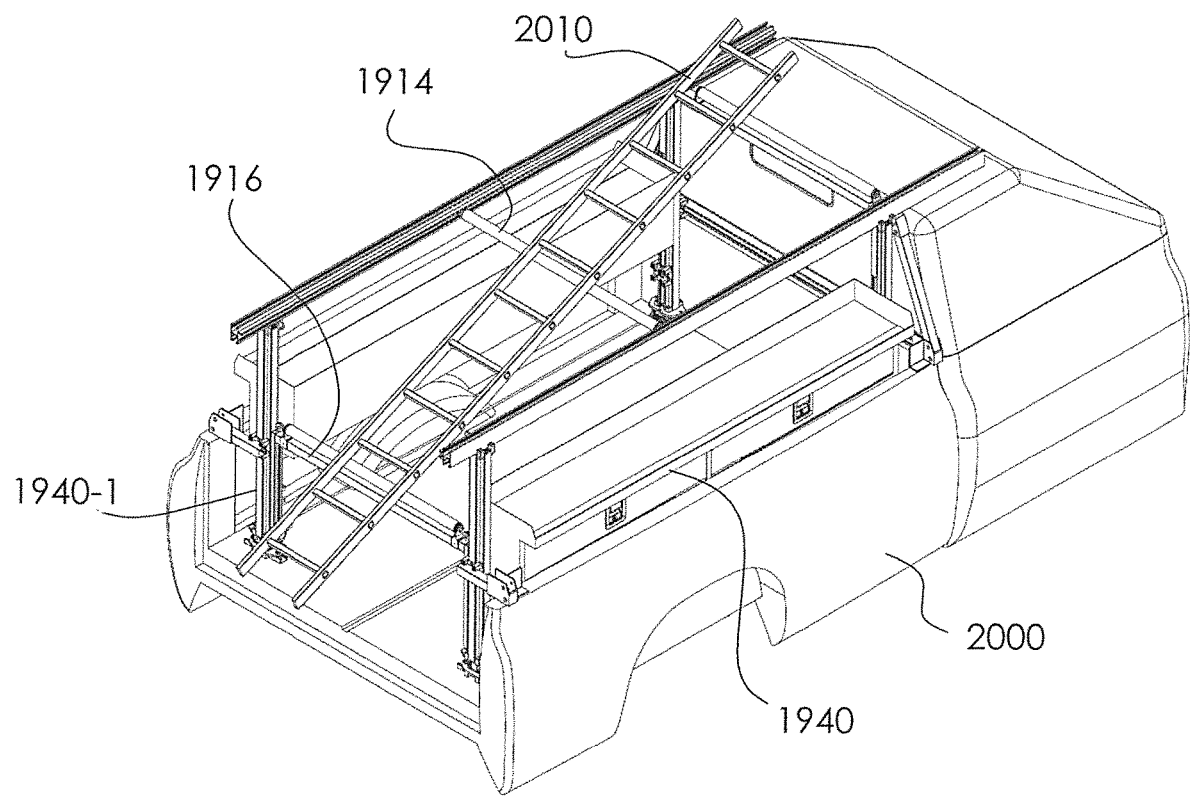

In embodiments, the ladder rack and toolboxes may each be independently controlled to be raised and lowered with the controller actuating dedicated linear actuators for each component. In embodiments two of more the components may be synchronized either mechanically or electrically. For example, the linear actuators and controller may be configured to raise and lower the toolboxes simultaneously, and may also be configured to raise and lower the ladder rack independently of the toolboxes. In embodiments the linear actuators and controller may be configured to raise the toolboxes 1940 to an accessible position while simultaneously lowering the aft crossbar 1916 of the ladder rack to a position where the ladder 2010 is accessible, for example as shown in FIG. 20D. In this configuration the synchronization translates different components of the system in opposite directions. This is beneficial because the ladder is accessible in the lowered position while the toolboxes are accessible in the raised position. In embodiments a single powered linear actuator is mechanically linked to raise and lower all of the components in the same or opposite directions simultaneously.

Figure 21A:
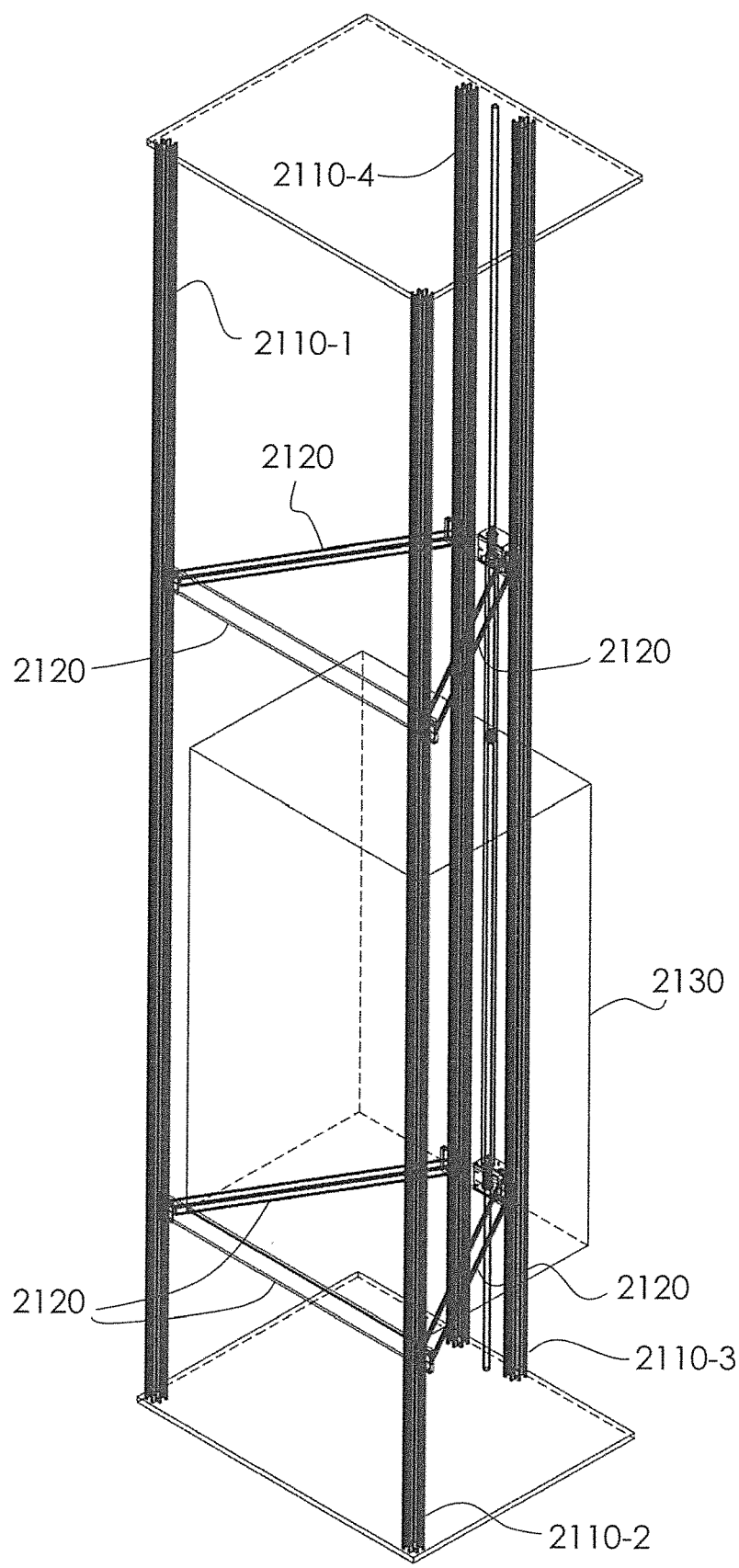
FIGS. 21A and 21B show an elevator assembly according to the present technology.
Figure 21B:
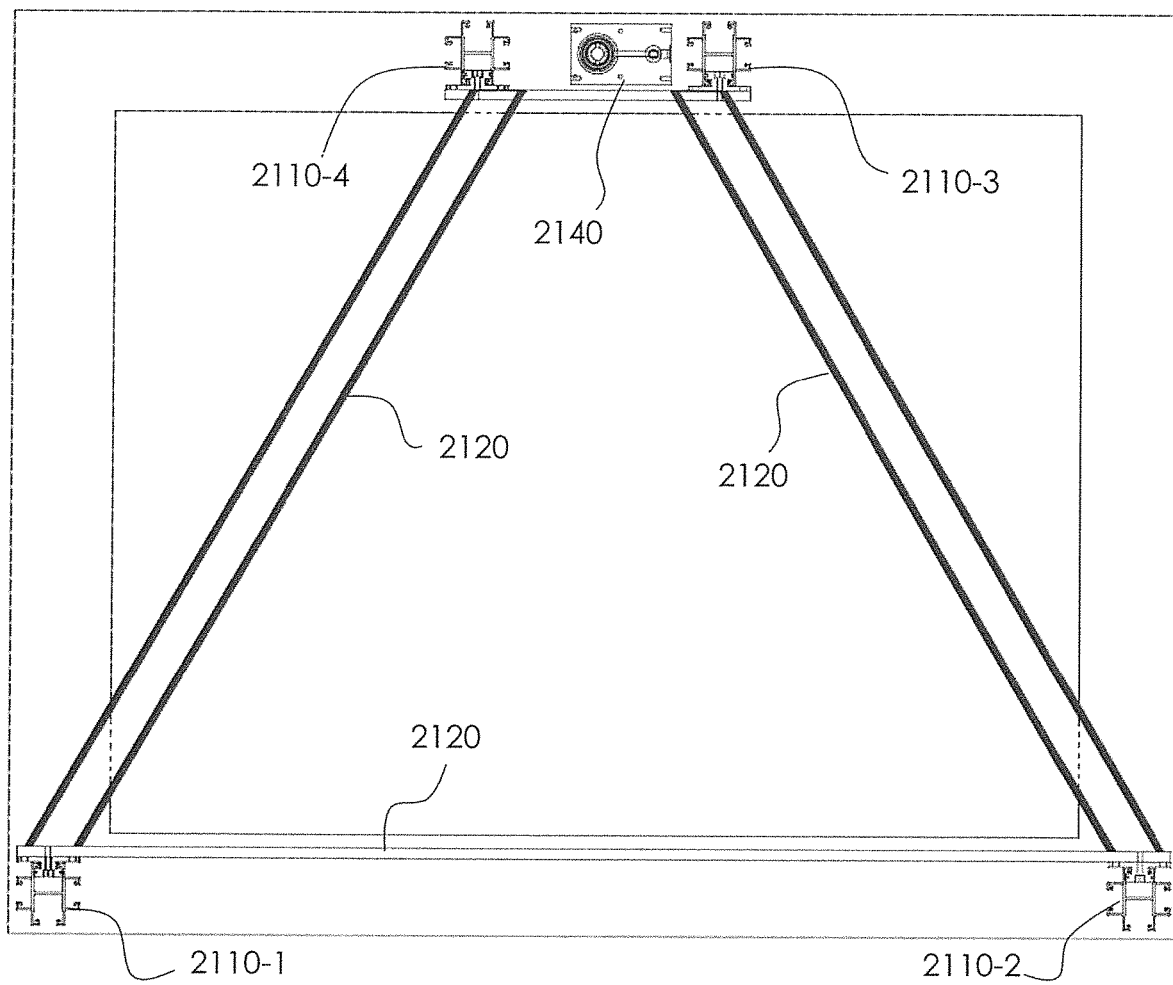

In embodiments, assemblies may be configured for the vertical beams to be in non-rectangular configurations. For example, FIGS. 21A and 21B show an elevator assembly including four vertical beams 2110 in a triangular configuration. FIG. 21B shows a top view of the elevator assembly. A shown, the beams 2110 may have four channels, for example as shown in FIGS. 5 and 6. However, in embodiments, the beams 2110 may have other numbers of channels. Horizontal lifting beams 2120, for example as discussed above, may form triangular lifting platforms. The horizontal lifting beams 2120 are coupled to channels of the beams 2110 with carrier brackets, as disclosed above. An elevator cabin 2130 is coupled to each of the horizontal lifting beams 2120. Linear actuators may be disposed within channels of one or more of the beams 2110, for example as shown in FIGS. 7A, 7B, 10A, 10B, 14A and 14B. The linear actuators may be synchronized to a single motor 2140. Actuating the linear actuators causes the elevator cabin 2130 to translate vertically along the channel of the beams. In embodiments, three vertical beams may be used in place of four vertical beams in a triangular configuration. For example in place of rear vertical beams 2110-3 and 2110-4 a single rear vertical beam may be used. The rear vertical beam may include linear actuators in multiple channels of the rear vertical beam that are each coupled to a different horizontal lifting beam 2120 and are mechanically synchronized with linear actuators in channels of the forward beams 2110-1 and 2110-2.

Figure 22A:
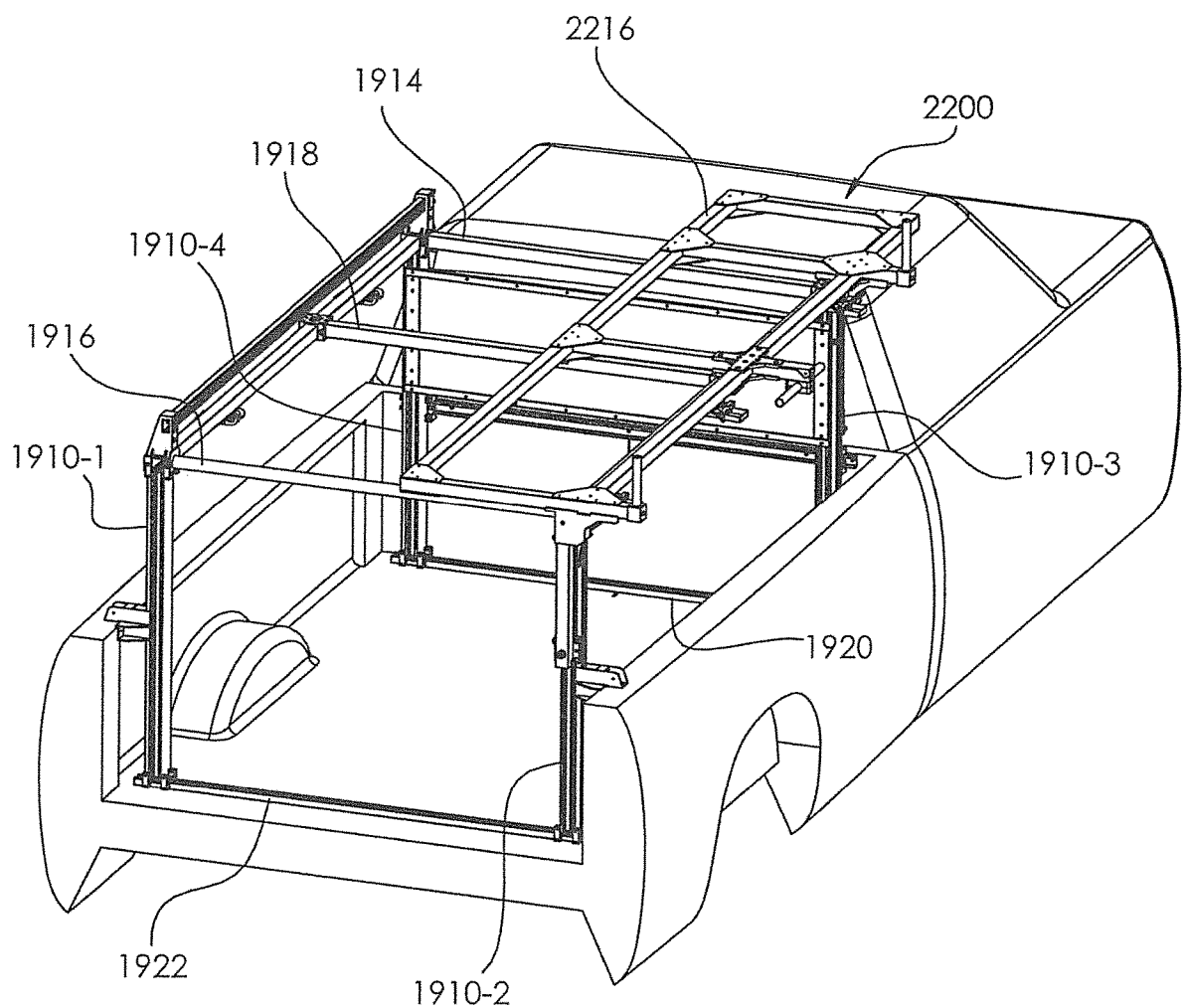
FIG. 22A shows a ladder loader that can be incorporated for use with the beam assembly of FIGS. 19 and 20A, shown in the stow position.
Figure 22B:
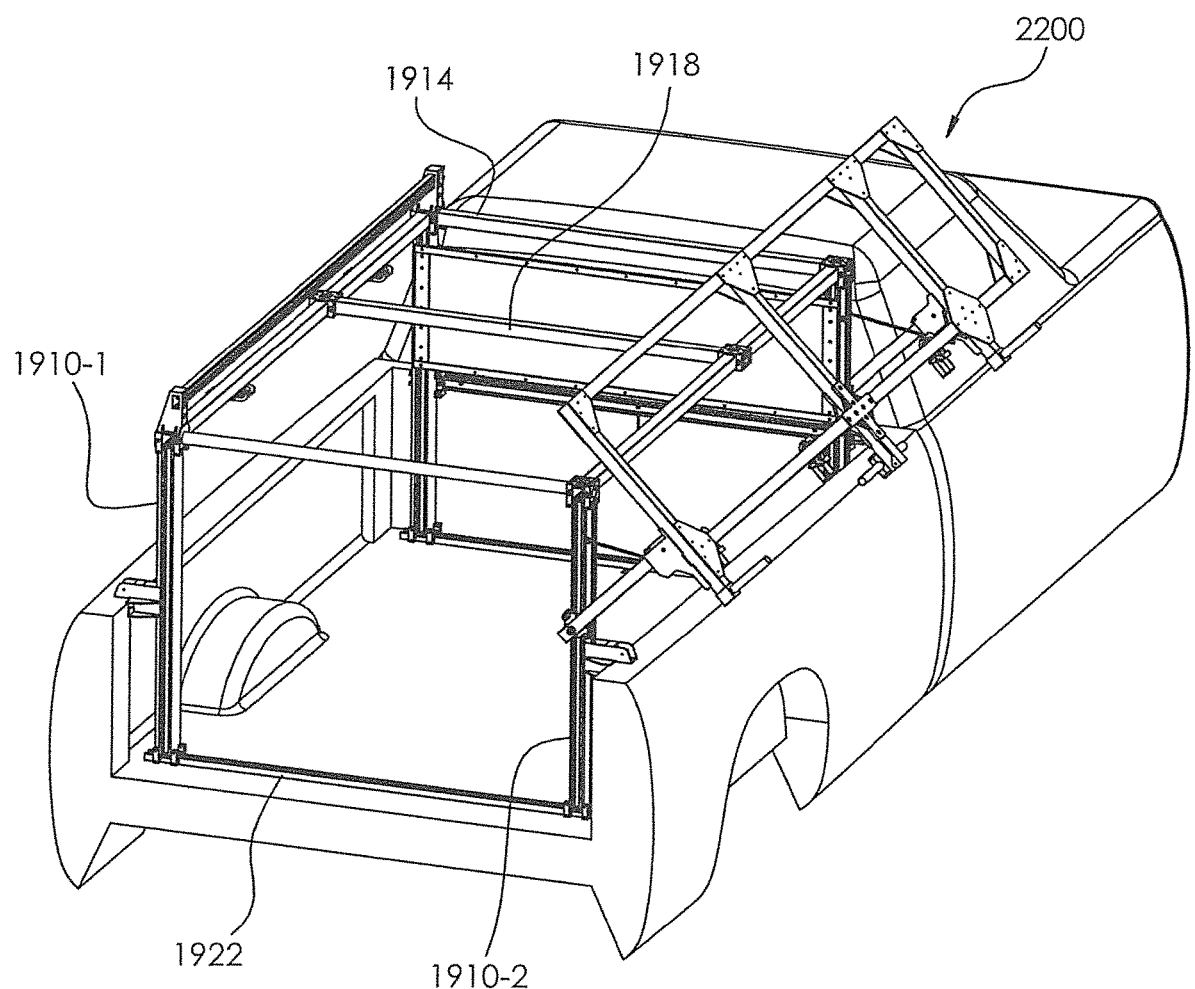
FIG. 22B shows the ladder loader of FIG. 22A in a partially deployed position.
Figure 22C:
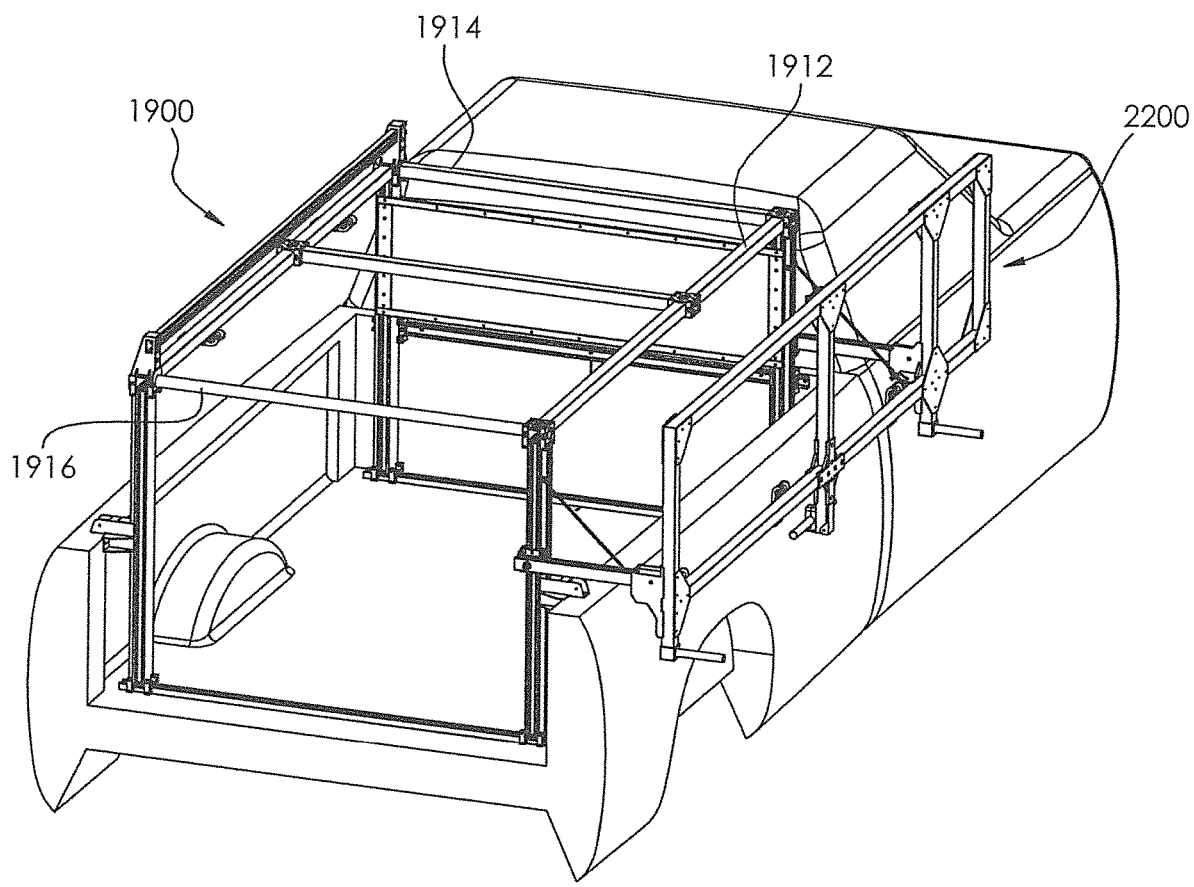
FIG. 22C shows the ladder loader of FIG. 22A in a fully deployed position.

The beam assembly 1900 shown in FIG. 19 can be supported on the truck bed with each of the four vertical beams 1910 supported at a separate corner of the truck bed. In addition, as shown in FIGS. 22A-22C, a front base beam 1920 is secured to the truck bed with opposite ends of the front base beam 1920 connected to the two front vertical beams 1910-3 and 1910-4. Similarly, an aft or rear base beam 1922 is secured to the truck bed with opposite ends of the rear base beam 1922 connected to the two rear vertical beams 1910-1 and 1910-2. The entire weight of the ladder, the ladder loader 2200 described below, and their loads, is transferred through the four vertical posts 1910 then directly to the truck bed.

Figure 23:
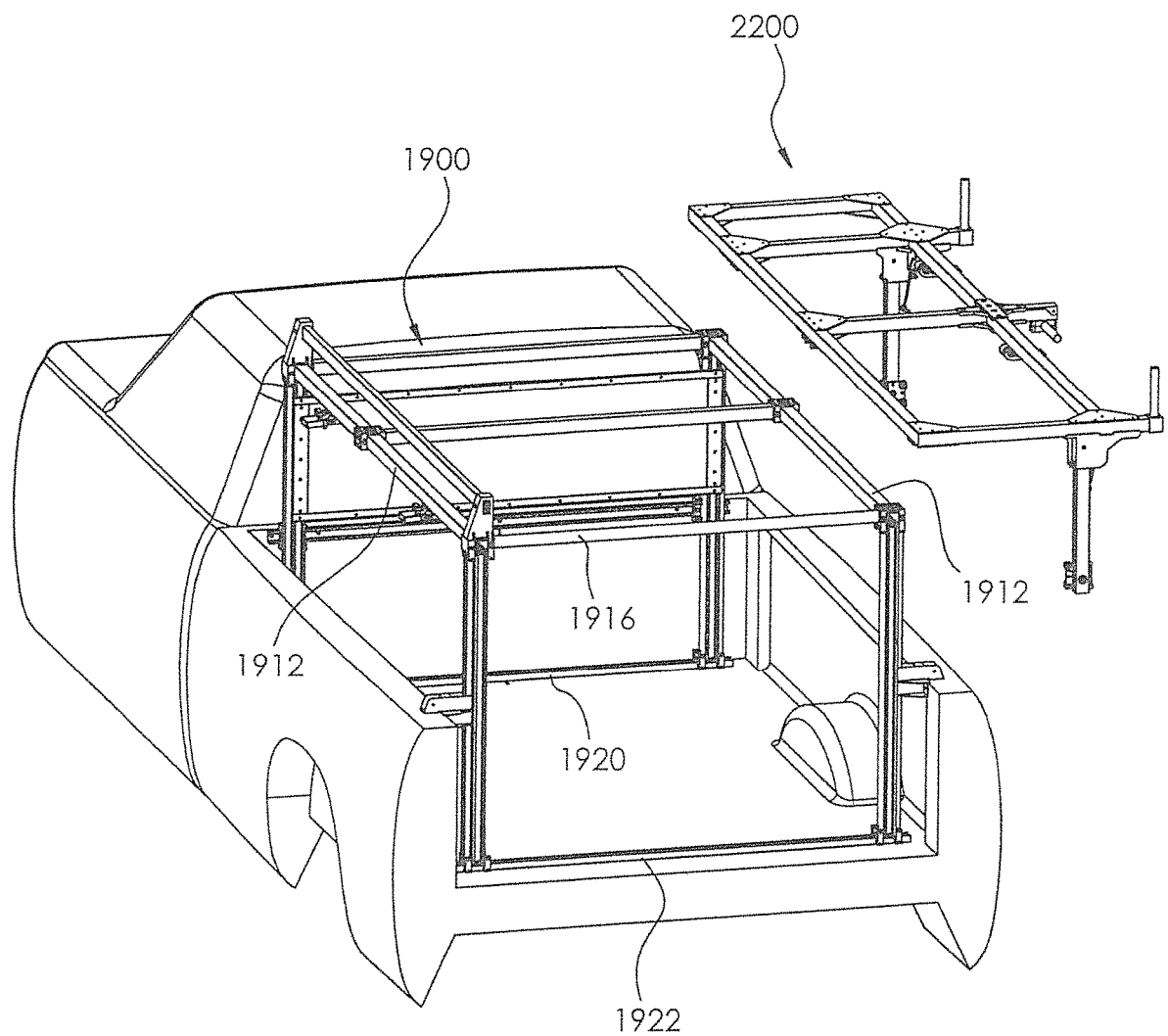
FIG. 23 is an exploded perspective view showing the ladder loader and beam assembly of FIGS. 22A-22C.
Figure 24:
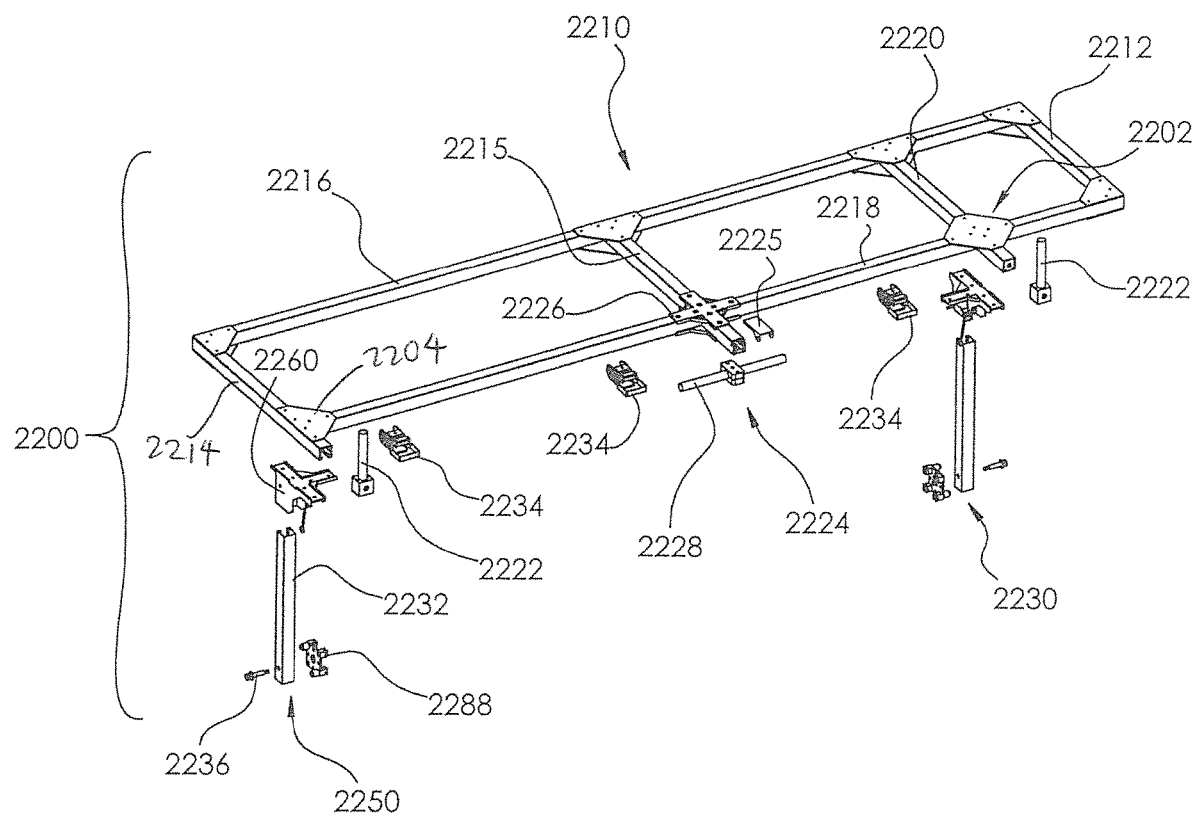
FIG. 24 is an exploded perspective view of the ladder loader of FIG. 23.

Referring also to FIGS. 23 and 24, a ladder loader 2200 is pivotably secured to the beam assembly 1900 in a manner that allows a ladder (not shown) to be stowed on the top of the beam assembly 1900 (see FIG. 22A) and then pivoted to a fully-deployed position (see FIG. 22C) where the ladder can be removed. FIG. 22B shows the ladder loader being pivoted into an intermediate position between the stow position of FIG. 22A and the fully-deployed position of FIG. 22C. The ladder loader 2200 has a ladder support frame 2210, a front pivot assembly 2230, and a rear pivot assembly 2250.

The ladder support frame 2210 has a generally rectangular frame that includes a front beam 2212, a rear beam 2214, and two side beams 2216 and 2218 that are connected to the front beam 2212 and the rear beam 2214. A connecting beam 2220 is spaced apart from the front beam 2212 and positioned closer to the front beam 2212 than the rear beam 2214, and the connecting beam 2220 extends across the side beams 2216 and 2218. Specifically, one end of the connecting beam 2220 terminates at (i.e., connected to) the side beam 2216 and extends beyond the other side beam 2218 to receive a holding bar 2222 that extends transverse and upwardly to the plane that the beams 2212, 2214, 2216, 2218 and 2220 lie in. A front crossing joint 2202 is defined at the location where the beams 2218 and 2220 intersect each other. Similarly, one end of the rear beam 2214 terminates at (i.e., connected to) the side beam 2216 and extends beyond the other side beam 2218 to receive a holding bar 2222 that extends transverse and upwardly to the plane that the beams 2212, 2214, 2216, 2218 and 2220 lie in. A second crossing joint 2204 is defined at the location where the beams 2218 and 2214 intersect each other. A central beam 2215 is provided between, and parallel with, the beams 2214 and 2220.

A handle assembly 2224 is secured to the approximate center of the side beam 2218. The handle assembly 2224 includes a plate 2226 that secures to the side beam 2218, and a gripping bar 2228 secured to the plate 2226. A pivot holding bracket 2225 is pivotably secured to the center of the gripping bar 2228. The user can grip the gripping bar 2228 to pivot and pull the ladder support frame 2210. In addition, tie-down strap holders 2234 are provided in spaced-apart manner along the side beam 2218.

Figure 25A:
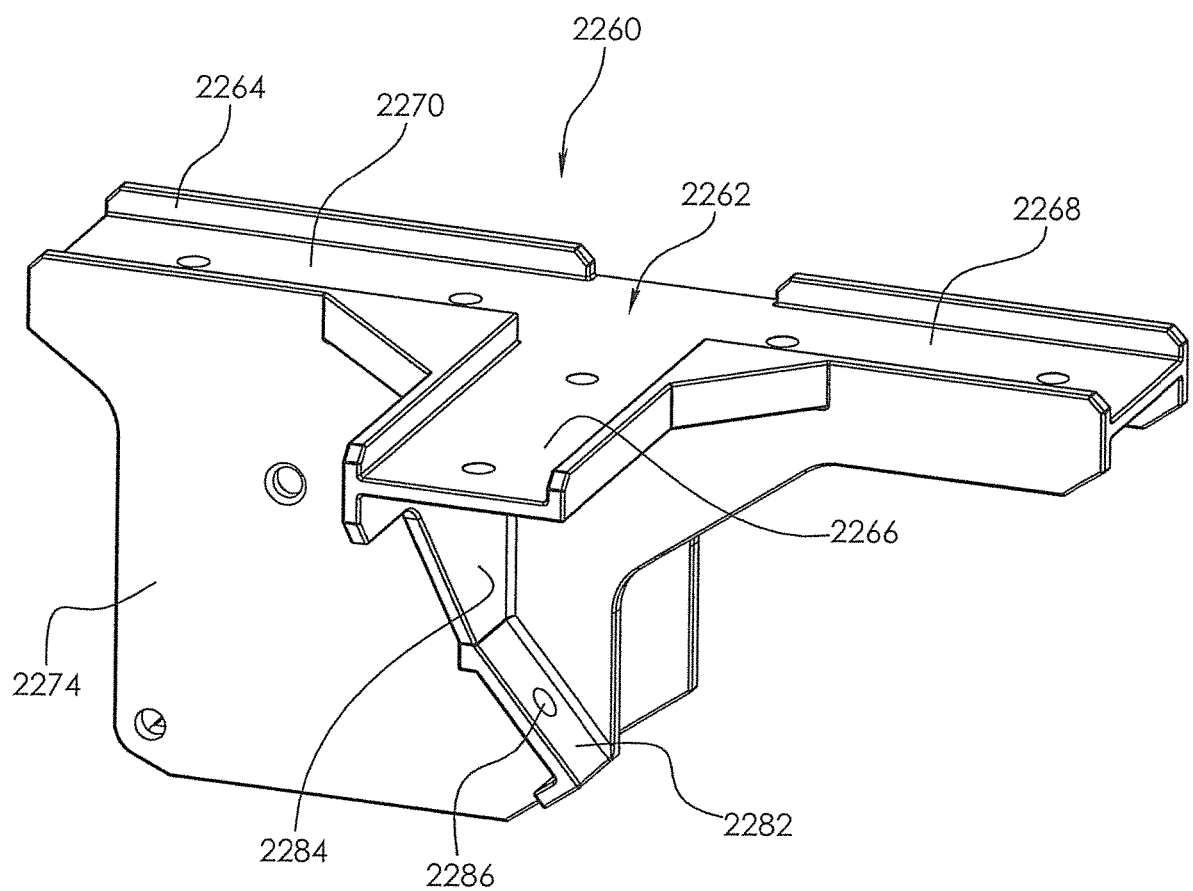
FIGS. 25A and 25B are two different perspective views of the connector bracket of the ladder loader of FIG. 24.
Figure 25B:
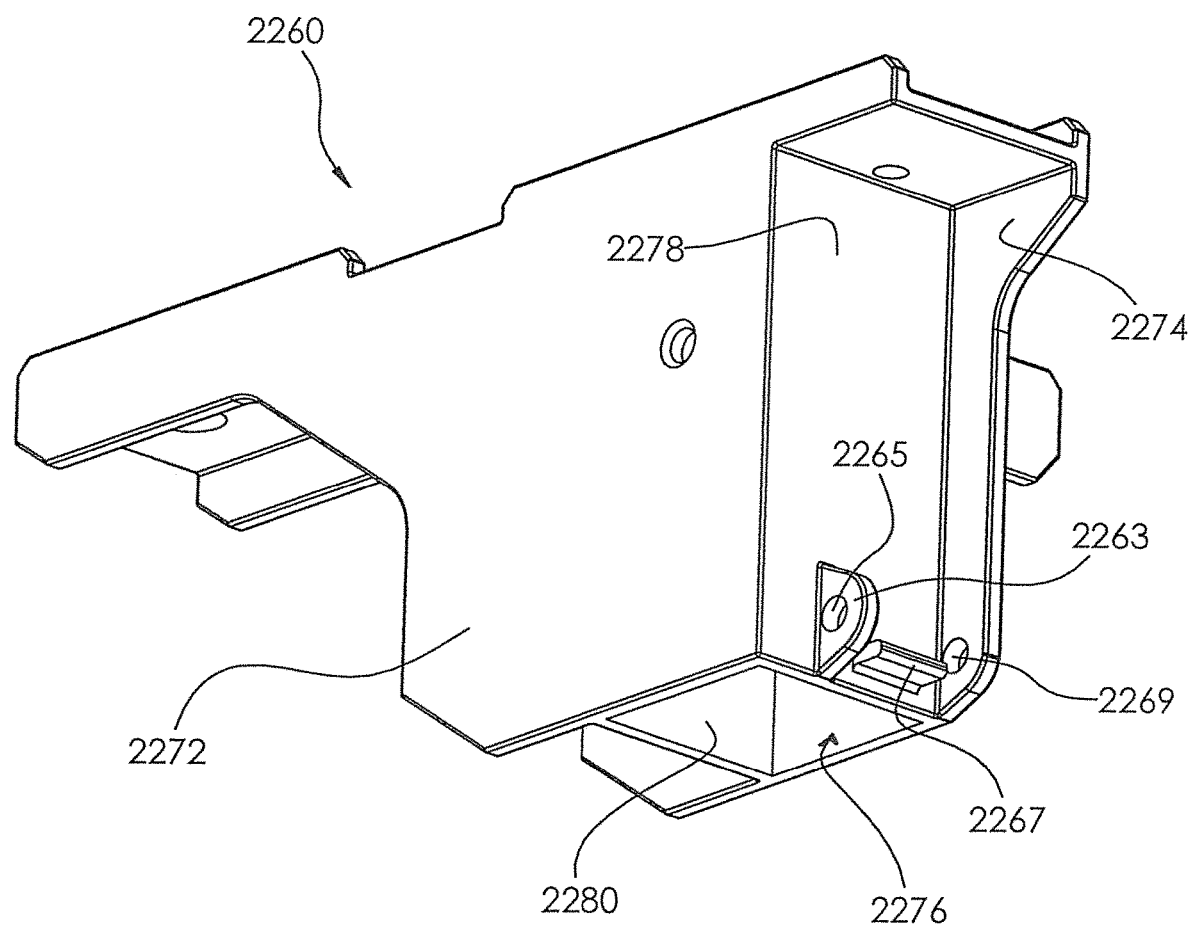

The front pivot assembly 2230 and the rear pivot assembly 2250 can be identical. The front pivot assembly 2230 is secured to the side beam 2218 and the connecting beam 2220, while the rear pivot assembly 2250 is secured to the side beam 2218 and the rear beam 2214. Each pivot assembly 2230 and 2250 has a connector bracket 2260 that is shown in greater detail in FIGS. 25A and 25B, a transverse beam 2232, and a pivot plate 2288.

The connector bracket 2260 has an upper shelf 2262 that provides a T-shaped channel that is defined by vertical walls 2264. The T-shaped channel has a central branch 2266 and two side branches 2268 and 2270. Two support walls 2272 and 2274 extend downwardly from the upper shelf 2262 at the location of, and aligned with, the side branches 2268 and 2270. A four-sided beam slot 2276 is defined by the two support walls 2272 and 2274, and two other walls 2278 and 2280 extending between the two support walls 2272 and 2274. The beam slot 2276 is positioned below the upper shelf 2262 at the location where the three branches 2266, 2268 and 2270 meet. A generally triangular wall 2284 extends vertically below the central branch 2266 along the support wall 2274 to provide support to the upper shelf 2262 at the location of the central branch 2266. An angled wall 2282 extends at an angle from the bottom of the triangular wall 2284 and runs along the side of the support wall 2274, and has an opening 2286. The support walls 2272 and 2274 can have different shapes. For example, the support wall 2272 can terminate at the location of the beam slot 2276 and the wall 2278, whereas the support wall 2274 can extend beyond the beam slot 2276 and the wall 2278. The upper end of the transverse beam 2232 is received inside the beam slot 2276 and secured therein via screws or other known mechanisms. Finally, an ear 2263 extends transversely from the wall 2278, and has a pin hole 2265. A hole 2269 is provided in the support wall 2274 and is aligned with the pin hole 2265. A ridge 2267 also extends transversely from the wall 2278 and oriented at about ninety degrees from the ear 263, and is located along a line that extends from the bottom edge of the ear 2263.

Figure 26A:
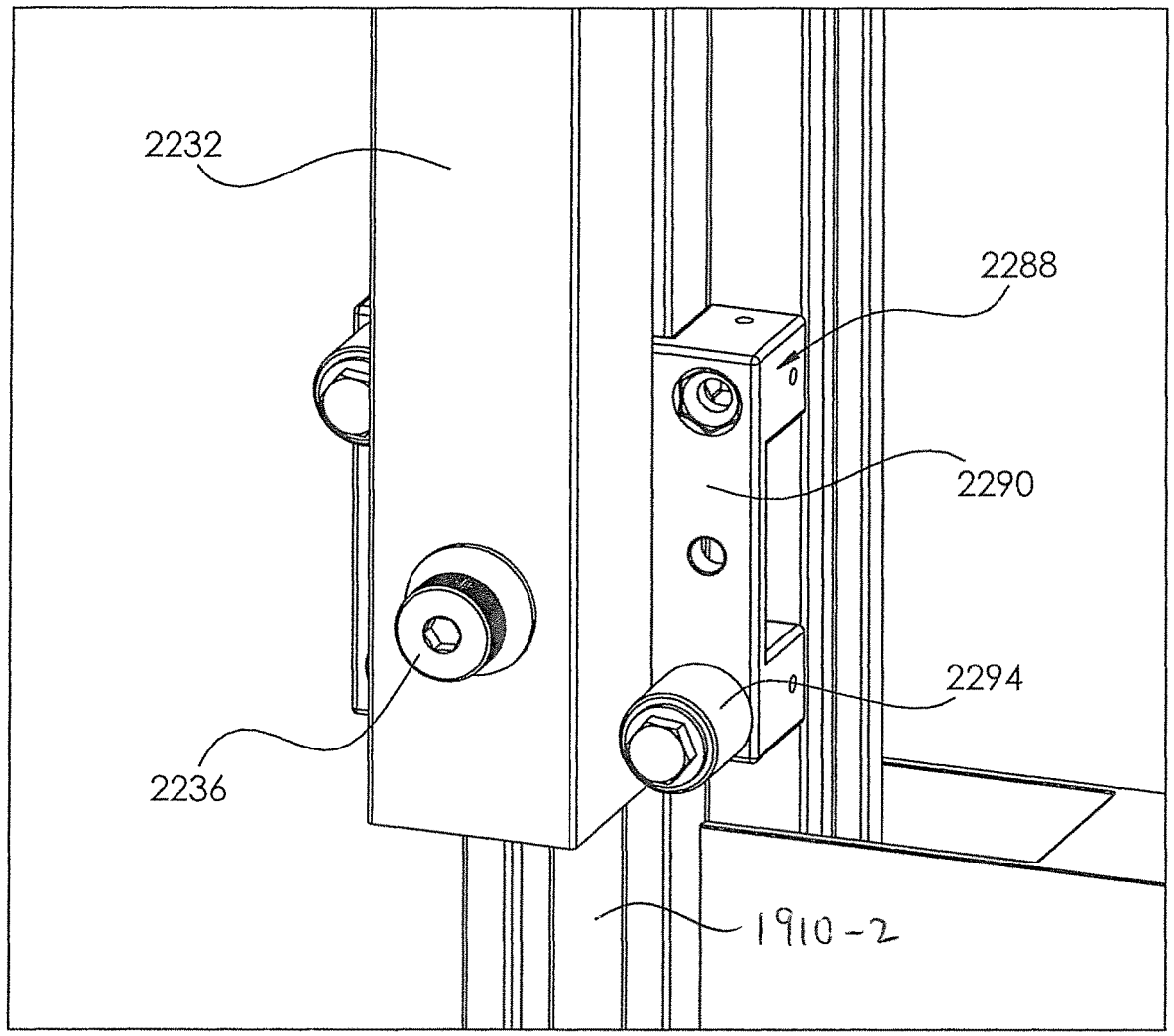
FIG. 26A is an enlarged sectional view of the pivot connection for the ladder loader to the beam assembly of FIGS. 22A-220 shown in the stow position.
Figure 26B:
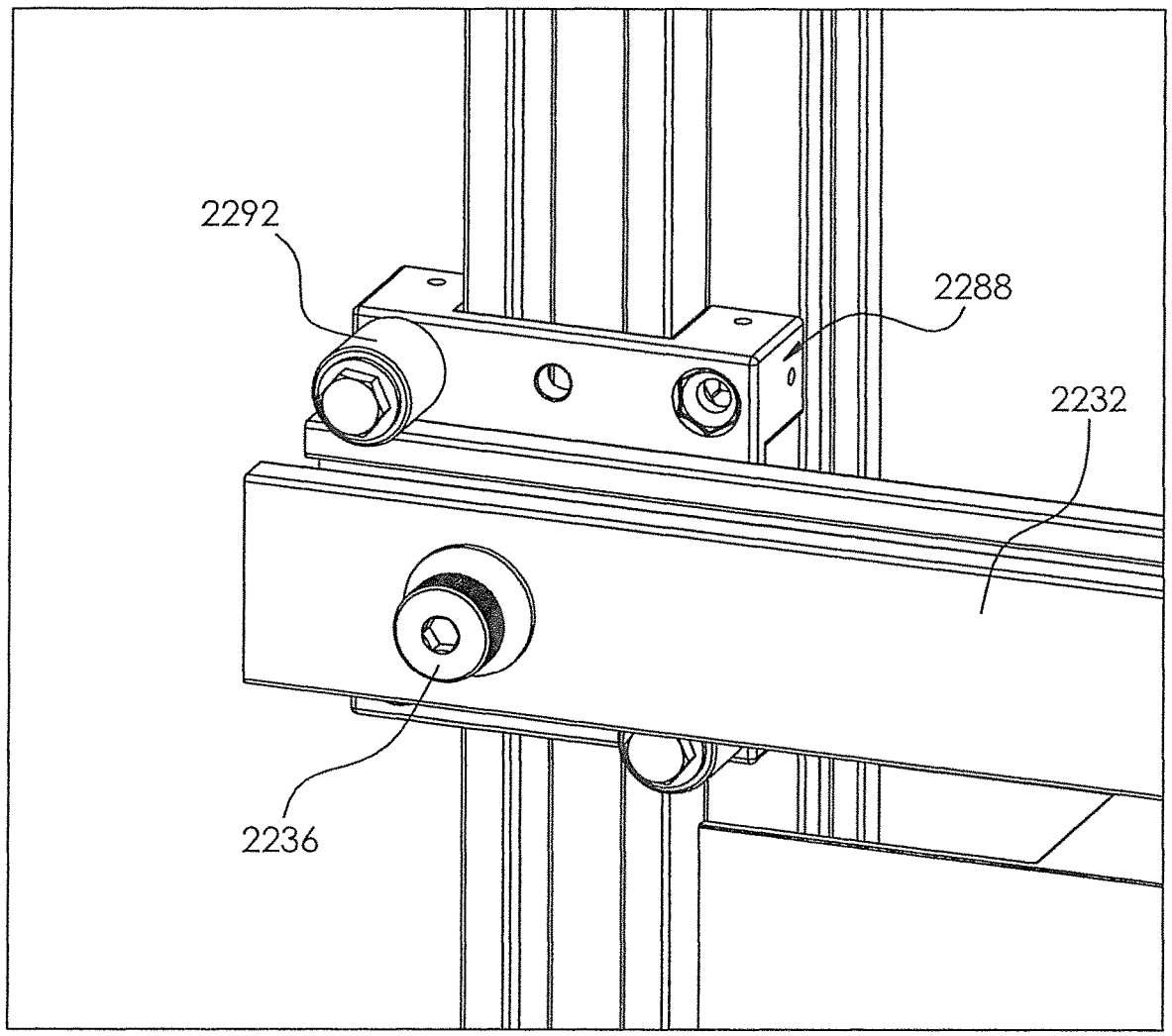
FIG. 26B is an enlarged sectional view of the pivot connection for the ladder loader to the beam assembly of FIGS. 22A-22C shown in the fully deployed position.

Referring to FIGS. 24, 26A and 26B, the pivot plate 2288 is secured to the lower end of the transverse beam 2232. The pivot plate 2288 has a generally square front face 2290 with a stow stop member 2292 and a deploy stop member 2294 provided at opposite corners of the front face 2290. The rear of the pivot plate 2288 defines a channel that is adapted to receive the rear vertical beam 1910-2 so that the pivot plate 2288 can be installed at the rear vertical beam 1910-2 at a location slightly above the side wall of the truck bed. A pivot screw 2236 extends through openings in the transverse beam 2232 and the pivot plate 2288 to allow the transverse beam 2232 to pivot between the stow stop member 2292 (FIG. 26A) and the deploy stop member 2294 (FIG. 26B). These two stop members 2292 and 2294 define the limits to which the transverse beam 2232 can be pivoted in the stow position (FIGS. 22A and 26A) and the deployed position (FIGS. 22C and 26B).

Figure 29:
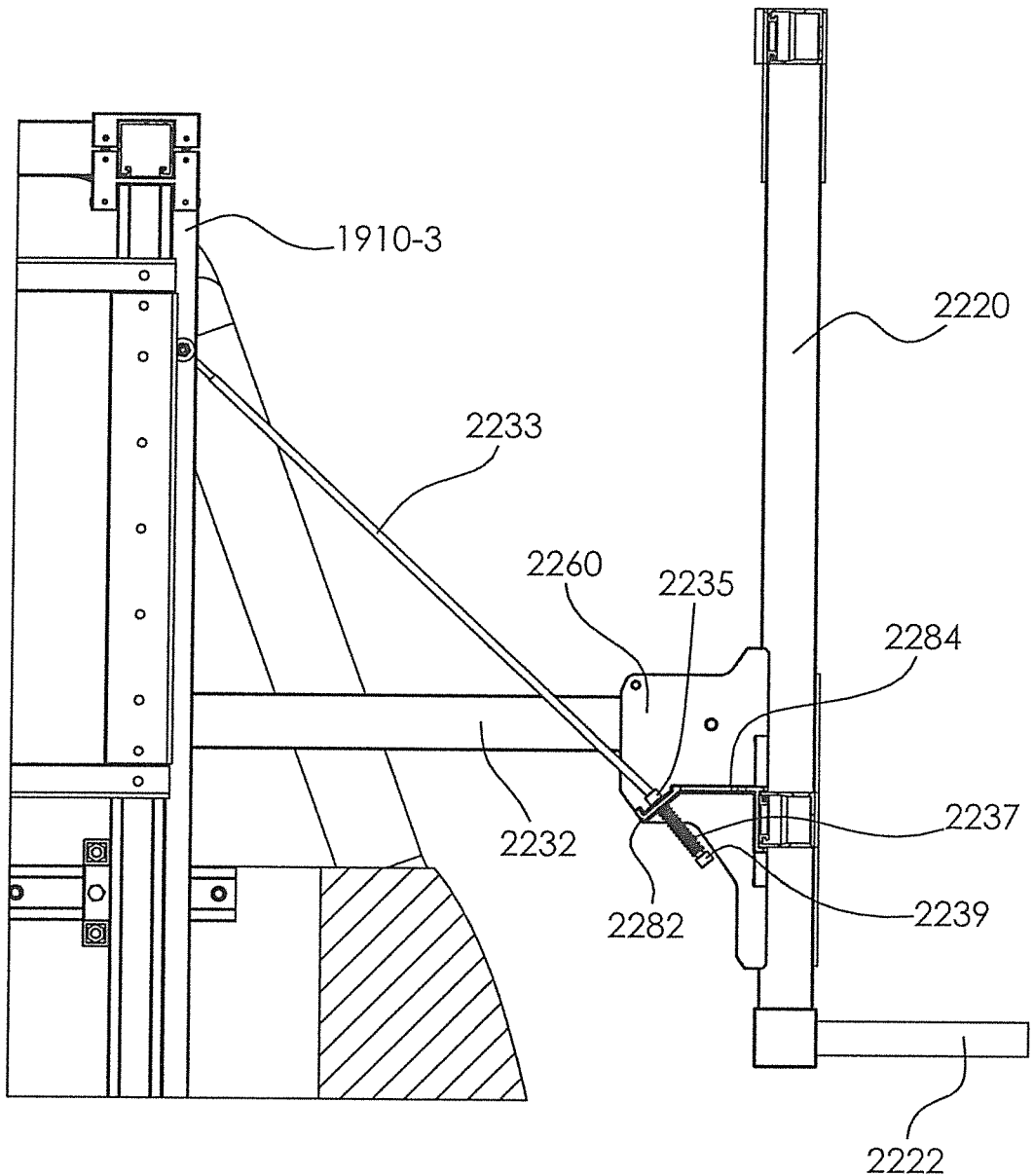
FIG. 29 is a rear view of the front pivot assembly for the ladder loader of FIG. 22A.

Referring also to FIGS. 22B, 22C and 29, each of the front pivot assembly 2230 and the rear pivot assembly 2250 has a cable 2233 that has a first end pivotably connected to beam 1910-3 and beam 1910-2, respectively, and an opposite second end secured to a compression spring 2237 at the opening 2286 of the angled wall 2282 on the connecting bracket 2260. Cable stop 2235 secures the second end of the cable 2233 and one end of the compression spring 2237 at the opening 2286, while another cable stop 2239 is secured to the other end of the compression spring 2237. The compression spring 2237 functions to absorb the shock in the tension of the cable 2233 when the ladder loader is lowered.

Figure 31A:
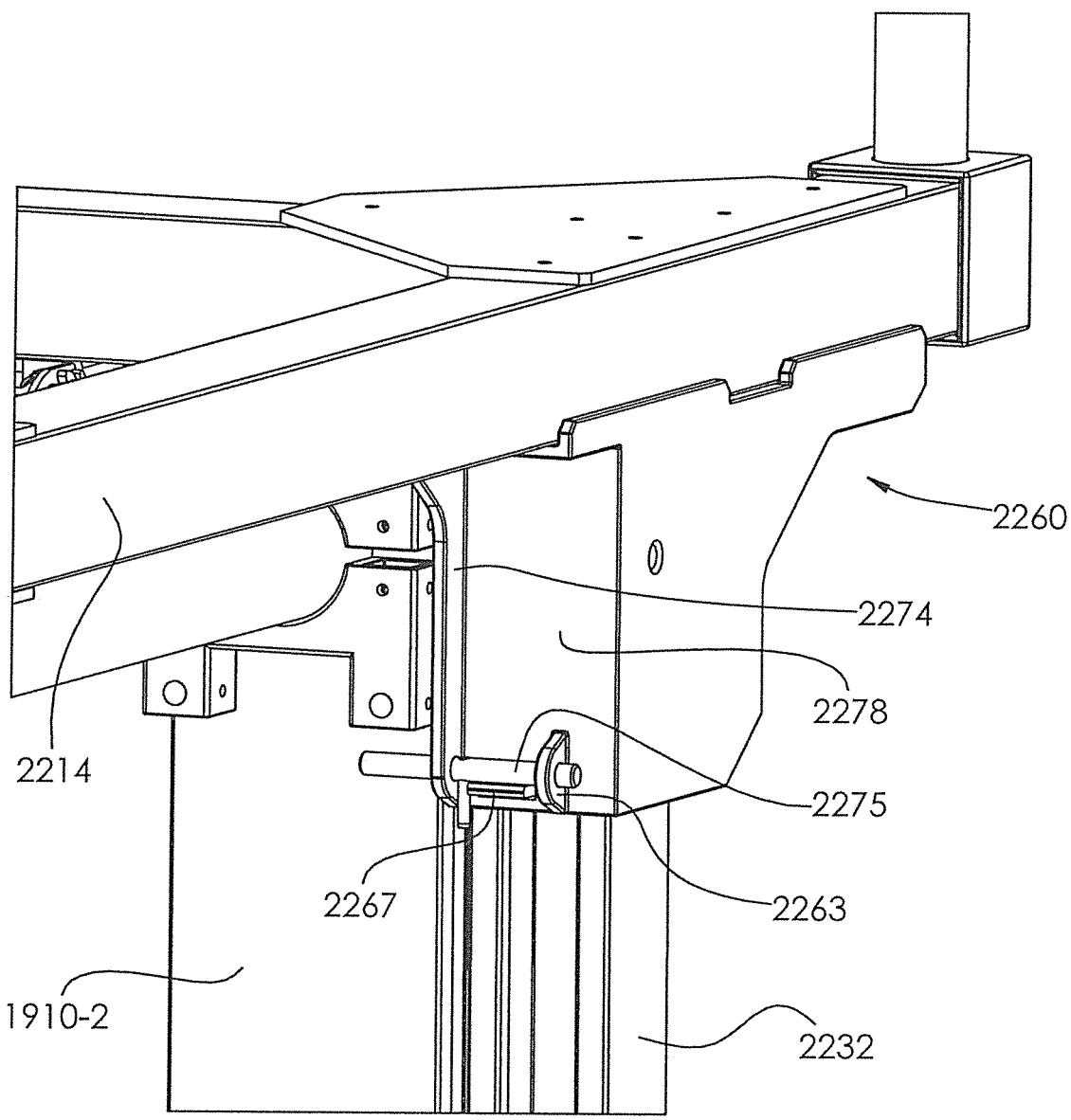
FIG. 31A is an enlarged view of a portion of the rear connector bracket showing a locking pin in a locked position.
Figure 31B:
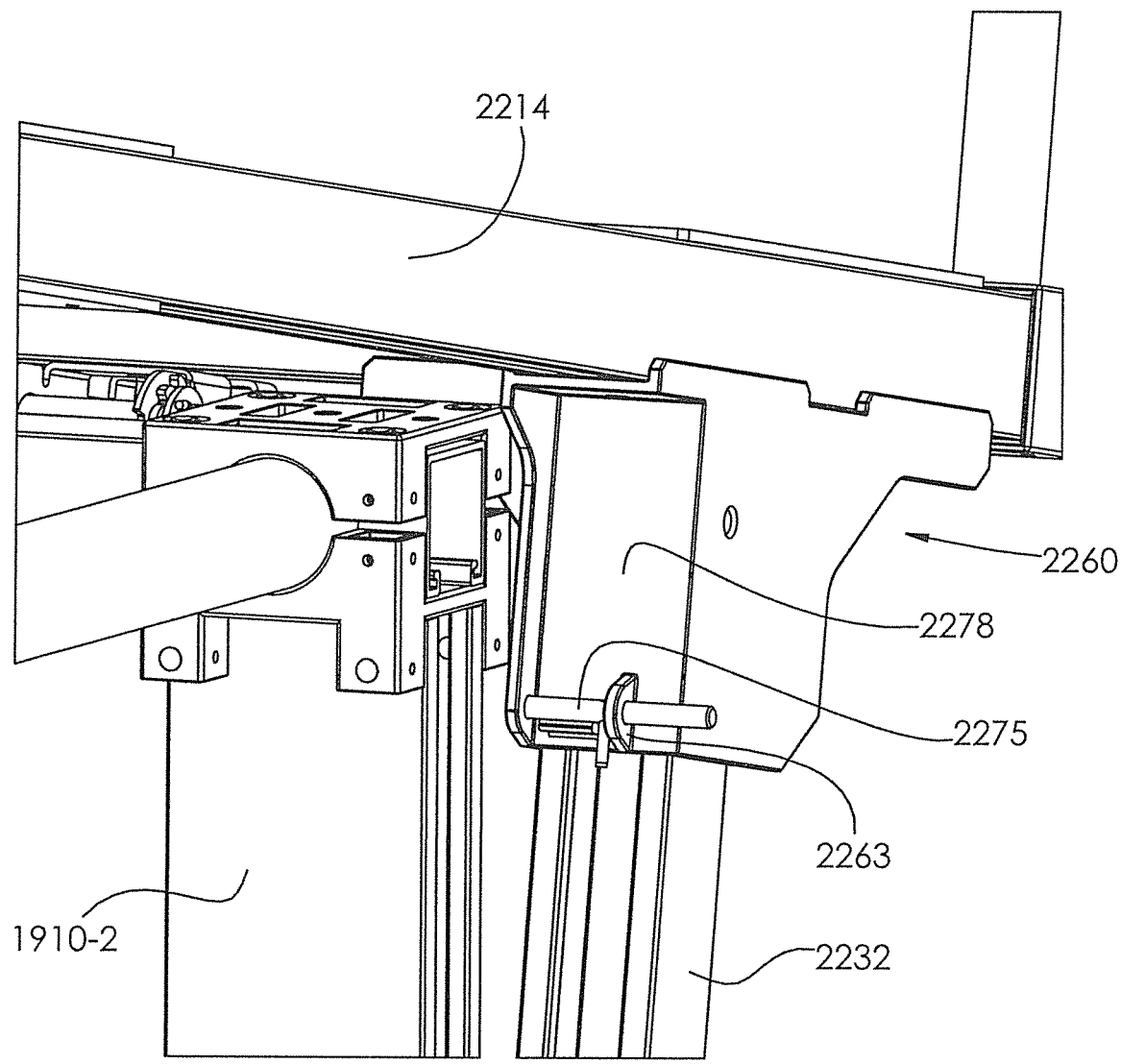
FIG. 31B is an enlarged view of a portion of the rear connector bracket showing a locking pin in an unlocked position.

A locking pin 2275 extends through the pin hole 2265 and the hole 2269 to lock the ladder loader 2200 in the stow position when the pin 2275 is abutted against the inner surface of the beam 1910-2. See FIGS. 25B and 31A. The pin 2275 can be retracted (see FIG. 31B) to unlock the ladder loader 2200 when the abutment between the pin 2275 and the beam 1910-2 is disengaged.

FIGS. 22A and 26A show the ladder loader 2200 stowed away at the top of the beam assembly 1900 with the side beam 2216 resting on crossbars 1916 and 1914. The front beam 2212 and the front portions of the side beams 2216 and 2218 are positioned above the roof of the truck. When it is desired to deploy the ladder loader 2200, the locking pin 2275 is disengaged in the manner described above, and the user can then grip the gripping bar 2228 to pivot and pull the ladder support frame 2210 downwardly. FIG. 22B shows the ladder loader 2200 being partially deployed, and FIGS. 22C and 26B show the ladder loader 2200 in the fully deployed position. To stow and store the ladder loader 2200, the user can grip the gripping bar 2228 to pivot and push the ladder support frame 2210 upwardly until it reaches the stow position shown in FIGS. 22A and 26A. The locking pin 2275 can then be inserted so that it engages the inner surface of the beam 1910-2 to lock the ladder loader 2200 in the stow position. In addition, the holding bars 2222 prevent the ladder from falling off the ladder loader 2200 when in the stow position.

Figure 27:
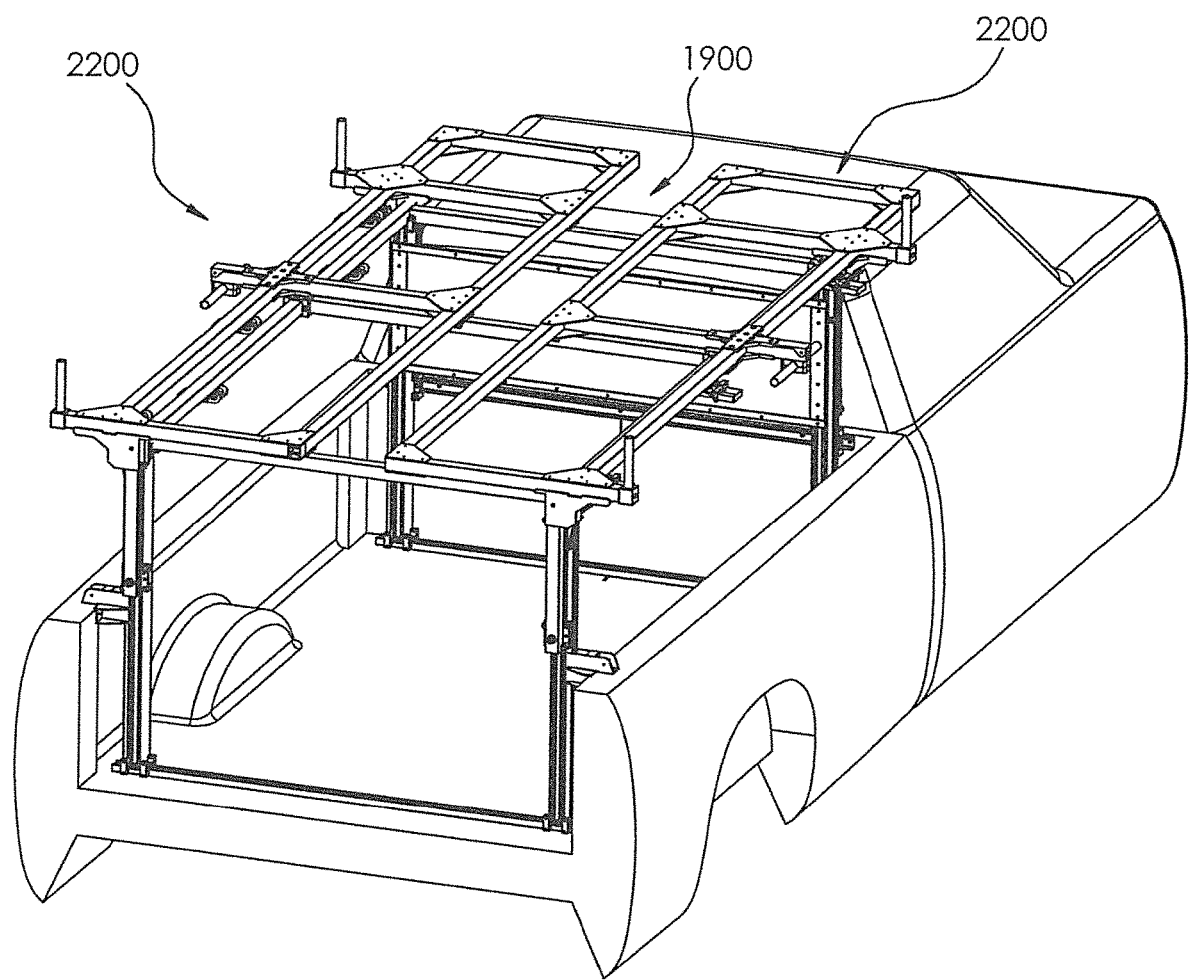
FIG. 27 shows two ladder loaders according to FIGS. 22A-22C being incorporated for use with the beam assembly of FIGS. 19 and 20A, shown in the stow position.

It is possible to provide another pivoting ladder loader 2200 on the other side of the beam assembly 1900. For example, FIG. 27 shows two identical ladder loaders 2200 in the stow position on top of the beam assembly 1900. The other ladder loader 2200 can be identical to the first ladder loader 2200 described above, and pivot and operate in the same manner, except that it is positioned on the other side of the beam assembly 1900.

The ladder loader 2200 shown and described in connection with FIGS. 22A to 26B is manually deployed by a user, but it is also possible to provide a ladder loader 2200a that can be deployed and stored using a power actuator drive assembly. The ladder loader 2200a can be identical to the ladder loader 2200 described above, except that the power actuator drive assembly is used to drive the ladder loader 2200 from the stow position to the fully deployed position, or vice versa.

Figure 28A:
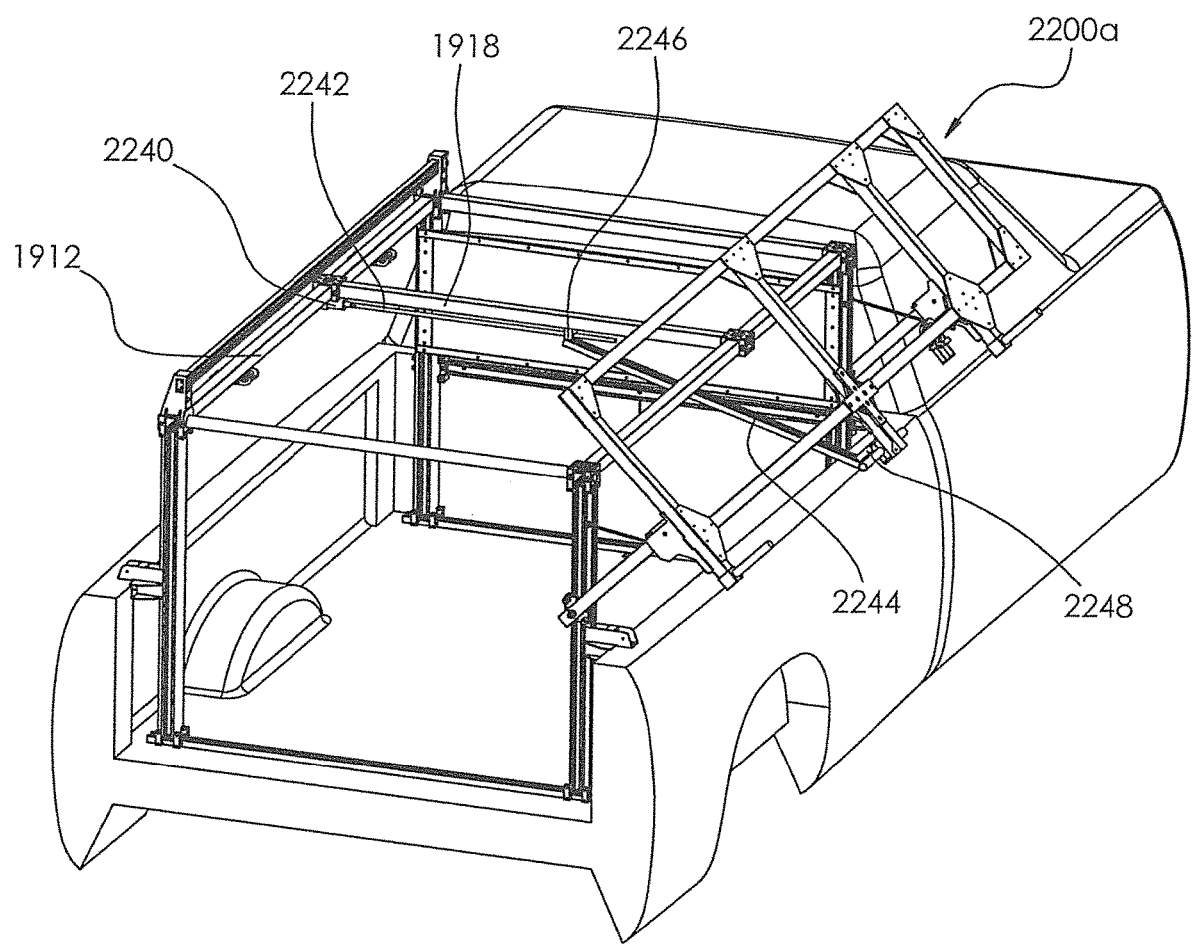
FIG. 28A shows a power actuator driven ladder loader that can be incorporated for use with the beam assembly of FIGS. 19 and 20A, shown in the partially deployed position.
Figure 28B:
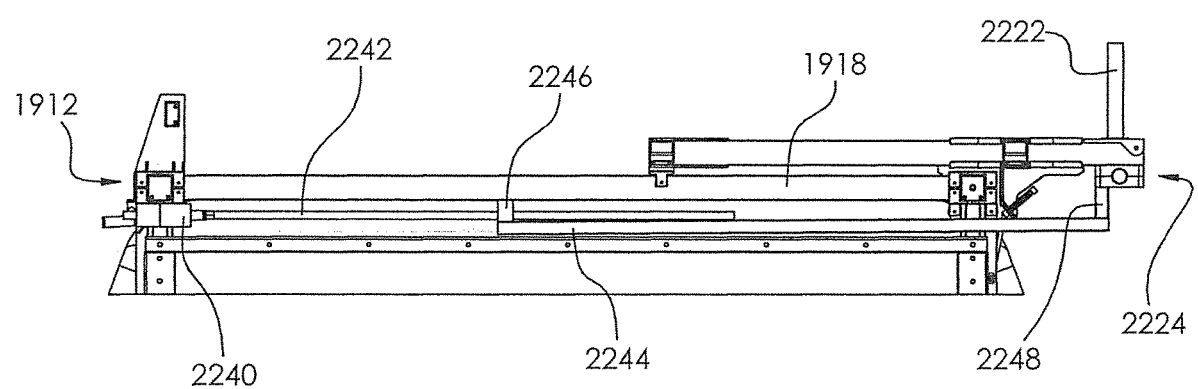
FIG. 28B is a side view of the power actuator driven ladder loader of FIG. 28A.

Referring to FIGS. 28A and 28B, the power actuator drive assembly is provided along a central beam 1918 of the beam assembly 1900, and has a motor 2240 provided at the side beam 1912 that drives a leadscrew 2242. The leadscrew 2242 couples a connecting beam 2244 via a leadscrew nut 2246 for translating driving motion of the connecting beam 2244. The connecting beam 2244 has a connector 2248 which connects the connecting beam 2244 to the gripping bar 2228. The leadscrew nut 2246 is secured underneath the central beam 1918, and the leadscrew 2242 and connecting beam 2244 are both parallel and underneath the central beam 1918. A switch (not shown) can be provided at any location of the truck or truck bed to activate the power actuator drive assembly to deploy or stow the ladder loader.

Figure 30A:
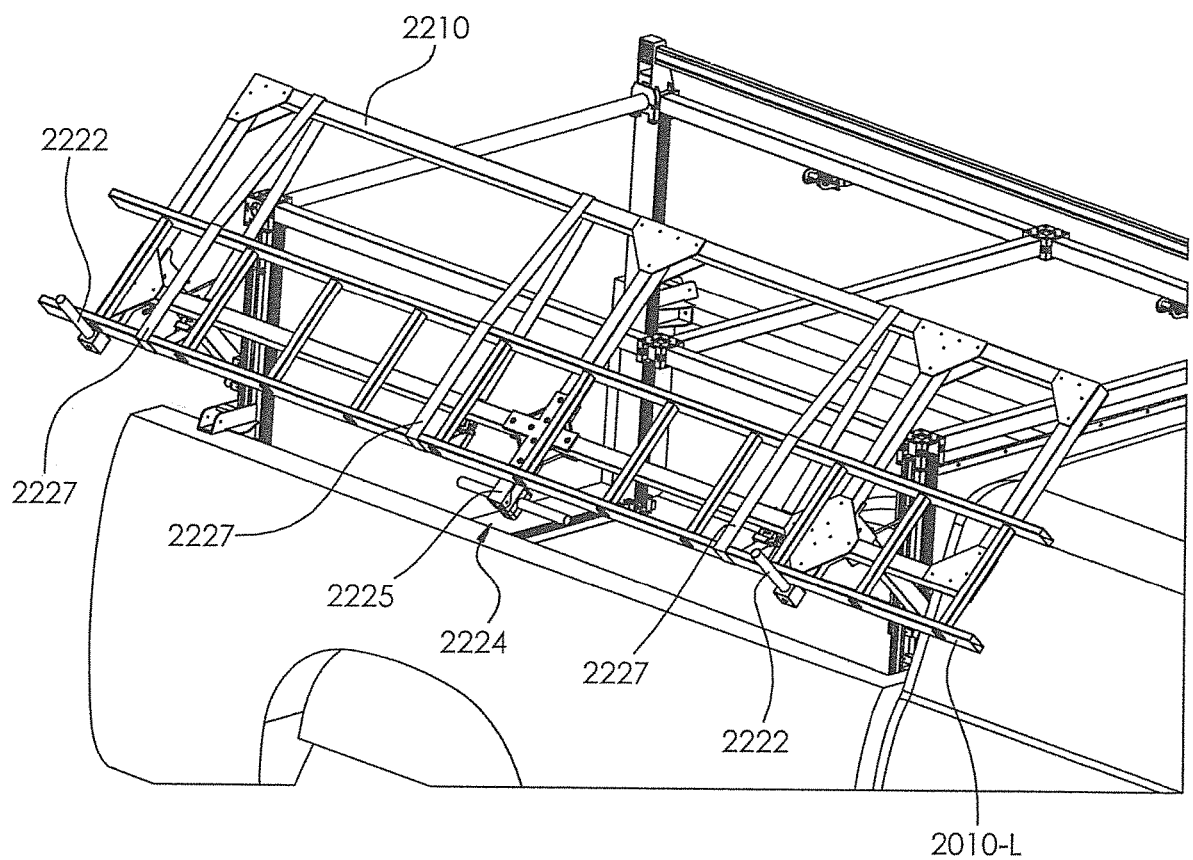
FIG. 30A is a different perspective view of FIG. 22B shown with a long ladder resting on the ladder loader.
Figure 30B:
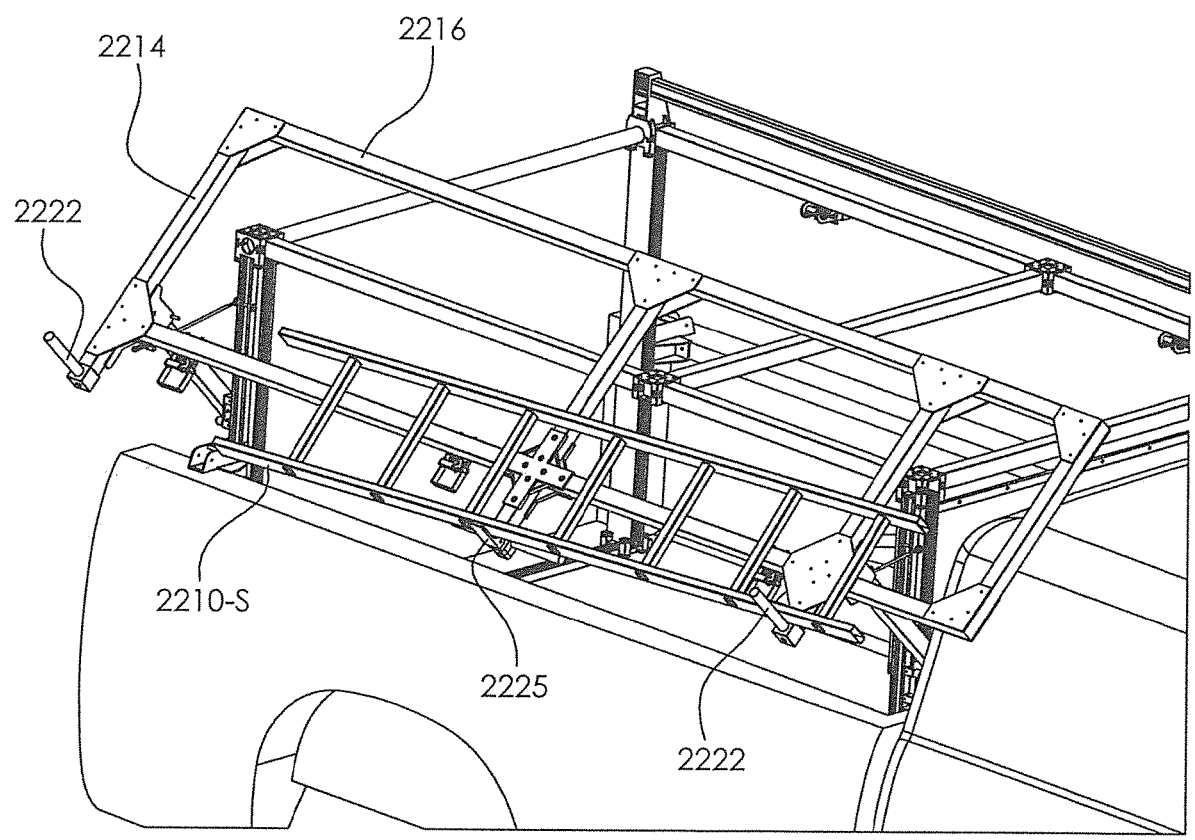
FIGS. 30B and 30C are different perspective views of FIG. 22B shown with a short ladder resting on the ladder loader.
Figure 30C:
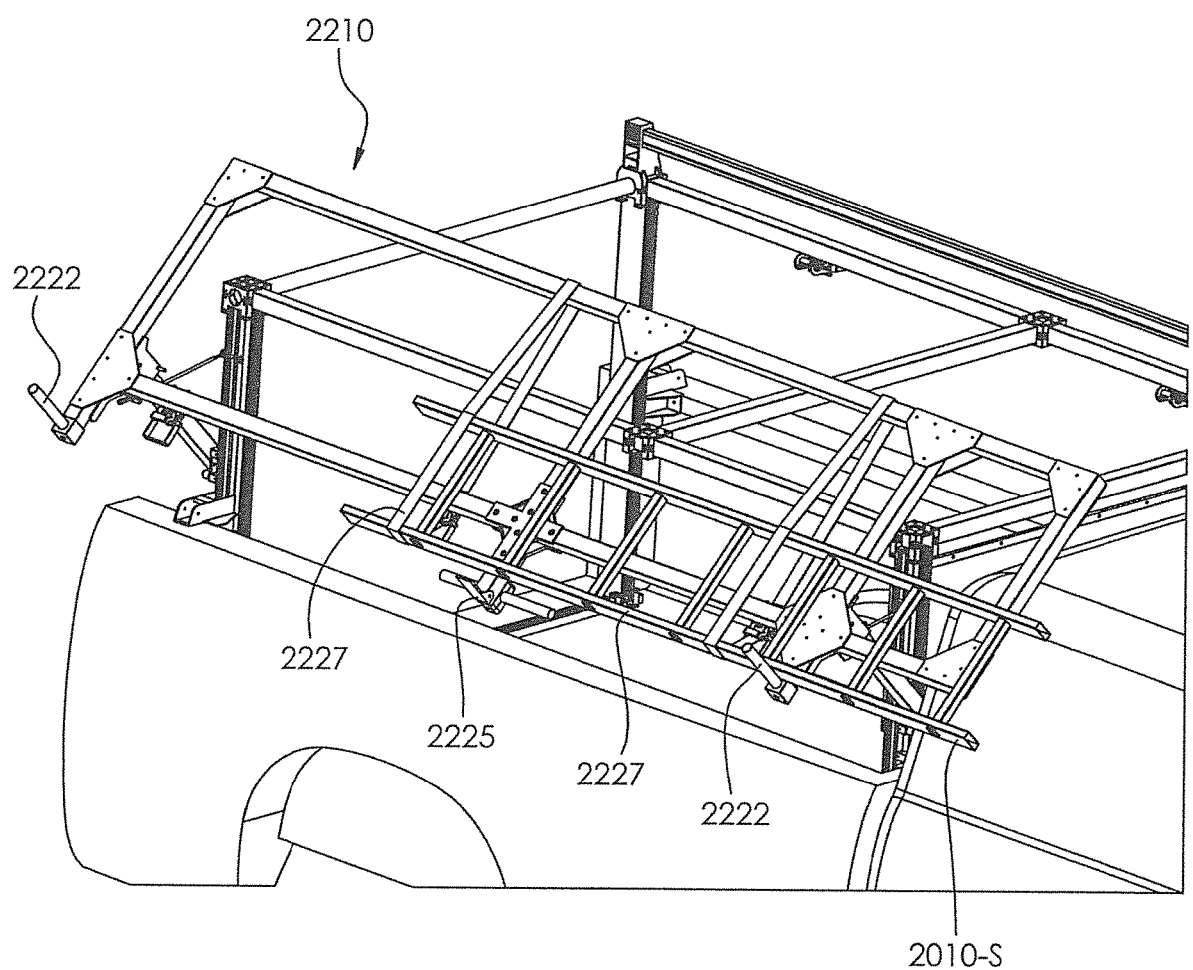

FIGS. 30A-30C illustrate how the ladder loader 2200 can be used with long and short ladders. FIG. 30A shows a long ladder 2010-L secured on the ladder loader 2200. One side of the ladder 2010-L rests against the two holding bars 2222, while straps 2227 can be used to tie the ladder 2010-L to the support frame 2210 via the tie-down strap holders 2234. When used with a long ladder 2010-L, the pivot holding bracket 2225 is folded against the central beam 2215.

FIGS. 30B and 30C show a short ladder 2010-S supported by the ladder loader 2200. Since the shorter ladder 2010-S does not extend to the holding bar 2222 at the rear beam 2214, a second support point is needed, so the pivot holding bracket 2225 is pivoted out and used to provide that second support point, as best shown in FIG. 30B. FIG. 30C shows straps 2227 used to tie the ladder 2010-S to the support frame 2210 via the tie-down strap holders 2234.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A ladder loader for use with a truck, comprising:
   a ladder support frame having a front beam, a rear beam, a first side beam and a second side beam, each side beam connected to the front and rear beams to form a rectangle having a periphery;
   the ladder support frame further including a connecting beam spaced apart from the front beam and closer to the front beam than the rear beam, and the connecting beam extending across the side beams in a manner where a first end of the connecting beam terminates at the first side beam and a second end of the connecting beam extends past the second side beam and beyond the periphery of the rectangle, with a front holding bar extending transverse to the connecting beam at the second end, and wherein a front crossing joint is defined where the connecting beam extends across the second side beam;
   wherein the rear beam has a first end that terminates at the first side beam and a second end that extends past the second side beam and beyond the periphery of the rectangle, with a rear holding bar extending transverse to the rear beam at the second end of the rear beam, and wherein a rear crossing joint is defined where the rear beam extends across the second side beam;
   a front pivot assembly secured to the second side beam and the connecting beam, the front pivot assembly having a front pivot plate, a front connector bracket, a front transverse beam having a lower end connected to the front pivot plate, and an upper end that is secured to the front crossing joint via the front connector bracket; and
   a rear pivot assembly secured to the rear beam and the connecting beam, the rear pivot assembly having a rear pivot plate, a rear connector bracket, a rear transverse beam having a lower end connected to the rear pivot plate, and an upper end that is secured to the rear crossing joint via the rear connector bracket.

2. The ladder loader of claim 1, wherein each of the connector brackets has an upper shelf that provides a T-shaped channel, wherein the T-shaped channel has a central branch, a first side branch and a second branch, each connector bracket further including at least one support wall extending downwardly from the upper shelf, and a beam slot extending downwardly from the upper shelf and receiving either the front or rear transverse beam.

3. The ladder loader of claim 2, wherein the beam slot is positioned below the upper shelf at a location where the central branch, the first side branch and the second branch meet.

4. The ladder loader of claim 3, wherein an angled wall extends at an angle below the upper shelf, and each pivot assembly has a cable that has a first end pivotably connected to a part of the truck, and an opposite second end that is secured to a compression spring at the angled wall.

5. The ladder loader of claim 1, wherein each pivot plate comprises a square front face having four corners, with a stow stop member and a deploy stop member provided at opposite corners of the front face, wherein each transverse beam has a lower end connected to the a corresponding pivot plate to allow the transverse beam to pivot between the stow stop member and the deploy stop member.

6. The ladder loader of claim 1, wherein a handle assembly is secured to the second side beam, the handle assembly having a plate that is secured to the second side beam, and a gripping bar secured to the plate.

7. The ladder loader of claim 6, further including a pivot holding bracket pivotably secured to the gripping bar.

8. The ladder loader of claim 1, further including a locking pin provided with one of the connector brackets for securing the ladder loader to a part of the truck.

9. The ladder loader of claim 1, further including a power actuator drive assembly coupled to the ladder loader for moving the ladder loader from a stow position to a deployed position.

10. A pick-up truck comprising: a truck bed having a driver side wall and a passenger side wall;
   a beam assembly installed inside the truck bed; and
   a ladder loader pivotably secured to the beam assembly along either the driver side wall or the passenger side wall, the ladder loader being pivoted between a stow position where the ladder loader is above the beam assembly, and a deployed position where the ladder loader is positioned outside either the driver side wall or the passenger side wall; and
   wherein the ladder loader comprises: a ladder support frame having a front beam, a rear beam, a first side beam and a second side beam, each side beam connected to the front and rear beams to form a rectangle having a periphery;
   the ladder support frame further including a connecting beam spaced apart from the front beam and closer to the front beam than the rear beam, and the connecting beam extending across the side beams in a manner where a first end of the connecting beam terminates at the first side beam and a second end of the connecting beam extends past the second side beam and beyond the periphery of the rectangle, with a front holding bar extending transverse to the connecting beam at the second end, and wherein a front crossing joint is defined where the connecting beam extends across the second side beam;
   wherein the rear beam has a first end that terminates at the first side beam and a second end that extends past the second side beam and beyond the periphery of the rectangle, with a rear holding bar extending transverse to the rear beam at the second end of the rear beam, and wherein a rear crossing joint is defined where the rear beam extends across the second side beam;

a front pivot assembly pivotably secured to the beam assembly and secured to the second side beam and the connecting beam, the front pivot assembly having a front pivot plate, a front connector bracket, a front transverse beam having a lower end connected to the front pivot plate, and an upper end that is secured to the front crossing joint via the front connector bracket; and a rear pivot assembly pivotably secured to the beam assembly and secured to the rear beam and the connecting beam, the rear pivot assembly having a rear pivot plate, a rear connector bracket, a rear transverse beam having a lower end connected to the rear pivot plate, and an upper end that is secured to the rear crossing joint via the rear connector bracket.

* * * * *